United States Patent
Wise et al.

(10) Patent No.: US 12,505,584 B2
(45) Date of Patent: Dec. 23, 2025

(54) SYSTEM AND METHOD FOR TRACKING A PORTION OF THE USER AS A PROXY FOR NON-MONITORED INSTRUMENT

(71) Applicant: Cilag GmbH International, Zug (CH)

(72) Inventors: Austin E. Wise, Cincinnati, OH (US); Christopher Q. Seow, Cincinnati, OH (US); Melissa Schweizer, San Francisco, CA (US); Sarah A. Worthington, Cincinnati, OH (US); Shane R. Adams, Lebanon, OH (US); Scott A. Jenkins, Mason, OH (US); Frederick E. Shelton, IV, Hillsboro, OH (US); Chad E. Eckert, Terrace Park, OH (US); Cory G. Kimball, Hamilton, OH (US); Monica L. Z. Rivard, Cincinnati, OH (US); Leonardo N. Rossoni, Rahway, NJ (US); Matthew D. Cowperthwait, Cincinnati, OH (US); Risto Kojcev, Santa Clara, CA (US); Felix J. Bork, Schnürpflingen (DE)

(73) Assignee: Cilag GmbH International, Zug (CH)

( * ) Notice: Subject to any disclaimer, the term of this patent is extended or adjusted under 35 U.S.C. 154(b) by 398 days.

(21) Appl. No.: 17/688,655

(22) Filed: Mar. 7, 2022

(65) Prior Publication Data

US 2022/0336078 A1    Oct. 20, 2022

Related U.S. Application Data

(60) Provisional application No. 63/284,326, filed on Nov. 30, 2021, provisional application No. 63/174,674, filed on Apr. 14, 2021.

(51) Int. Cl.
*G06T 11/00* (2006.01)
*A61B 34/00* (2016.01)
(Continued)

(52) U.S. Cl.
CPC .............. *G06T 11/00* (2013.01); *A61B 34/20* (2016.02); *A61B 34/25* (2016.02); *A61B 34/30* (2016.02);
(Continued)

(58) Field of Classification Search
CPC ....................................................... G16H 20/40
(Continued)

(56) References Cited

U.S. PATENT DOCUMENTS

| 4,171,700 A | 10/1979 | Farin |
| 4,849,752 A | 7/1989 | Bryant |

(Continued)

FOREIGN PATENT DOCUMENTS

| CA | 3003058 A1 | 5/2017 |
| EP | 0408160 A1 | 1/1991 |

(Continued)

OTHER PUBLICATIONS

"ATM-MPLS Network Interworking Version 2.0, af-aic-0178.001" ATM Standard, The ATM Forum Technical Committee, published Aug. 2003.

(Continued)

*Primary Examiner* — Reginald R Reyes
(74) *Attorney, Agent, or Firm* — Condo Roccia Koptiw LLP

(57) ABSTRACT

A tracking system of operating room (OR) personnel and is configured to extrapolate the movement, position, orientation, and context of one or more of the active OR participants to determine the specific operation procedure in progress, the surgical instrument being used by the OR participant, and/or anticipated movement of the OR personnel. The system may further be configured to render a virtual element that includes an anticipated position of a surgical instrument, recommendations, guidance, warning, and sur- (Continued)

gical location information, as augmented reality (AR) content. The AR content is integrated in real-time with the live-feed of the surgical site, and aids the OR personnel in perioperative surgical procedures.

21 Claims, 28 Drawing Sheets

(51) Int. Cl.
  *A61B 34/20*   (2016.01)
  *A61B 34/30*   (2016.01)
  *A61B 34/32*   (2016.01)
  *A61B 90/00*   (2016.01)
  *G06F 3/14*   (2006.01)
  *G06F 3/147*   (2006.01)
  *G06T 7/00*   (2017.01)
  *G06T 7/20*   (2017.01)
  *G06T 19/00*   (2011.01)
  *G06V 20/20*   (2022.01)
  *G08B 21/18*   (2006.01)
  *G16H 20/40*   (2018.01)
  *G16H 40/67*   (2018.01)
  *H04L 9/40*   (2022.01)
  *H04L 67/12*   (2022.01)
  *H04W 24/10*   (2009.01)
  *H04W 76/14*   (2018.01)
  *A61B 34/10*   (2016.01)

(52) U.S. Cl.
  CPC .............. *A61B 34/32* (2016.02); *A61B 34/76* (2016.02); *A61B 90/36* (2016.02); *A61B 90/361* (2016.02); *A61B 90/37* (2016.02); *A61B 90/39* (2016.02); *G06F 3/14* (2013.01); *G06F 3/1454* (2013.01); *G06F 3/147* (2013.01); *G06T 7/0012* (2013.01); *G06T 7/20* (2013.01); *G06T 19/006* (2013.01); *G06V 20/20* (2022.01); *G08B 21/182* (2013.01); *G16H 20/40* (2018.01); *G16H 40/67* (2018.01); *H04L 63/105* (2013.01); *H04L 67/12* (2013.01); *H04W 24/10* (2013.01); *H04W 76/14* (2018.02); *A61B 2034/102* (2016.02); *A61B 2034/2055* (2016.02); *A61B 2034/2072* (2016.02); *A61B 2090/365* (2016.02); *A61B 2090/368* (2016.02); *A61B 2090/371* (2016.02); *A61B 2090/372* (2016.02); *A61B 2090/373* (2016.02); *A61B 2090/3937* (2016.02); *A61B 2090/3975* (2016.02); *G06T 2207/10028* (2013.01); *G06T 2207/30024* (2013.01); *G06T 2210/41* (2013.01)

(58) Field of Classification Search
  USPC ........................................................ 345/633
  See application file for complete search history.

(56) References Cited

U.S. PATENT DOCUMENTS

| | | | |
|---|---|---|---|
| D303,787 S | 10/1989 | Messenger et al. |
| D327,061 S | 6/1992 | Soren et al. |
| 5,189,277 A | 2/1993 | Boisvert et al. |
| 5,204,669 A | 4/1993 | Dorfe et al. |
| 5,318,563 A | 6/1994 | Malis et al. |
| 5,325,270 A | 6/1994 | Wenger et al. |
| 5,425,375 A | 6/1995 | Chin et al. |
| D379,346 S | 5/1997 | Mieki |
| 5,690,504 A | 11/1997 | Scanlan et al. |
| 5,693,042 A | 12/1997 | Boiarski et al. |
| 5,724,468 A | 3/1998 | Leone et al. |
| 6,049,467 A | 4/2000 | Tamarkin et al. |
| 6,055,458 A | 4/2000 | Cochran et al. |
| D431,811 S | 10/2000 | Nishio et al. |
| 6,179,136 B1 | 1/2001 | Kluge et al. |
| 6,269,411 B1 | 7/2001 | Reasoner |
| 6,288,606 B1 | 9/2001 | Ekman et al. |
| 6,416,471 B1 | 7/2002 | Kumar et al. |
| 6,501,485 B1 | 12/2002 | Dash et al. |
| 6,546,270 B1 | 4/2003 | Goldin et al. |
| 6,584,358 B2 | 6/2003 | Carter et al. |
| 6,611,793 B1 | 8/2003 | Burnside et al. |
| 6,731,514 B2 | 5/2004 | Evans |
| 6,760,218 B2 | 7/2004 | Fan |
| 6,839,238 B2 | 1/2005 | Derr et al. |
| 6,843,657 B2 | 1/2005 | Driscoll et al. |
| 6,913,471 B2 | 7/2005 | Smith |
| 7,009,511 B2 | 3/2006 | Mazar et al. |
| 7,044,949 B2 | 5/2006 | Orszulak et al. |
| 7,074,205 B1 | 7/2006 | Duffy et al. |
| 7,134,994 B2 | 11/2006 | Alpert et al. |
| 7,171,784 B2 | 2/2007 | Eenigenburg |
| 7,217,269 B2 | 5/2007 | El-Galley et al. |
| 7,252,664 B2 | 8/2007 | Nasab et al. |
| 7,331,699 B2 | 2/2008 | Gawalkiewicz et al. |
| 7,344,532 B2 | 3/2008 | Goble et al. |
| 7,353,068 B2 | 4/2008 | Tanaka et al. |
| 7,408,439 B2 | 8/2008 | Wang et al. |
| D579,876 S | 11/2008 | Novotney et al. |
| D583,328 S | 12/2008 | Chiang |
| 7,496,418 B2 | 2/2009 | Kim et al. |
| D589,447 S | 3/2009 | Sasada et al. |
| 7,500,747 B2 | 3/2009 | Howell et al. |
| 7,518,502 B2 | 4/2009 | Austin et al. |
| 7,563,259 B2 | 7/2009 | Takahashi |
| 7,601,149 B2 | 10/2009 | DiCarlo et al. |
| 7,637,907 B2 | 12/2009 | Blaha |
| 7,656,671 B2 | 2/2010 | Liu et al. |
| 7,757,028 B2 | 7/2010 | Druke et al. |
| D631,252 S | 1/2011 | Leslie |
| 7,932,826 B2 | 4/2011 | Fritchie et al. |
| 7,945,065 B2 | 5/2011 | Menzl et al. |
| 7,945,342 B2 | 5/2011 | Tsai et al. |
| 7,982,776 B2 | 7/2011 | Dunki-Jacobs et al. |
| 7,995,045 B2 | 8/2011 | Dunki-Jacobs |
| 8,019,094 B2 | 9/2011 | Hsieh et al. |
| 8,086,008 B2 | 12/2011 | Coste-maniere et al. |
| D655,678 S | 3/2012 | Kobayashi et al. |
| D657,368 S | 4/2012 | Magee et al. |
| 8,239,066 B2 | 8/2012 | Jennings et al. |
| D667,838 S | 9/2012 | Magee et al. |
| D675,164 S | 1/2013 | Kobayashi et al. |
| D676,392 S | 2/2013 | Gassauer |
| D678,196 S | 3/2013 | Miyauchi et al. |
| D678,304 S | 3/2013 | Yakoub et al. |
| 8,423,182 B2 | 4/2013 | Robinson et al. |
| D687,146 S | 7/2013 | Juzkiw et al. |
| 8,504,136 B1 | 8/2013 | Sun et al. |
| 8,540,709 B2 | 9/2013 | Allen |
| 8,567,393 B2 | 10/2013 | Hickle et al. |
| D704,839 S | 5/2014 | Juzkiw et al. |
| 8,795,001 B1 | 8/2014 | Lam et al. |
| 8,819,581 B2 | 8/2014 | Nakamura et al. |
| D716,333 S | 10/2014 | Chotin et al. |
| 8,917,513 B1 | 12/2014 | Hazzard |
| 8,920,186 B2 | 12/2014 | Shishikura |
| 8,923,012 B2 | 12/2014 | Kaufman et al. |
| 8,968,296 B2 | 3/2015 | McPherson |
| 8,986,288 B2 | 3/2015 | Konishi |
| 9,017,326 B2 | 4/2015 | Dinardo et al. |
| D729,267 S | 5/2015 | Yoo et al. |
| 9,055,870 B2 | 6/2015 | Meador et al. |
| 9,065,394 B2 | 6/2015 | Lim et al. |
| 9,129,054 B2 | 9/2015 | Nawana et al. |
| 9,160,853 B1 | 10/2015 | Daddi et al. |
| 9,168,054 B2 | 10/2015 | Turner et al. |
| 9,168,085 B2 | 10/2015 | Juzkiw et al. |
| 9,168,091 B2 | 10/2015 | Janssen et al. |

(56) References Cited

U.S. PATENT DOCUMENTS

| | | |
|---|---|---|
| 9,198,711 B2 | 12/2015 | Joseph |
| 9,226,766 B2 | 1/2016 | Aldridge et al. |
| 9,226,791 B2 | 1/2016 | McCarthy et al. |
| 9,237,921 B2 | 1/2016 | Messerly et al. |
| 9,265,429 B2 | 2/2016 | St. Pierre et al. |
| 9,277,961 B2 | 3/2016 | Panescu et al. |
| 9,277,969 B2 | 3/2016 | Brannan et al. |
| 9,281,615 B1 | 3/2016 | Plaza et al. |
| 9,320,646 B2 | 4/2016 | Todd et al. |
| 9,345,481 B2 | 5/2016 | Hall et al. |
| 9,345,900 B2 | 5/2016 | Wu et al. |
| 9,351,653 B1 | 5/2016 | Harrison |
| 9,427,255 B2 | 8/2016 | Griffith et al. |
| 9,463,646 B2 | 10/2016 | Payne et al. |
| 9,474,565 B2 | 10/2016 | Shikhman et al. |
| D772,252 S | 11/2016 | Myers et al. |
| 9,486,271 B2 | 11/2016 | Dunning |
| 9,491,895 B2 | 11/2016 | Steeves et al. |
| 9,503,681 B1 | 11/2016 | Popescu et al. |
| 9,532,827 B2 | 1/2017 | Morgan et al. |
| 9,600,031 B2 | 3/2017 | Kaneko et al. |
| 9,603,277 B2 | 3/2017 | Morgan et al. |
| D783,675 S | 4/2017 | Yagisawa et al. |
| D784,270 S | 4/2017 | Bhattacharya |
| 9,666,974 B2 | 5/2017 | Bopp |
| 9,713,503 B2 | 7/2017 | Goldschmidt |
| 9,715,271 B2 | 7/2017 | Kaestner |
| 9,750,563 B2 | 9/2017 | Shikhman et al. |
| 9,770,103 B2 | 9/2017 | Cochran et al. |
| 9,773,093 B2 | 9/2017 | Bernini et al. |
| 9,782,214 B2 | 10/2017 | Houser et al. |
| 9,788,907 B1 | 10/2017 | Alvi et al. |
| 9,804,977 B2 | 10/2017 | Ghosh et al. |
| 9,867,670 B2 | 1/2018 | Brannan et al. |
| 9,892,564 B1 | 2/2018 | Cvetko et al. |
| 9,907,196 B2 | 2/2018 | Susini et al. |
| 9,935,794 B1 | 4/2018 | Cao et al. |
| 9,971,395 B2 | 5/2018 | Chenault et al. |
| 9,974,595 B2 | 5/2018 | Anderson et al. |
| 9,987,068 B2 | 6/2018 | Anderson et al. |
| 9,987,072 B2 | 6/2018 | McPherson |
| 10,028,402 B1 | 7/2018 | Walker |
| 10,039,589 B2 | 8/2018 | Virshek et al. |
| D832,211 S | 10/2018 | Ladd et al. |
| 10,098,527 B2 | 10/2018 | Weisenburgh, II et al. |
| 10,105,470 B2 | 10/2018 | Reasoner et al. |
| 10,109,835 B2 | 10/2018 | Yang |
| D834,541 S | 11/2018 | You et al. |
| 10,117,702 B2 | 11/2018 | Danziger et al. |
| 10,128,612 B1 | 11/2018 | Casto |
| 10,136,954 B2 | 11/2018 | Johnson et al. |
| 10,137,245 B2 | 11/2018 | Melker et al. |
| 10,147,148 B2 | 12/2018 | Wu et al. |
| 10,166,019 B2 | 1/2019 | Nawana et al. |
| 10,166,061 B2 | 1/2019 | Berry et al. |
| 10,170,205 B2 | 1/2019 | Curd et al. |
| 10,201,365 B2 | 2/2019 | Boudreaux et al. |
| 10,339,496 B2 | 7/2019 | Matson et al. |
| 10,357,184 B2 | 7/2019 | Crawford et al. |
| 10,386,990 B2 | 8/2019 | Shikhman et al. |
| 10,441,345 B2 | 10/2019 | Aldridge et al. |
| 10,449,004 B2 | 10/2019 | Ferro et al. |
| 10,475,244 B2 | 11/2019 | Cvetko et al. |
| 10,493,287 B2 | 12/2019 | Yoder et al. |
| 10,499,847 B2 | 12/2019 | Latimer et al. |
| 10,499,996 B2 | 12/2019 | de Almeida Barreto |
| 10,523,122 B2 | 12/2019 | Han et al. |
| 10,531,579 B2 | 1/2020 | Hsiao et al. |
| D876,466 S | 2/2020 | Kobayashi et al. |
| 10,561,753 B2 | 2/2020 | Thompson et al. |
| 10,602,007 B2 | 3/2020 | Takano |
| 10,610,310 B2 | 4/2020 | Todd et al. |
| 10,624,667 B2 | 4/2020 | Faller et al. |
| 10,624,691 B2 | 4/2020 | Wiener et al. |
| 10,675,100 B2 | 6/2020 | Frushour |
| 10,687,884 B2 | 6/2020 | Wiener et al. |
| 10,729,502 B1 | 8/2020 | Wolf et al. |
| 10,743,872 B2 | 8/2020 | Leimbach et al. |
| 10,758,309 B1 | 9/2020 | Chow et al. |
| 10,758,310 B2 | 9/2020 | Shelton, IV et al. |
| 10,772,673 B2 | 9/2020 | Allen, IV et al. |
| 10,878,966 B2 | 12/2020 | Wolf et al. |
| 10,881,399 B2 | 1/2021 | Shelton, IV et al. |
| 10,898,256 B2 | 1/2021 | Yates et al. |
| 10,925,598 B2 | 2/2021 | Scheib et al. |
| 10,932,705 B2 | 3/2021 | Muhsin et al. |
| 10,932,772 B2 | 3/2021 | Shelton, IV et al. |
| 10,950,982 B2 | 3/2021 | Regnier et al. |
| 10,987,176 B2 | 4/2021 | Poltaretskyi et al. |
| 10,989,724 B1 | 4/2021 | Holmes et al. |
| 11,000,270 B2 | 5/2021 | Scheib et al. |
| 11,006,100 B1 | 5/2021 | Douglas |
| D924,139 S | 7/2021 | Jayme |
| 11,056,244 B2 | 7/2021 | Shelton, IV et al. |
| 11,065,079 B2 | 7/2021 | Wolf et al. |
| 11,071,595 B2 | 7/2021 | Johnson et al. |
| D928,725 S | 8/2021 | Oberkircher et al. |
| D928,726 S | 8/2021 | Asher et al. |
| 11,083,489 B2 | 8/2021 | Fujii et al. |
| 11,114,199 B2 | 9/2021 | Moctezuma De La Barrera |
| 11,116,587 B2 | 9/2021 | Wolf et al. |
| D939,545 S | 12/2021 | Oberkircher et al. |
| 11,218,822 B2 | 1/2022 | Morgan et al. |
| 11,259,793 B2 | 3/2022 | Scheib et al. |
| 11,259,875 B2 | 3/2022 | Boutin et al. |
| 11,272,839 B2 | 3/2022 | Al-Ali et al. |
| 11,284,963 B2 | 3/2022 | Shelton, IV et al. |
| 11,296,540 B2 | 4/2022 | Kirleis et al. |
| 11,298,128 B2 | 4/2022 | Messerly et al. |
| 11,304,763 B2 | 4/2022 | Shelton, IV et al. |
| 11,314,846 B1 | 4/2022 | Colin et al. |
| 11,350,978 B2 | 6/2022 | Henderson et al. |
| 11,369,366 B2 | 6/2022 | Scheib et al. |
| 11,382,699 B2 | 7/2022 | Wassall et al. |
| 11,382,700 B2 | 7/2022 | Calloway et al. |
| 11,419,604 B2 | 8/2022 | Scheib et al. |
| 11,424,027 B2 | 8/2022 | Shelton, IV |
| 11,432,877 B2 | 9/2022 | Nash et al. |
| 11,464,581 B2 | 10/2022 | Calloway |
| 11,471,206 B2 | 10/2022 | Henderson et al. |
| 11,478,820 B2 | 10/2022 | Bales, Jr. et al. |
| 11,504,192 B2 | 11/2022 | Shelton, IV et al. |
| 11,510,720 B2 | 11/2022 | Morgan et al. |
| 11,510,750 B2 | 11/2022 | Dulin et al. |
| 2001/0029315 A1 | 10/2001 | Sakurai et al. |
| 2003/0078631 A1 | 4/2003 | Nelson et al. |
| 2003/0199794 A1 | 10/2003 | Sakurai et al. |
| 2003/0199864 A1 | 10/2003 | Eick |
| 2004/0030328 A1 | 2/2004 | Eggers et al. |
| 2004/0059323 A1 | 3/2004 | Sturm et al. |
| 2004/0111045 A1 | 6/2004 | Sullivan et al. |
| 2004/0164983 A1 | 8/2004 | Khozai |
| 2005/0010209 A1 | 1/2005 | Lee et al. |
| 2005/0013459 A1 | 1/2005 | Maekawa |
| 2005/0113823 A1 | 5/2005 | Reschke et al. |
| 2005/0165390 A1 | 7/2005 | Mauti et al. |
| 2005/0229110 A1 | 10/2005 | Gegner et al. |
| 2005/0251233 A1 | 11/2005 | Kanzius |
| 2006/0082542 A1 | 4/2006 | Morita et al. |
| 2006/0085049 A1 | 4/2006 | Cory et al. |
| 2006/0136622 A1 | 6/2006 | Rouvelin et al. |
| 2006/0149418 A1 | 7/2006 | Anvari |
| 2006/0256516 A1 | 11/2006 | Cho |
| 2007/0076363 A1 | 4/2007 | Liang et al. |
| 2007/0211930 A1 | 9/2007 | Dolwick et al. |
| 2007/0282321 A1 | 12/2007 | Shah et al. |
| 2008/0072896 A1 | 3/2008 | Setzer et al. |
| 2008/0129465 A1 | 6/2008 | Rao |
| 2008/0249377 A1 | 10/2008 | Molducci et al. |
| 2008/0316304 A1 | 12/2008 | Claus et al. |
| 2009/0036884 A1 | 2/2009 | Gregg et al. |
| 2009/0131929 A1 | 5/2009 | Shimizu |
| 2009/0192524 A1 | 7/2009 | Itkowitz et al. |
| 2009/0216091 A1 | 8/2009 | Arndt |

(56) References Cited

U.S. PATENT DOCUMENTS

| | | |
|---|---|---|
| 2009/0234352 A1 | 9/2009 | Behnke et al. |
| 2010/0036405 A1 | 2/2010 | Giordano et al. |
| 2010/0042010 A1 | 2/2010 | Dekker et al. |
| 2010/0053213 A1 | 3/2010 | Ishida et al. |
| 2010/0069939 A1 | 3/2010 | Konishi |
| 2010/0076453 A1 | 3/2010 | Morris et al. |
| 2010/0092006 A1 | 4/2010 | Rosen |
| 2010/0120266 A1 | 5/2010 | Rimborg |
| 2010/0198200 A1 | 8/2010 | Horvath |
| 2010/0312239 A1 | 12/2010 | Sclig |
| 2011/0105895 A1 | 5/2011 | Kornblau et al. |
| 2011/0118748 A1 | 5/2011 | Itkowitz |
| 2011/0125149 A1 | 5/2011 | El-Galley et al. |
| 2011/0130689 A1 | 6/2011 | Cohen et al. |
| 2011/0190588 A1 | 8/2011 | Mckay |
| 2011/0245630 A1 | 10/2011 | St. Pierre et al. |
| 2011/0273465 A1 | 11/2011 | Konishi et al. |
| 2011/0298814 A1 | 12/2011 | Mathew et al. |
| 2011/0306840 A1 | 12/2011 | Allen et al. |
| 2012/0029304 A1 | 2/2012 | Medina et al. |
| 2012/0082036 A1 | 4/2012 | Abedi et al. |
| 2012/0116380 A1 | 5/2012 | Madan et al. |
| 2012/0132661 A1 | 5/2012 | Gu et al. |
| 2013/0031201 A1 | 1/2013 | Kagan et al. |
| 2013/0038707 A1 | 2/2013 | Cunningham et al. |
| 2013/0176220 A1 | 7/2013 | Merschon et al. |
| 2013/0197357 A1 | 8/2013 | Green et al. |
| 2013/0197503 A1 | 8/2013 | Orszulak |
| 2013/0267975 A1 | 10/2013 | Timm et al. |
| 2013/0268283 A1 | 10/2013 | Vann et al. |
| 2013/0303851 A1 | 11/2013 | Griffith et al. |
| 2013/0321159 A1* | 12/2013 | Schofield ............. A01K 11/008 340/573.3 |
| 2014/0009894 A1 | 1/2014 | Yu |
| 2014/0052150 A1 | 2/2014 | Taylor et al. |
| 2014/0058714 A1 | 2/2014 | Boyer |
| 2014/0087573 A1 | 3/2014 | Kroeckel |
| 2014/0155721 A1 | 6/2014 | Hauck et al. |
| 2014/0194683 A1 | 7/2014 | Nakaguchi |
| 2014/0221740 A1 | 8/2014 | Kawula et al. |
| 2014/0226572 A1 | 8/2014 | Thota et al. |
| 2014/0262598 A1 | 9/2014 | Miki et al. |
| 2014/0263552 A1 | 9/2014 | Hall et al. |
| 2014/0343358 A1 | 11/2014 | Hameed et al. |
| 2015/0019259 A1 | 1/2015 | Qureshi et al. |
| 2015/0070388 A1 | 3/2015 | Sheaffer et al. |
| 2015/0190189 A1 | 7/2015 | Yates et al. |
| 2015/0272575 A1 | 10/2015 | Leimbach et al. |
| 2015/0289929 A1 | 10/2015 | Toth et al. |
| 2016/0045247 A1 | 2/2016 | Heim et al. |
| 2016/0058286 A1 | 3/2016 | Joshua et al. |
| 2016/0066184 A1 | 3/2016 | Bhargav-Spantzel et al. |
| 2016/0074096 A1 | 3/2016 | Lieu |
| 2016/0120591 A1 | 5/2016 | Smith et al. |
| 2016/0225192 A1 | 8/2016 | Jones et al. |
| 2016/0287312 A1 | 10/2016 | Tegg et al. |
| 2016/0287337 A1 | 10/2016 | Aram et al. |
| 2017/0000553 A1 | 1/2017 | Wiener et al. |
| 2017/0090507 A1 | 3/2017 | Wiener et al. |
| 2017/0189096 A1 | 7/2017 | Danziger et al. |
| 2017/0202595 A1 | 7/2017 | Shelton, IV |
| 2017/0209225 A1 | 7/2017 | Wu |
| 2017/0251305 A1 | 8/2017 | Fathollahi |
| 2017/0252091 A1 | 9/2017 | Honda |
| 2017/0258526 A1 | 9/2017 | Lang |
| 2017/0296036 A1 | 10/2017 | Newman |
| 2017/0296213 A1 | 10/2017 | Swensgard et al. |
| 2017/0319259 A1 | 11/2017 | Dunning |
| 2017/0333275 A1 | 11/2017 | Itkowitz et al. |
| 2017/0360466 A1 | 12/2017 | Brown et al. |
| 2017/0367766 A1 | 12/2017 | Mahfouz |
| 2018/0014872 A1 | 1/2018 | Dickerson |
| 2018/0032130 A1 | 2/2018 | Meglan |
| 2018/0042659 A1 | 2/2018 | Rupp et al. |
| 2018/0043037 A1 | 2/2018 | Dalma-weiszhausz et al. |
| 2018/0049795 A1 | 2/2018 | Swayze et al. |
| 2018/0065248 A1 | 3/2018 | Barral et al. |
| 2018/0078216 A1 | 3/2018 | Baker et al. |
| 2018/0082480 A1 | 3/2018 | White et al. |
| 2018/0092699 A1 | 4/2018 | Finley |
| 2018/0099161 A1 | 4/2018 | Honda |
| 2018/0173323 A1 | 6/2018 | Harvey et al. |
| 2018/0221005 A1 | 8/2018 | Hamel et al. |
| 2018/0228528 A1 | 8/2018 | Fraasch et al. |
| 2018/0235441 A1 | 8/2018 | Huang et al. |
| 2018/0243573 A1 | 8/2018 | Yoder et al. |
| 2018/0262916 A1 | 9/2018 | Polley et al. |
| 2018/0263557 A1 | 9/2018 | Kahlman |
| 2018/0289338 A1 | 10/2018 | Meador et al. |
| 2018/0317826 A1 | 11/2018 | Muhsin et al. |
| 2018/0333207 A1 | 11/2018 | Moctezuma De la Barrera |
| 2018/0368930 A1 | 12/2018 | Esterberg et al. |
| 2019/0035153 A1 | 1/2019 | Dange |
| 2019/0038362 A1 | 2/2019 | Nash et al. |
| 2019/0069957 A1 | 3/2019 | Barral et al. |
| 2019/0104919 A1 | 4/2019 | Shelton, IV et al. |
| 2019/0125361 A1 | 5/2019 | Shelton, IV et al. |
| 2019/0125451 A1 | 5/2019 | Srimohanarajah et al. |
| 2019/0125454 A1 | 5/2019 | Stokes et al. |
| 2019/0125455 A1 | 5/2019 | Shelton, IV et al. |
| 2019/0125459 A1 | 5/2019 | Shelton et al. |
| 2019/0183576 A1 | 6/2019 | Fahim et al. |
| 2019/0183591 A1 | 6/2019 | Johnson et al. |
| 2019/0200844 A1 | 7/2019 | Shelton, IV et al. |
| 2019/0200906 A1 | 7/2019 | Shelton, IV et al. |
| 2019/0200981 A1 | 7/2019 | Harris et al. |
| 2019/0200987 A1 | 7/2019 | Shelton, IV et al. |
| 2019/0201046 A1 | 7/2019 | Shelton, IV et al. |
| 2019/0201102 A1 | 7/2019 | Shelton, IV et al. |
| 2019/0201114 A1 | 7/2019 | Shelton, IV et al. |
| 2019/0201116 A1 | 7/2019 | Shelton, IV et al. |
| 2019/0201117 A1 | 7/2019 | Yates et al. |
| 2019/0201127 A1 | 7/2019 | Shelton, IV et al. |
| 2019/0201136 A1 | 7/2019 | Shelton, IV et al. |
| 2019/0201137 A1 | 7/2019 | Shelton, IV et al. |
| 2019/0201140 A1 | 7/2019 | Yates et al. |
| 2019/0201158 A1 | 7/2019 | Shelton, IV et al. |
| 2019/0205001 A1 | 7/2019 | Messerly et al. |
| 2019/0206004 A1 | 7/2019 | Shelton, IV et al. |
| 2019/0206562 A1 | 7/2019 | Shelton, IV et al. |
| 2019/0206563 A1 | 7/2019 | Shelton, IV et al. |
| 2019/0206565 A1 | 7/2019 | Shelton, IV |
| 2019/0206569 A1 | 7/2019 | Shelton et al. |
| 2019/0224434 A1 | 7/2019 | Silver et al. |
| 2019/0236840 A1 | 8/2019 | Zuckerman et al. |
| 2019/0247141 A1 | 8/2019 | Batchelor et al. |
| 2019/0278262 A1 | 9/2019 | Taylor et al. |
| 2019/0279524 A1 | 9/2019 | Stoyanov et al. |
| 2019/0290297 A1 | 9/2019 | Haider et al. |
| 2019/0348169 A1 | 11/2019 | Gibby et al. |
| 2019/0371012 A1 | 12/2019 | Flexman et al. |
| 2020/0004487 A1 | 1/2020 | Hanajima et al. |
| 2020/0015895 A1 | 1/2020 | Frielinghaus et al. |
| 2020/0015898 A1 | 1/2020 | Scheib et al. |
| 2020/0015899 A1 | 1/2020 | Scheib et al. |
| 2020/0015900 A1 | 1/2020 | Scheib et al. |
| 2020/0015902 A1 | 1/2020 | Scheib et al. |
| 2020/0015906 A1 | 1/2020 | Scheib et al. |
| 2020/0015907 A1 | 1/2020 | Scheib |
| 2020/0015914 A1 | 1/2020 | Scheib et al. |
| 2020/0015924 A1 | 1/2020 | Scheib et al. |
| 2020/0038120 A1 | 2/2020 | Ziraknejad et al. |
| 2020/0078070 A1 | 3/2020 | Henderson et al. |
| 2020/0078071 A1 | 3/2020 | Asher |
| 2020/0078076 A1 | 3/2020 | Henderson et al. |
| 2020/0078078 A1 | 3/2020 | Henderson et al. |
| 2020/0078080 A1 | 3/2020 | Henderson et al. |
| 2020/0078081 A1 | 3/2020 | Jayme et al. |
| 2020/0078082 A1 | 3/2020 | Henderson et al. |
| 2020/0078083 A1 | 3/2020 | Sprinkle et al. |
| 2020/0078089 A1 | 3/2020 | Henderson et al. |
| 2020/0078110 A1 | 3/2020 | Henderson et al. |
| 2020/0078111 A1 | 3/2020 | Oberkircher et al. |
| 2020/0078112 A1 | 3/2020 | Henderson et al. |

(56) References Cited

U.S. PATENT DOCUMENTS

| | | |
|---|---|---|
| 2020/0078113 A1 | 3/2020 | Sawhney et al. |
| 2020/0078114 A1 | 3/2020 | Asher et al. |
| 2020/0078115 A1 | 3/2020 | Asher et al. |
| 2020/0078116 A1 | 3/2020 | Oberkircher et al. |
| 2020/0078117 A1 | 3/2020 | Henderson et al. |
| 2020/0078118 A1 | 3/2020 | Henderson et al. |
| 2020/0078119 A1 | 3/2020 | Henderson et al. |
| 2020/0078120 A1 | 3/2020 | Aldridge et al. |
| 2020/0081585 A1 | 3/2020 | Petre et al. |
| 2020/0090808 A1 | 3/2020 | Carroll et al. |
| 2020/0093357 A1 | 3/2020 | Scott et al. |
| 2020/0100825 A1 | 4/2020 | Henderson et al. |
| 2020/0100830 A1 | 4/2020 | Henderson et al. |
| 2020/0106220 A1 | 4/2020 | Henderson et al. |
| 2020/0159313 A1 | 5/2020 | Gibby et al. |
| 2020/0237031 A1 | 7/2020 | Daniels et al. |
| 2020/0237452 A1 | 7/2020 | Wolf et al. |
| 2020/0268469 A1 | 8/2020 | Wolf et al. |
| 2020/0268472 A1 | 8/2020 | Wolf et al. |
| 2020/0305924 A1 | 10/2020 | Carroll |
| 2020/0305945 A1 | 10/2020 | Morgan et al. |
| 2020/0315707 A1 | 10/2020 | Venkataraman |
| 2020/0322516 A1 | 10/2020 | Doser et al. |
| 2020/0342228 A1 | 10/2020 | Prevrhal et al. |
| 2020/0359892 A1 | 11/2020 | Rollins et al. |
| 2020/0384287 A1 | 12/2020 | Hetz |
| 2020/0405529 A1 | 12/2020 | Taylor et al. |
| 2021/0000564 A1 | 1/2021 | Amanatullah et al. |
| 2021/0093390 A1 | 4/2021 | Poltaretskyi et al. |
| 2021/0121246 A1 | 4/2021 | Gudalo |
| 2021/0128254 A1 | 5/2021 | Geric et al. |
| 2021/0158779 A1 | 5/2021 | Singh |
| 2021/0169578 A1 | 6/2021 | Calloway et al. |
| 2021/0169581 A1 | 6/2021 | Calloway et al. |
| 2021/0174956 A1 | 6/2021 | Mcginley et al. |
| 2021/0192759 A1 | 6/2021 | Lang |
| 2021/0193681 A1 | 6/2021 | Baek |
| 2021/0196381 A1 | 7/2021 | Eckert et al. |
| 2021/0196383 A1 | 7/2021 | Shelton, IV et al. |
| 2021/0203889 A1 | 7/2021 | Fung et al. |
| 2021/0205020 A1* | 7/2021 | Shelton, IV ............ A61B 90/98 |
| 2021/0212717 A1 | 7/2021 | Yates et al. |
| 2021/0236755 A1 | 8/2021 | King et al. |
| 2021/0259789 A1 | 8/2021 | Wright et al. |
| 2021/0264680 A1 | 8/2021 | Cvetko et al. |
| 2021/0267664 A1 | 9/2021 | Lennartz et al. |
| 2021/0306691 A1 | 9/2021 | Thomas et al. |
| 2021/0307861 A1 | 10/2021 | Hufford et al. |
| 2021/0313052 A1 | 10/2021 | Makrinich et al. |
| 2021/0333864 A1 | 10/2021 | Harvey et al. |
| 2021/0346092 A1 | 11/2021 | Redmond et al. |
| 2021/0369394 A1 | 12/2021 | Braido et al. |
| 2021/0385889 A1 | 12/2021 | Patel |
| 2022/0032442 A1 | 2/2022 | Sheffield et al. |
| 2022/0104896 A1 | 4/2022 | Shelton, IV et al. |
| 2022/0104897 A1 | 4/2022 | Shelton, IV et al. |
| 2022/0104911 A1 | 4/2022 | Shelton, IV et al. |
| 2022/0104912 A1 | 4/2022 | Shelton, IV et al. |
| 2022/0142573 A1 | 5/2022 | Li et al. |
| 2022/0151704 A1 | 5/2022 | Nikou |
| 2022/0155910 A1 | 5/2022 | Jeong |
| 2022/0160428 A1 | 5/2022 | Murray et al. |
| 2022/0188545 A1 | 6/2022 | Nagar et al. |
| 2022/0237878 A1 | 7/2022 | Tartz et al. |
| 2022/0257333 A1* | 8/2022 | Haider ................ G06F 3/017 |
| 2022/0261056 A1 | 8/2022 | Motoi et al. |
| 2022/0283631 A1 | 9/2022 | Peng |
| 2022/0287676 A1 | 9/2022 | Steines et al. |
| 2022/0313338 A1 | 10/2022 | Carroll et al. |
| 2022/0313341 A1 | 10/2022 | Wiener et al. |
| 2022/0313342 A1 | 10/2022 | Leuck et al. |
| 2022/0313357 A1 | 10/2022 | Geresy et al. |
| 2022/0313369 A1 | 10/2022 | Oberkircher et al. |
| 2022/0313370 A1 | 10/2022 | Morgan et al. |
| 2022/0313371 A1 | 10/2022 | Morgan et al. |
| 2022/0313372 A1 | 10/2022 | Herman et al. |
| 2022/0313373 A1 | 10/2022 | Morgan et al. |
| 2022/0317750 A1 | 10/2022 | Jayme et al. |
| 2022/0317751 A1 | 10/2022 | Samuel et al. |
| 2022/0318179 A1 | 10/2022 | Morgan et al. |
| 2022/0319685 A1 | 10/2022 | Vachon et al. |
| 2022/0319693 A1 | 10/2022 | Oberkircher et al. |
| 2022/0321059 A1 | 10/2022 | Samuel et al. |
| 2022/0322523 A1 | 10/2022 | Jayme et al. |
| 2022/0331013 A1 | 10/2022 | Shelton, IV et al. |
| 2022/0331047 A1 | 10/2022 | Shelton, IV et al. |
| 2022/0331048 A1 | 10/2022 | Shelton, IV et al. |
| 2022/0331049 A1 | 10/2022 | Shelton, IV et al. |
| 2022/0331050 A1 | 10/2022 | Shelton, IV et al. |
| 2022/0331051 A1 | 10/2022 | Shelton, IV et al. |
| 2022/0331052 A1 | 10/2022 | Shelton, IV et al. |
| 2022/0331053 A1 | 10/2022 | Kimball et al. |
| 2022/0331054 A1 | 10/2022 | Kimball et al. |
| 2022/0331056 A1 | 10/2022 | Shelton, IV et al. |
| 2022/0334787 A1 | 10/2022 | Jogan et al. |
| 2022/0335604 A1 | 10/2022 | Vanosdoll et al. |
| 2022/0335660 A1 | 10/2022 | Shelton, IV et al. |
| 2022/0335696 A1 | 10/2022 | Shelton, IV et al. |
| 2022/0336097 A1 | 10/2022 | Shelton, IV et al. |
| 2022/0337891 A1 | 10/2022 | Burnley et al. |
| 2022/0338049 A1 | 10/2022 | Ross et al. |
| 2022/0387128 A1 | 12/2022 | Bail et al. |
| 2023/0038130 A1 | 2/2023 | Cvetko et al. |
| 2023/0061534 A1 | 3/2023 | Stopek |
| 2023/0071306 A1 | 3/2023 | Miller et al. |
| 2023/0072423 A1 | 3/2023 | Osborn et al. |
| 2023/0121709 A1 | 4/2023 | Xu et al. |
| 2023/0157757 A1 | 5/2023 | Braido et al. |
| 2023/0157762 A1* | 5/2023 | Braido ................ A61B 34/37 600/424 |
| 2024/0130795 A1 | 4/2024 | Clayton et al. |
| 2024/0138931 A1 | 5/2024 | Lefauconnier |
| 2024/0176441 A1 | 5/2024 | Yang et al. |

FOREIGN PATENT DOCUMENTS

| | | |
|---|---|---|
| EP | 0473987 A1 | 3/1992 |
| EP | 0929263 B1 | 7/1999 |
| EP | 1006892 B1 | 6/2009 |
| EP | 2942023 A2 | 11/2015 |
| EP | 3053279 A1 | 8/2016 |
| EP | 3387982 A1 | 10/2018 |
| JP | 2001029353 A | 2/2001 |
| WO | WO-0112089 A1 | 2/2001 |
| WO | WO-2008053485 A1 | 5/2008 |
| WO | WO-2014031800 A1 | 2/2014 |
| WO | WO-2014071184 A1 | 5/2014 |
| WO | WO-2015047693 A1 | 4/2015 |
| WO | 2016154557 A1 | 9/2016 |
| WO | WO-2017058617 A2 | 4/2017 |
| WO | WO-2018116247 A1 | 6/2018 |
| WO | WO-2019215354 A1 | 11/2019 |
| WO | 2020112217 A1 | 6/2020 |
| WO | 2020180917 A1 | 9/2020 |
| WO | WO-2021044136 A1 | 3/2021 |
| WO | 2021/146313 A1 | 7/2021 |

OTHER PUBLICATIONS

IEEE Std 802.Mar. 2012 (Revision of IEEE Std 802.Mar. 2008, published Dec. 28, 2012.

Sorrells, P., "Application Note AN680. Passive RFID Basics," retrieved from http://ww1.microchip.com/downloads/en/AppNotes/00680b.pdf on Feb. 26, 2020, Dec. 31, 1998, pp. 1-7.

Zhu et al. "Haptic-feedback smart glove as a creative human-machine interface (HMI) for virtual/augmented reality applications," Sci. Adv, vol. 6, No. 19, May 8, 2020.

Qian, et al., "A Review of Augmented Reality in Robotic-Assisted Surgery", IEEE Transactions on Medical Robotics and Bionics, IEEE, vol. 2, No. 1, pp. 1-16, Feb. 2020.

Yu et al., "Skin-Integrated Wireless Haptic Interfaces for Virtual and Augmented Reality," Nature, vol. 575, pp. 473-479, Nov. 21, 2019.

(56) References Cited

OTHER PUBLICATIONS

Li et al., "Wearable Energy Harvesters Generating Electricity From Low-Frequency Human Limb Movement," Microsystems & Nanoengineering (2018), vol. 4(24), 13 pages.

Vávra et al., "Recent Development of Augmented Reality in Surgery: A Review", Journal of Healthcare Engineering, vol. 2017, Article ID 4574172, Aug. 21, 2017, pp. 1-9.

International Search Report and Written Opinion received for PCT Application No. PCT/IB2022/053360, mailed on Jul. 4, 2022, 12 pages.

International Search Report and Written Opinion received for PCT Application No. PCT/IB2022/053362, mailed on Jul. 1, 2022, 13 pages.

International Search Report and Written Opinion received for PCT Application No. PCT/IB2022/053363, mailed on Jun. 30, 2022, 14 pages.

International Search Report and Written Opinion received for PCT Application No. PCT/IB2022/053364, mailed on Jul. 8, 2022, 11 pages.

International Search Report and Written Opinion received for PCT Application No. PCT/IB2022/053365, mailed on Jul. 4, 2022, 16 pages.

International Search Report and Written Opinion received for PCT Application No. PCT/IB2022/053369, mailed on Jul. 13, 2022, 12 pages.

International Search Report and Written Opinion received for PCT Application No. PCT/IB2022/053370, mailed on Jul. 15, 2022, 14 pages.

International Search Report and Written Opinion received for PCT Application No. PCT/IB2022/053371, mailed on Jul. 5, 2022, 12 pages.

International Search Report and Written Opinion received for PCT Application No. PCT/IB2022/053377, mailed on Jun. 22, 2022, 12 pages.

International Search Report and Written Opinion received for PCT Application No. PCT/IB2022/053378, mailed on Jul. 7, 2022, 13 pages.

Invitation to Pay Additional Fees received for PCT Application No. PCT/IB2022/053375, mailed on Jul. 15, 2022, 11 pages.

Zherdeva, et al., "Virtual Scalpel Simulation In The VR and AR Environments", Proceedings Of SPIE, vol. 11310, Feb. 19, 2020, 7 pages.

\* cited by examiner

SYSTEM AND METHOD FOR TRACKING A PORTION OF THE USER AS A PROXY FOR NON-MONITORED INSTRUMENT

CROSS-REFERENCE TO RELATED APPLICATIONS

This application claims the benefit under 35 U.S.C. § 119(e) to U.S. Provisional Patent Application No. 63/174,674, titled HEADS UP DISPLAY, filed Apr. 14, 2021 and to U.S. Provisional Patent Application No. 63/284,326, titled INTRAOPERATIVE DISPLAY FOR SURGICAL SYSTEMS, filed Nov. 30, 2021, the disclosure of each of which is herein incorporated by reference in its entirety.

BACKGROUND

This disclosure relates to apparatuses, systems, and methods for providing an augmented reality interactive experience during a surgical procedure. During a surgical procedure it would be desirable to provide an augmented reality interactive experience of a real-world environment where objects that reside in the real world are enhanced by overlaying computer-generated perceptual information, sometimes across multiple sensory modalities, including visual, auditory, haptic, somatosensory, and olfactory. In the context of this disclosure, images of a surgical field and surgical instruments and other objects appearing in the surgical field are enhanced by overlaying computer-generated visual, auditory, haptic, somatosensory, olfactory, or other sensory information onto the real world images of the surgical field and instruments or other objects appearing in the surgical field. The images may be streamed in real time or may be still images.

Real world surgical instruments include a variety of surgical devices including energy, staplers, or combined energy and stapler. Energy based medical devices include, without limitation, radio-frequency (RF) based monopolar and bipolar electrosurgical instruments, ultrasonic surgical instruments, combination RF electrosurgical and ultrasonic instruments, combination RF electrosurgical and mechanical staplers, among others. Surgical stapler devices are surgical instruments used to cut and staple tissue in a variety of surgical procedures, including bariatric, thoracic, colorectal, gynecologic, urologic and general surgery.

SUMMARY

In various instances, the present disclosure provides a surgical system comprising: a camera system; a unique identifier corresponding to a first surgical staff member, wherein the unique identifier comprises visual indicators located on an exterior surface of an article worn by an operating room participant, wherein the unique identifier is visible to the camera system; an active sensor corresponding to a first surgical staff member, wherein the active sensor captures active tracking data; a surgical hub communicatively coupled to the camera system and the active sensor, wherein the surgical hub comprises a memory and a control circuit, and wherein the control circuit is configured to: receive contextual data from an external source, wherein the contextual data comprises hand positions for surgical instruments used in a surgical procedure; receive passive tracking data from the camera system associated with the first surgical staff member; receive active tracking data from the active sensor associated with the first surgical staff member; determine that the surgical staff member is using a first surgical instrument that is not tracked by the surgical hub; compare the passive tracking data and active tracking data to the hand positions for surgical instruments used in a surgical procedure; determine a specific surgical instrument corresponding to the passive tracking data and the contextual data; and display a virtual element on an augmented reality device, wherein the virtual element comprises a virtual representation of the specific surgical instrument.

In various instances, the present disclosure provides a method for tracking movement of operating room staff members, the method comprising: receiving, by a surgical hub, contextual data from an external source, wherein the contextual data comprises hand positions for surgical instruments used in a surgical procedure; identifying, by the surgical hub, a first unique identifier associated with a first surgical staff member, and a second unique identifier associated with a second surgical staff member; receiving, by the surgical hub, passive tracking data from a camera system associated with the first surgical staff member and the second surgical staff member, wherein the passive tracking data is determined by fiducial markers; receiving, by the surgical hub, active tracking data from an active sensor associated with the first surgical staff member and the second surgical staff member; determining, by the surgical hub, that the first surgical staff member or the second surgical staff member is using a first surgical instrument that is not tracked by the surgical hub; comparing, by the surgical hub, the passive tracking data and active tracking data to the hand positions for surgical instruments used in a surgical procedure; determining, by the surgical hub, a specific surgical instrument corresponding to the passive tracking data and the contextual data; and transmitting, by the surgical hub, virtual element to be displayed on an augmented reality device.

FIGURES

The various aspects described herein, both as to organization and methods of operation, together with further objects and advantages thereof, may best be understood by reference to the following description, taken in conjunction with the accompanying drawings as follows.

Corresponding reference characters indicate corresponding parts throughout the several views. The exemplifications set out herein illustrate various disclosed embodiments, in one form, and such exemplifications are not to be construed as limiting the scope thereof in any manner.

DESCRIPTION

Figure 1:
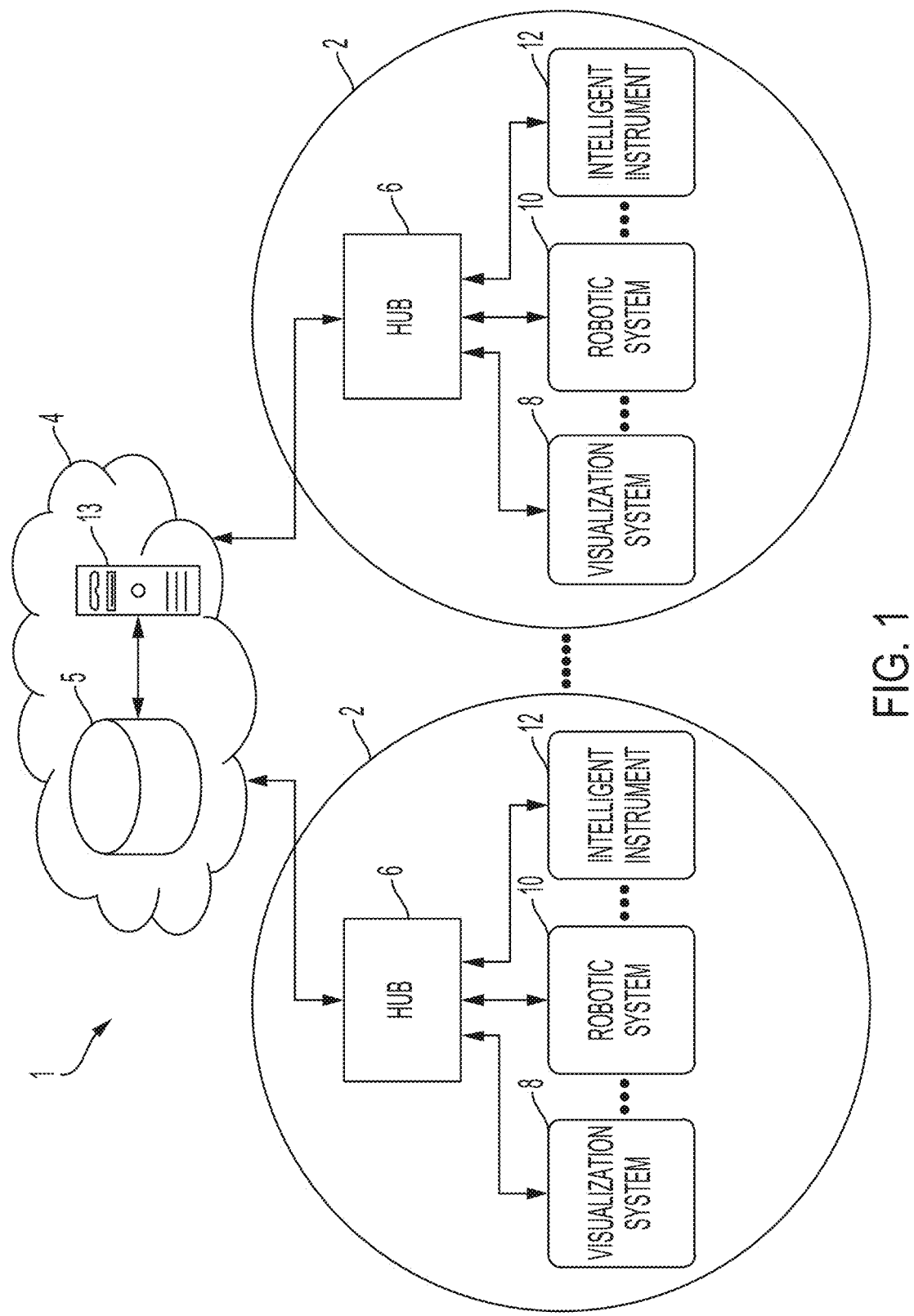
FIG. 1 is a block diagram of a computer-implemented interactive surgical system, according to one aspect of this disclosure.

Applicant of the present application owns the following U.S. Patent Applications filed concurrently herewith, the disclosures of each of which is herein incorporated by reference in its entirety:

U.S. patent application Ser. No. 17/688,589, filed Mar. 7, 2022, titled METHOD FOR INTRAOPERATIVE DISPLAY FOR SURGICAL SYSTEMS;

U.S. patent application Ser. No. 17/688,597, filed Mar. 7, 2022, titled Utilization of surgical data values and situational awareness to control the overlay in surgical field view;

U.S. patent application Ser. No. 17/688,605, filed Mar. 7, 2022, titled SELECTIVE AND ADJUSTABLE MIXED REALITY OVERLAY IN SURGICAL FIELD VIEW;

U.S. patent application Ser. No. 17/688,615, filed Mar. 7, 2022, titled RISK BASED PRIORITIZATION OF DISPLAY ASPECTS IN SURGICAL FIELD VIEW;

U.S. patent application Ser. No. 17/688,626, filed Mar. 7, 2022, titled SYSTEMS AND METHODS FOR CONTROLLING SURGICAL DATA OVERLAY;

U.S. patent application Ser. No. 17/688,633, filed Mar. 7, 2022, titled SYSTEMS AND METHODS FOR CHANGING DISPLAY OVERLAY OF SURGICAL FIELD VIEW BASED ON TRIGGERING EVENTS;

U.S. patent application Ser. No. 17/688,638, filed Mar. 7, 2022, titled CUSTOMIZATION OF OVERLAID DATA AND CONFIGURATION;

U.S. patent application Ser. No. 17/688,641, filed Mar. 7, 2022, titled INDICATION OF THE COUPLE PAIR OF REMOTE CONTROLS WITH REMOTE DEVICES FUNCTIONS;

U.S. patent application Ser. No. 17/688,646, filed Mar. 7, 2022, titled COOPERATIVE OVERLAYS OF INTERACTING INSTRUMENTS WHICH RESULT IN BOTH OVERLAYS BEING EFFECTED;

U.S. patent application Ser. No. 17/688,651, filed Mar. 7, 2022, titled ANTICIPATION OF INTERACTIVE UTILIZATION OF COMMON DATA OVERLAYS BY DIFFERENT USERS;

U.S. patent application Ser. No. 17/688,653, filed Mar. 7, 2022, titled MIXING DIRECTLY VISUALIZED WITH RENDERED ELEMENTS TO DISPLAY BLENDED ELEMENTS AND ACTIONS HAPPENING ON-SCREEN AND OFF-SCREEN;

U.S. patent application Ser. No. 17/688,656, filed Mar. 7, 2022, titled UTILIZING CONTEXTUAL PARAMETERS OF ONE OR MORE SURGICAL DEVICES TO PREDICT A FREQUENCY INTERVAL FOR DISPLAYING SURGICAL INFORMATION;

U.S. patent application Ser. No. 17/688,660, filed Mar. 7, 2022, titled COOPERATION AMONG MULTIPLE DISPLAY SYSTEMS TO PROVIDE A HEALTHCARE USER CUSTOMIZED INFORMATION;

U.S. patent application Ser. No. 17/688,663, filed Mar. 7, 2022, titled INTRAOPERATIVE DISPLAY FOR SURGICAL SYSTEMS;

U.S. patent application Ser. No. 17/688,667, filed Mar. 7, 2022, titled ADAPTATION AND ADJUSTABILITY OR OVERLAID INSTRUMENT INFORMATION FOR SURGICAL SYSTEMS; and.

U.S. patent application Ser. No. 17/688,671, filed Mar. 7, 2022, titled MIXED REALITY FEEDBACK SYSTEMS THAT COOPERATE TO INCREASE EFFICIENT PERCEPTION OF COMPLEX DATA FEEDS.

Applicant of this application owns the following U.S. Patent Applications, the disclosure of each of which is herein incorporated by reference in its entirety:

U.S. patent application Ser. No. 16/209,423, titled METHOD OF COMPRESSING TISSUE WITHIN A STAPLING DEVICE AND SIMULTANEOUSLY DISPLAYING THE LOCATION OF THE TISSUE WITHIN THE JAWS, now U.S. Patent Publication No. US-2019-0200981-A1;

U.S. patent application Ser. No. 16/209,453, titled METHOD FOR CONTROLLING SMART ENERGY DEVICES, now U.S. Patent Publication No. US-2019-0201046-A1.

Before explaining various aspects of surgical devices and generators in detail, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

Various aspects are directed to onscreen displays for surgical systems for a variety of energy and surgical stapler based medical devices. Energy based medical devices include, without limitation, radio-frequency (RF) based monopolar and bipolar electrosurgical instruments, ultrasonic surgical instruments, combination RF electrosurgical and ultrasonic instruments, combination RF electrosurgical and mechanical staplers, among others. Surgical stapler devices include and combined surgical staplers with electrosurgical and/or ultrasonic devices. Aspects of the ultrasonic surgical devices can be configured for transecting and/or coagulating tissue during surgical procedures, for example. Aspects of the electrosurgical devices can be configured for transecting, coagulating, sealing, welding and/or desiccating tissue during surgical procedures, for example. Aspects of the surgical stapler devices can be configured for transecting and stapling tissue during surgical procedures and in some aspects, the surgical stapler devices may be configured to delivery RF energy to the tissue during surgical procedures. Electrosurgical devices are configured to deliver therapeutic and/or nontherapeutic RF energy to the tissue. Elements of surgical staplers, electrosurgical, and ultrasonic devices may be used in combination in a single surgical instrument.

In various aspects, the present disclosure provides onscreen displays of real time information to the OR team during a surgical procedure. In accordance with various aspects of the present disclosure, many new and unique onscreen displays are provided to display onscreen a variety of visual information feedback to the OR team. According to the present disclosure, visual information may comprise one or more than one of various visual media with or without sound. Generally, visual information comprises still photography, motion picture photography, video or audio recording, graphic arts, visual aids, models, display, visual presentation services, and the support processes. The visual information can be communicated on any number of display options such as the primary OR screen, the energy or surgical stapler device itself, a tablet, augmented reality glasses, among others, for example.

In various aspects, the present disclosure provides a large list of potential options to communicate visual information in real time to the OR team, without overwhelming the OR team with too much visual information. For example, in various aspects, the present disclosure provides onscreen displays of visual information to enable the surgeon, or other members of the OR team, to selectively activate onscreen displays such as icons surrounding the screen option to manage a wealth of visual information. One or a combination of factors can be used to determine the active display, these may include energy based (e.g., electrosurgical, ultrasonic) or mechanical based (e.g., staplers) surgical devices in use, the estimated risk associated with a given display, the experience level of the surgeon and the surgeons' choice among other things. In other aspect, the visual information may comprises rich data overlaid or superimposed into the surgical field of view to manage the visual information. In various aspects described hereinbelow, comprise superimposed imagery that requires video analysis and tracking to properly overlay the data. Visual information data communicated in this manner, as opposed to static icons, may provide additional useful visual information in a more concise and easy to understand way to the OR team.

In various aspects, the present disclosure provides techniques for selectively activating onscreen displays such as icons surrounding the screen to manage visual information during a surgical procedure. In other aspects, the present disclosure provides techniques for determining the active display using one or a combination of factors. In various aspects, the techniques according to the resent disclosure may comprise selecting the energy based or mechanical based surgical device in use as the active display, estimating risk associated with a given display, utilizing the experience level of the surgeon or OR team making the selection, among other things.

In other aspects, the techniques according to the present disclosure may comprise overlaying or superimposing rich data onto the surgical field of view to manage the visual information. A number of the display arrangements described by the present disclosure involve overlaying various visual representations of surgical data onto a livestream of a surgical field. As used herein the term overlay comprises a translucent overlay, a partial overlay, and/or a moving overlay. Graphical overlays may be in the form of a transparent graphic, semitransparent graphic, or opaque graphic, or a combination of transparent, semitransparent, and opaque elements or effects. Moreover, the overlay can be positioned on, or at least partially on, or near an object in the surgical field such as, for example, an end effector and/or a critical surgical structure. Certain display arrangements may comprise a change in one or more display elements of an overlay including a change in color, size, shape, display time, display location, display frequency, highlighting, or a combination thereof, based on changes in display priority values. The graphical overlays are rendered on top of the active display monitor to convey important information quickly and efficiently to the OR team.

In other aspects, the techniques according to the present disclosure may comprise superimposing imagery that requires analyzing video and tracking for properly overlaying the visual information data. In other aspects, the techniques according to the present disclosure may comprise communicating rich visual information, as opposed to simple static icons, to provide additional visual information to the OR team in a more concise and easy to understand manner. In other aspects, the visual overlays may be used in combination with audible and/or somatosensory overlays such as thermal, chemical, and mechanical devices, and combinations thereof.

The following description is directed generally to apparatuses, systems, and methods that provide an augmented reality (AR) interactive experience during a surgical procedure. In this context, images of a surgical field and surgical instruments and other objects appearing in the surgical field are enhanced by overlaying computer-generated visual, auditory, haptic, somatosensory, olfactory, or other sensory information onto the real world images of the surgical field, instruments, and/or other objects appearing in the surgical field. The images may be streamed in real time or may be still images. Augmented reality is a technology for rendering and displaying virtual or "augmented" virtual objects, data, or visual effects overlaid on a real environment. The real environment may include a surgical field. The virtual objects overlaid on the real environment may be represented as anchored or in a set position relative to one or more aspects of the real environment. In a non-limiting example, if a real world object exits the real environment field of view, a virtual object anchored to the real world object would also exit the augmented reality field of view.

A number of the display arrangements described by the present disclosure involve overlaying various visual representations of surgical data onto a livestream of a surgical field. As used herein the term overlaying comprises a translucent overlay, a partial overlay, and/or a moving overlay. Moreover, the overlay can be positioned on, or at least partially on, or near an object in the surgical field such as, for example, an end effector and/or a critical surgical structure. Certain display arrangements may comprise a change in one or more display elements of an overlay including a change in color, size, shape, display time, display location, display frequency, highlighting, or a combination thereof, based on changes in display priority values.

As described herein AR is an enhanced version of the real physical world that is achieved through the use of digital visual elements, sound, or other sensory stimuli delivered via technology. Virtual Reality (VR) is a computer-generated environment with scenes and objects that appear to be real, making the user feel they are immersed in their surroundings. This environment is perceived through a device known as a Virtual Reality headset or helmet. Mixed reality (MR) and AR are both considered immersive technologies, but they aren't the same. MR is an extension of Mixed reality that allows real and virtual elements to interact in an environment. While AR adds digital elements to a live view often by using a camera, an MR experience combines elements of both AR and VR, where real-world and digital objects interact.

In an AR environment, one or more computer-generated virtual objects may be displayed along with one or more real (i.e., so-called "real world") elements. For example, a real-time image or video of a surrounding environment may be shown on a computer screen display with one or more overlaying virtual objects. Such virtual objects may provide complementary information relating to the environment or generally enhance a user's perception and engagement with the environment. Conversely, the real-time image or video of the surrounding environment may additionally or alternatively enhance a user's engagement with the virtual objects shown on the display.

The apparatuses, systems, and methods in the context of this disclosure enhance images received from one or more imaging devices during a surgical procedure. The imaging devices may include a variety of scopes used during non-invasive and minimally invasive surgical procedures, an AR device, and/or a camera to provide images during open surgical procedures. The images may be streamed in real time or may be still images. The apparatuses, systems, and methods provide an augmented reality interactive experience by enhancing images of the real world surgical environment by overlaying virtual objects or representations of data and/or real objects onto the real surgical environment. The augmented reality experience may be viewed on a display and/or an AR device that allows a user to view the overlaid virtual objects onto the real world surgical environment. The display may be located in the operating room or remote from the operating room. AR devices are worn on the head of the surgeon or other operating room personnel and typically include two stereo-display lenses or screens, including one for each eye of the user. Natural light is permitted to pass through the two transparent or semi-transparent display lenses such that aspects of the real environment are visible while also projecting light to make virtual objects visible to the user of the AR device.

Two or more displays and AR devices may be used in a coordinated manner, for example with a first display or AR device controlling one or more additional displays or AR devices in a system with defined roles. For example, when activating display or an AR device, a user may select a role (e.g., surgeon, surgical assistant, nurse, etc., during a surgical procedure) and the display or AR device may display information relevant to that role. For example, a surgical assistant may have a virtual representation of an instrument displayed that the surgeon needs to perform for a next step of a surgical procedure. A surgeon's focus on the current step may see different information displayed than the surgical assistant.

Although there are many known onscreen displays and alerts, this disclosure provides many new and unique augmented reality interactive experiences during a surgical procedure. Such augmented reality interactive experiences include visual, auditory, haptic, somatosensory, olfactory, or other sensory feedback information to the surgical team inside or outside the operating room. The virtual feedback information overlaid onto the real world surgical environment may be provided to an operating room (OR) team, including personnel inside the OR including, without limitation, the operating surgeon, assistants to the surgeon, a scrub person, an anesthesiologist and a circulating nurse, among others, for example. The virtual feedback information can be communicated on any number of display options such as a primary OR screen display, an AR device, the energy or surgical stapler instrument, a tablet, augmented reality glasses, device etc.

FIG. 1 depicts a computer-implemented interactive surgical system 1 that includes one or more surgical systems 2 and a cloud-based system 4. The cloud-based system 4 may include a remote server 13 coupled to a storage device 5. Each surgical system 2 includes at least one surgical hub 6 in communication with the cloud 4. For example, the surgical system 2 may include a visualization system 8, a robotic system 10, and handheld intelligent surgical instruments 12, each configured to communicate with one another and/or the hub 6. In some aspects, a surgical system 2 may include an M number of hubs 6, an N number of visualization systems 8, an O number of robotic systems 10, and a P number of handheld intelligent surgical instruments 12, where M, N, O, and P are integers greater than or equal to one. The computer-implemented interactive surgical system 1 may be configured to provide an augmented reality interactive experience during a surgical procedure as described herein.

Figure 2:
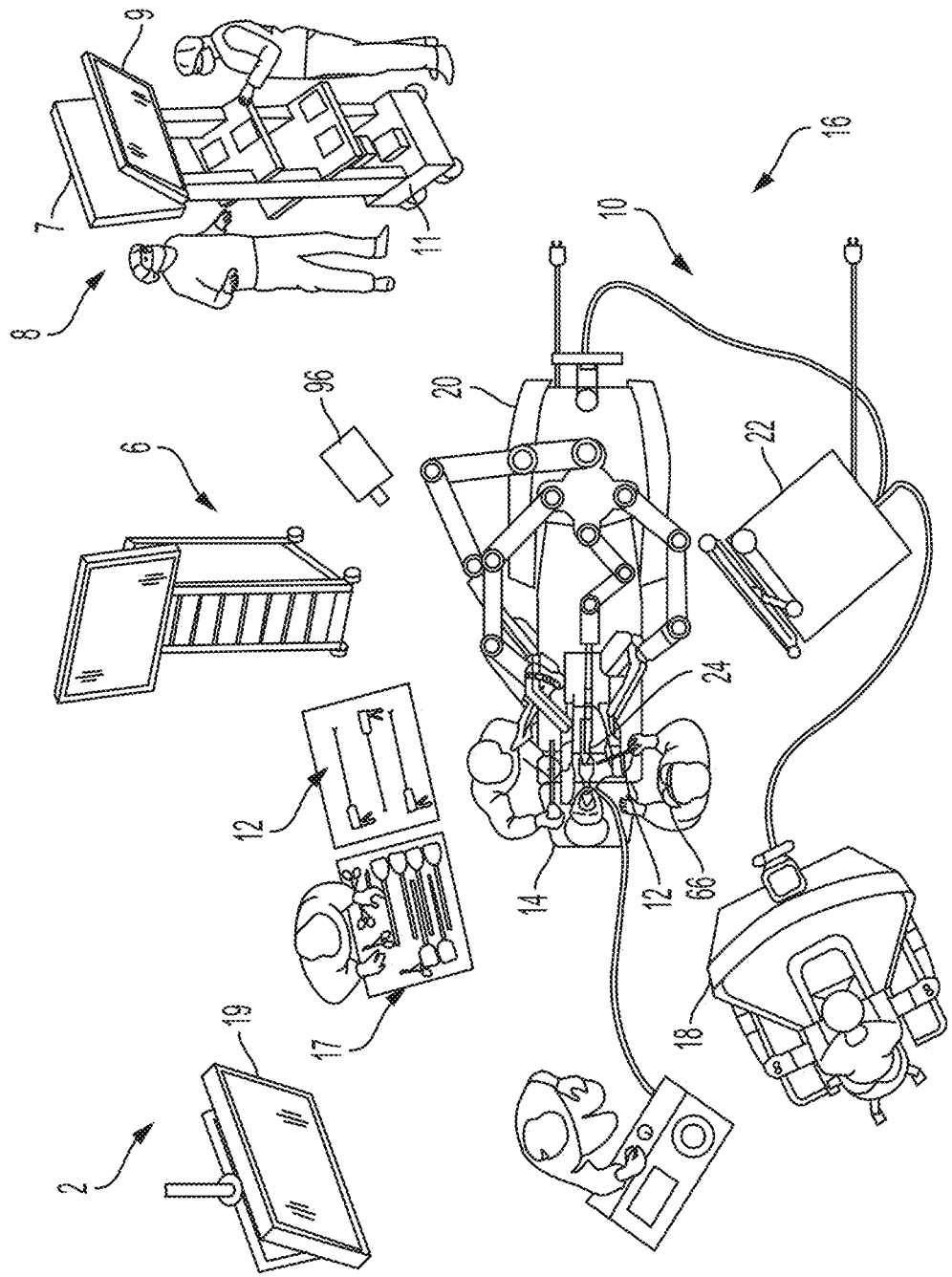
FIG. 2 is a surgical system being used to perform a surgical procedure in an operating room, according to one aspect of this disclosure.

FIG. 2 depicts an example of a surgical system 2 to perform a surgical procedure on a patient lying down on an operating table 14 in a surgical operating room 16. A robotic system 10 is used in the surgical procedure as a part of the surgical system 2. The robotic system 10 includes a surgeon's console 18, a patient side cart 20 (surgical robot), and a surgical robotic hub 22. The patient side cart 20 can manipulate at least one removably coupled surgical tool 17 through a minimally invasive incision in the body of the patient while the surgeon views the surgical site through the surgeon's console 18 or an augmented reality (AR) device 66 worn by the surgeon. An image (e.g., still or live streamed in real time) of the surgical site during a minimally invasive procedure can be obtained by a medical imaging device 24. The patient side cart 20 can manipulate the imaging device 24 to orient the imaging device 24. An image of an open surgical procedure can be obtained by a medical imaging device 96. The robotic hub 22 processes the images of the surgical site for subsequent display on the surgeon's console 18 or the AR device 66 worn by the surgeon, or other person in the surgical operating room 16.

The optical components of the imaging device 24, 96 or AR device 66 may include one or more illumination sources and/or one or more lenses. The one or more illumination sources may be directed to illuminate portions of the surgical field. One or more image sensors may receive light reflected or refracted from tissue and instruments in the surgical field.

In various aspects, the imaging device 24 is configured for use in a minimally invasive surgical procedure. Examples of imaging devices suitable for use with this disclosure include, but not limited to, an arthroscope, angioscope, bronchoscope, choledochoscope, colonoscope, cytoscope, duodenoscope, enteroscope, esophagogastro-duodenoscope (gastroscope), endoscope, laryngoscope, nasopharyngoneproscope, sigmoidoscope, thoracoscope, and ureteroscope. In various aspects, the imaging device 96 is configured for use in an open (invasive) surgical procedure.

In various aspects, the visualization system 8 includes one or more imaging sensors, one or more image-processing units, one or more storage arrays, and one or more displays that are strategically arranged with respect to the sterile field. In one aspect, the visualization system 8 includes an interface for HL7, PACS, and EMR. In one aspect, the imaging device 24 may employ multi-spectrum monitoring to discriminate topography and underlying structures. A multispectral image captures image data within specific wavelength ranges in the electromagnetic spectrum. Wavelengths are separated by filters or instruments sensitive to particular wavelengths, including light from frequencies beyond the visible light range, e.g., IR and ultraviolet. Spectral imaging can extract information not visible to the human eye. Multispectrum monitoring can relocate a surgical field after a surgical task is completed to perform tests on the treated tissue.

FIG. 2 depicts a primary display 19 positioned in the sterile field to be visible to an operator at the operating table 14. A visualization tower 11 is positioned outside the sterile field and includes a first non-sterile display 7 and a second non-sterile display 9, which face away from each other. The visualization system 8, guided by the hub 6, is configured to utilize the displays 7, 9, 19 to coordinate information flow to operators inside and outside the sterile field. For example, the hub 6 may cause the visualization system 8 to display AR images of the surgical site, as recorded by an imaging device 24, 96 on a non-sterile display 7, 9, or through the AR device 66, while maintaining a live feed of the surgical site on the primary display 19 or the AR device 66. The non-sterile display 7, 9 can permit a non-sterile operator to perform a diagnostic step relevant to the surgical procedure, for example.

Figure 3:
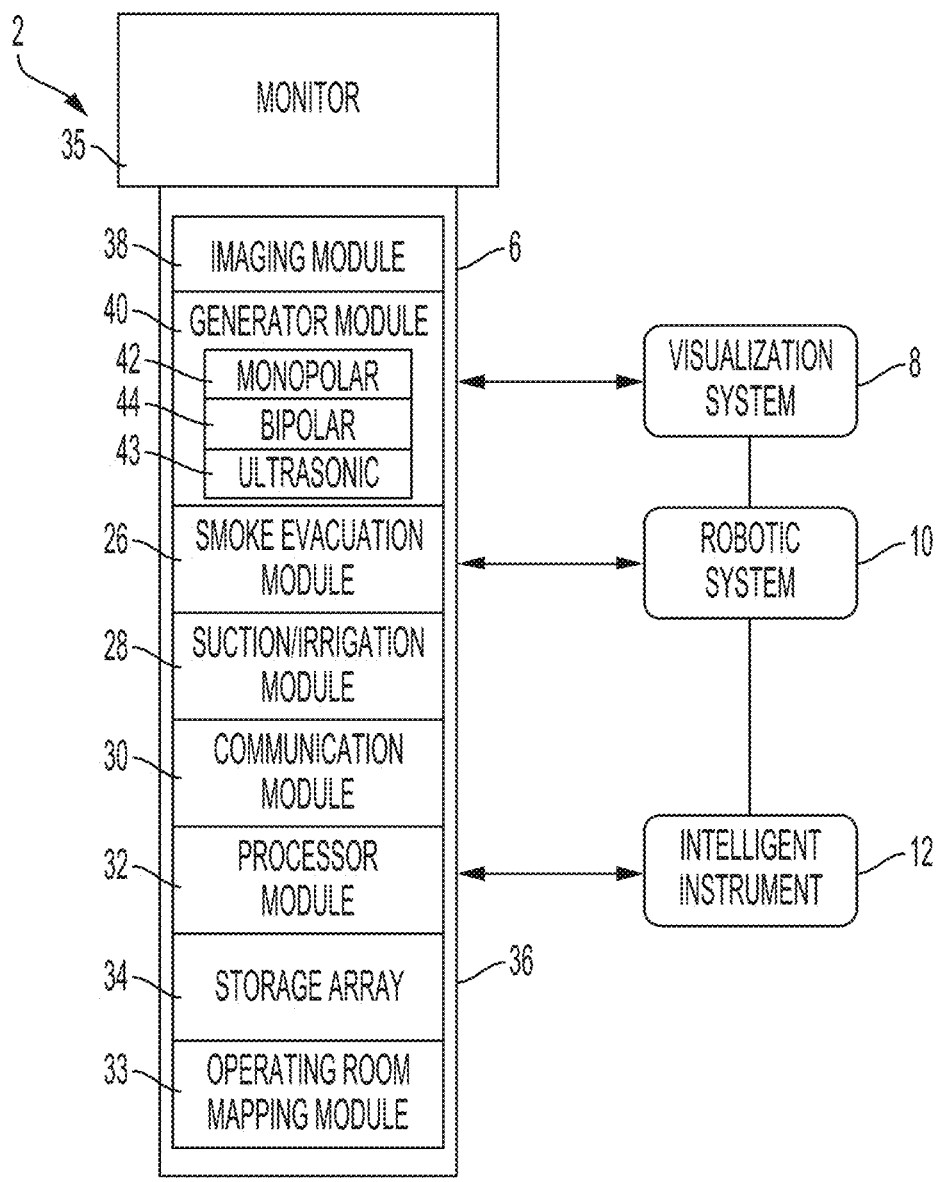
FIG. 3 is a surgical hub paired with a visualization system, a robotic system, and an intelligent instrument, according to one aspect of this disclosure.
Figure 10:
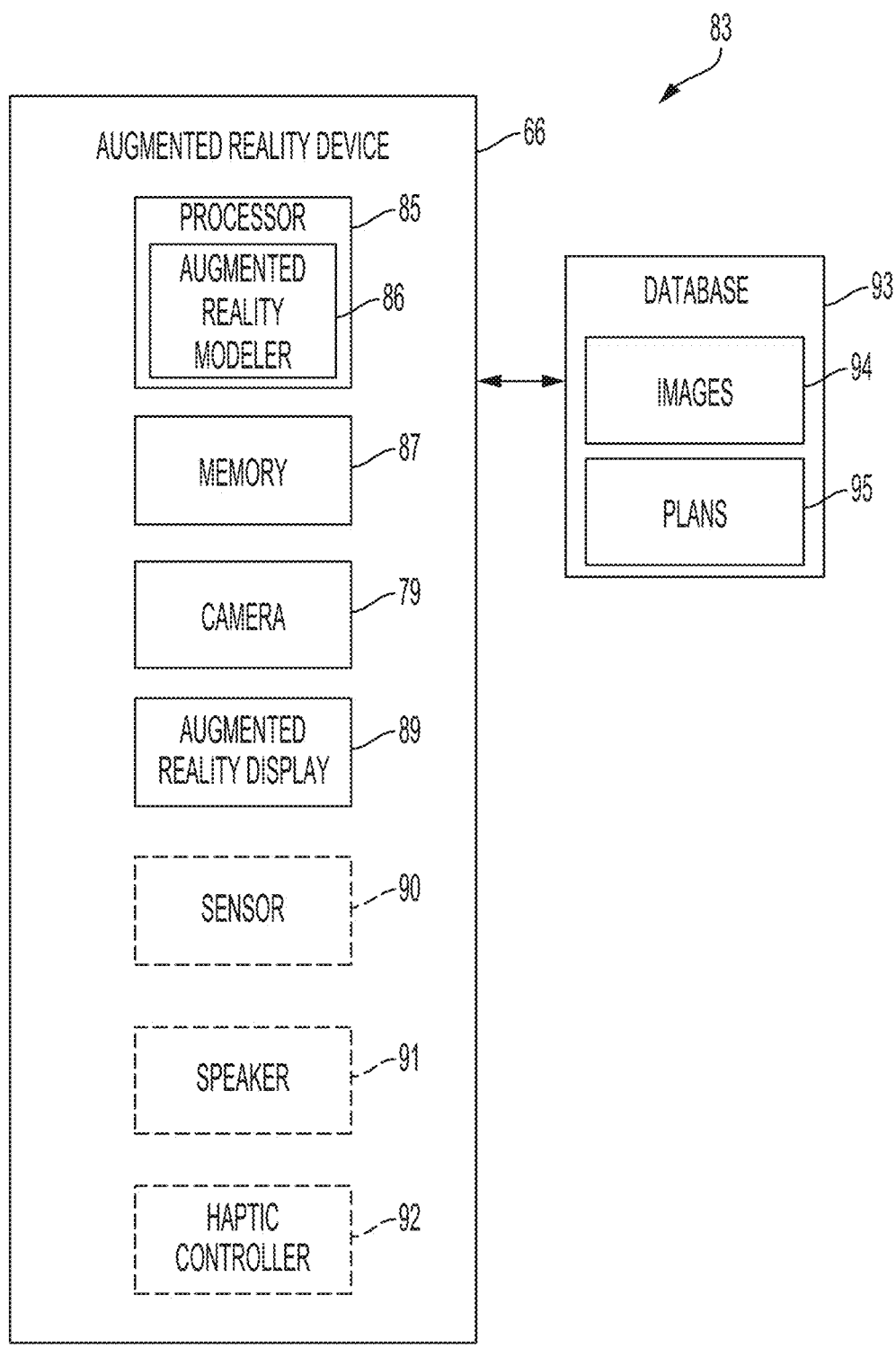
FIG. 10 illustrates a system for augmenting surgical instrument information using an augmented reality display, according to one aspect of this disclosure.

FIG. 3 depicts a hub 6 in communication with a visualization system 8, a robotic system 10, and a handheld intelligent surgical instrument 12. The hub 6 includes a hub display 35, an imaging module 38, a generator module 40, a communication module 30, a processor module 32, a storage array 34, and an operating room mapping module 33. The hub 6 further includes a smoke evacuation module 26 and/or a suction/irrigation module 28. In various aspects, the imaging module 38 comprises an AR device 66 and the processor module 32 comprises an integrated video processor and an augmented reality modeler (e.g., as shown in FIG. 10). A modular light source may be adapted for use with various imaging devices. In various examples, multiple imaging devices may be placed at different positions in the surgical field to provide multiple views (e.g., non-invasive, minimally invasive, invasive or open surgical procedures). The imaging module 38 can be configured to switch between the imaging devices to provide an optimal view. In various aspects, the imaging module 38 can be configured to integrate the images from the different imaging devices and provide an augmented reality interactive experience during a surgical procedure as described herein.

Figure 4:
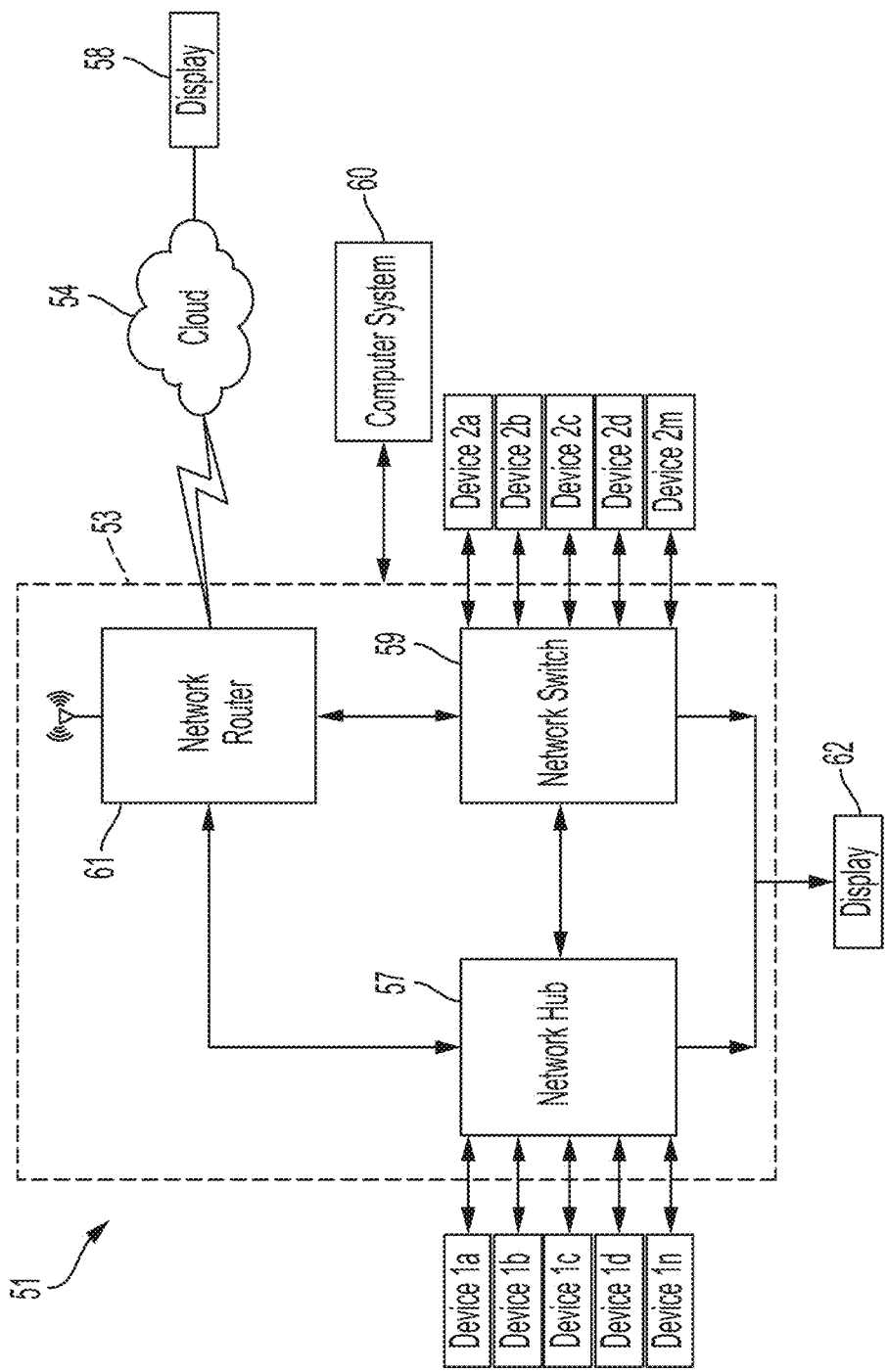
FIG. 4 illustrates a surgical data network comprising a modular communication hub configured to connect modular devices located in one or more operating theaters of a healthcare facility, or any room in a healthcare facility specially equipped for surgical operations, to the cloud, according to one aspect of this disclosure.

FIG. 4 shows a surgical data network 51 comprising a modular communication hub 53 configured to connect modular devices located in one or more operating theaters/rooms of a healthcare facility to a cloud-based system. The cloud 54 may include a remote server 63 (FIG. 5) coupled to a storage device 55. The modular communication hub 53 comprises a network hub 57 and/or a network switch 59 in communication with a network router 61. The modular communication hub 53 is coupled to a local computer system 60 to process data. Modular devices 1a-1n in the operating theater may be coupled to the modular communication hub 53. The network hub 57 and/or the network switch 59 may be coupled to a network router 61 to connect the devices 1a-1n to the cloud 54 or the local computer system 60. Data associated with the devices 1a-1n may be transferred to cloud-based computers via the router for remote data processing and manipulation. The operating theater devices 1a-1n may be connected to the modular communication hub 53 over a wired channel or a wireless channel. The surgical data network 51 environment may be employed to provide an augmented reality interactive experience during a surgical procedure as described herein and in particular providing augmented images if the surgical field to one or more than one remote display 58.

Figure 5:
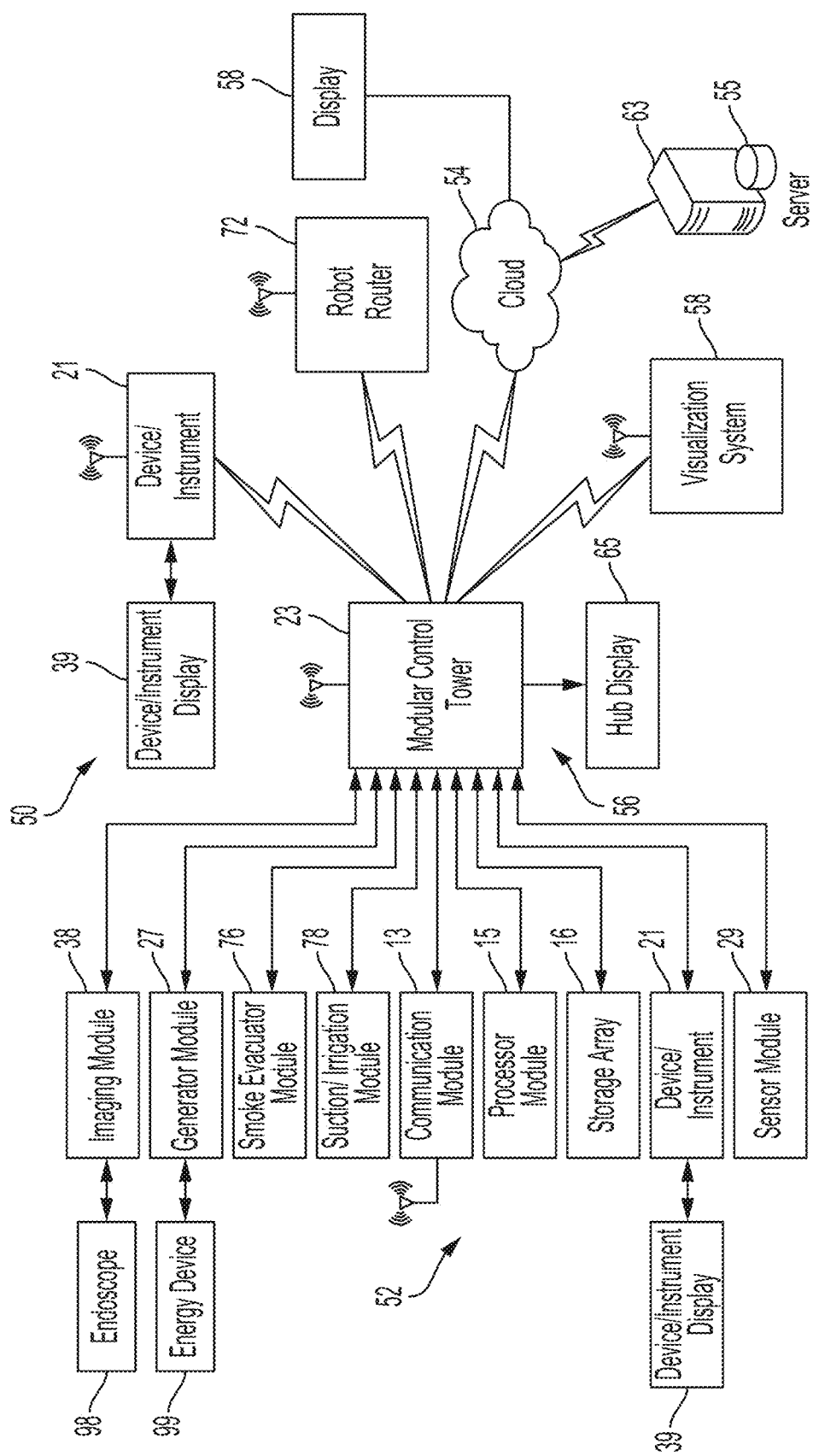
FIG. 5 illustrates a computer-implemented interactive surgical system, according to one aspect of this disclosure.
Figure 6:
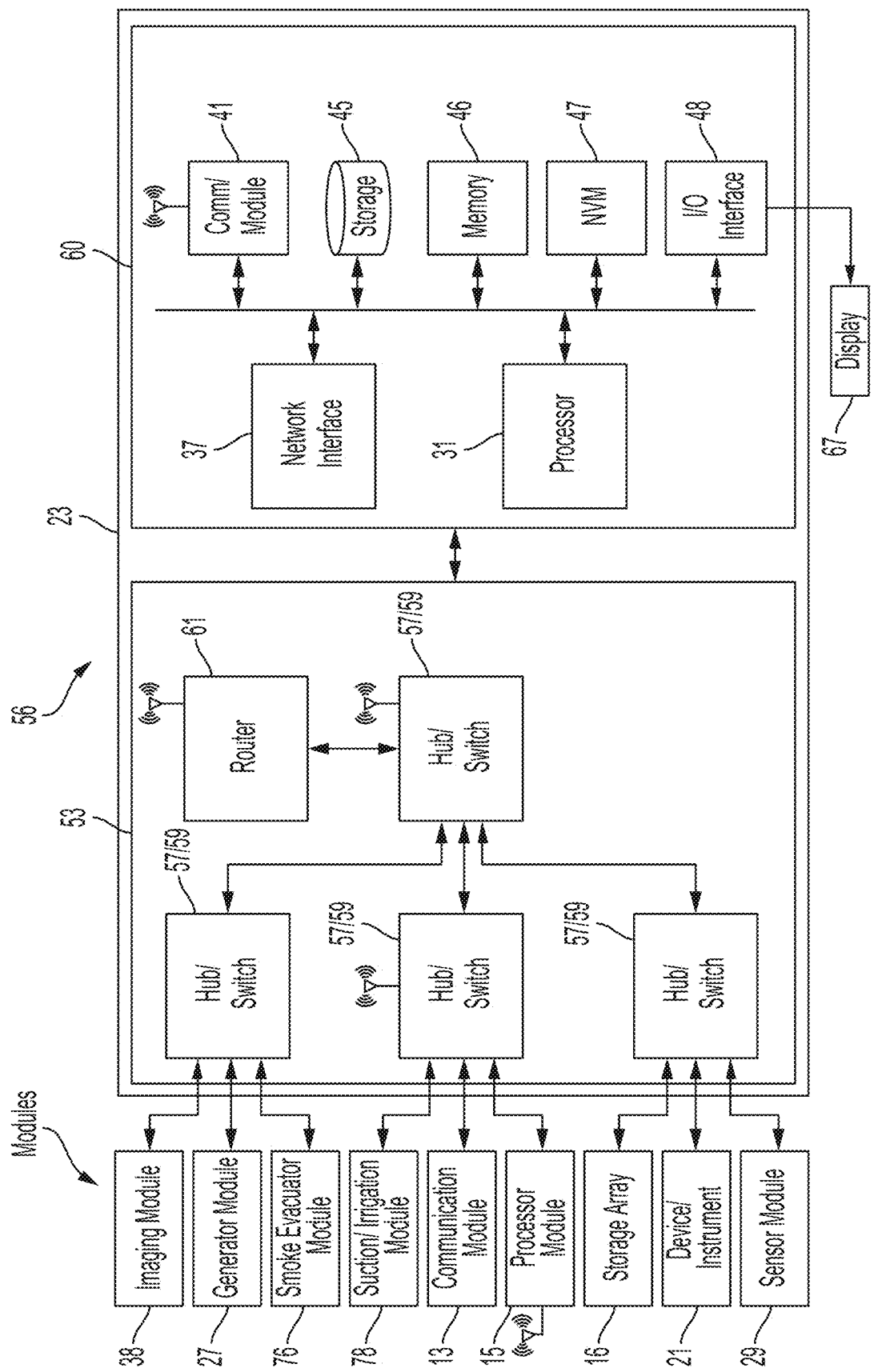
FIG. 6 illustrates a surgical hub comprising a plurality of modules coupled to the modular control tower, according to one aspect of this disclosure.

FIG. 5 illustrates a computer-implemented interactive surgical system 50. The computer-implemented interactive surgical system 50 is similar in many respects to the computer-implemented interactive surgical system 1. The computer-implemented interactive surgical system 50 includes one or more surgical systems 52, which are similar in many respects to the surgical systems 2. Each surgical system 52 includes at least one surgical hub 56 in communication with a cloud 54 that may include a remote server 63. In one aspect, the computer-implemented interactive surgical system 50 comprises a modular control tower 23 connected to multiple operating theater devices such as, for example, intelligent surgical instruments, robots, and other computerized devices located in the operating theater. As shown in FIG. 6, the modular control tower 23 comprises a modular communication hub 53 coupled to a computer system 60.

Back to FIG. 5, the modular control tower 23 is coupled to an imaging module 38 that is coupled to an endoscope 98, a generator module 27 that is coupled to an energy device 99, a smoke evacuator module 76, a suction/irrigation module 78, a communication module 13, a processor module 15, a storage array 16, a smart device/instrument 21 optionally coupled to a display 39, and a sensor module 29. The operating theater devices are coupled to cloud computing resources such as server 63, data storage 55, and displays 58 via the modular control tower 23. A robot hub 72 also may be connected to the modular control tower 23 and to the servers 63, data storage 55, and displays 58. The devices/instruments 21, visualization systems 58, among others, may be coupled to the modular control tower 23 via wired or wireless communication standards or protocols, as described herein. The modular control tower 23 may be coupled to a hub display 65 (e.g., monitor, screen) to display augmented images received comprising overlaid virtual objects on the real surgical field received from the imaging module 38, device/instrument display 39, and/or other visualization systems 58. The hub display 65 also may display data received from devices connected to the modular control tower 23 in conjunction with images and overlaid images.

FIG. 6 illustrates a surgical hub 56 comprising a plurality of modules coupled to the modular control tower 23. The modular control tower 23 comprises a modular communication hub 53, e.g., a network connectivity device, and a computer system 60 to provide local processing, visualization, and imaging of augmented surgical information, for example. The modular communication hub 53 may be connected in a tiered configuration to expand the number of modules (e.g., devices) that may be connected to the modular communication hub 53 and transfer data associated with the modules to the computer system 60, cloud computing resources, or both. Each of the network hubs/switches 57, 59 in the modular communication hub 53 may include three downstream ports and one upstream port. The upstream network hub/switch 57, 59 is connected to a processor 31 to provide a communication connection to the cloud computing resources and a local display 67. Communication to the cloud 54 may be made either through a wired or a wireless communication channel.

The computer system 60 comprises a processor 31 and a network interface 37. The processor 31 is coupled to a communication module 41, storage 45, memory 46, non-volatile memory 47, and input/output interface 48 via a system bus. The system bus can be any of several types of bus structure(s) including the memory bus or memory controller, a peripheral bus or external bus, and/or a local bus using any variety of available bus architectures.

The processor 31 comprises an augmented reality modeler (e.g., as shown in FIG. 10) and may be implemented as a single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHZ, a prefetch buffer to improve performance above 40 MHz, a 32 KB single-cycle serial random access memory (SRAM), an internal read-only memory (ROM) loaded with StellarisWare® software, a 2 KB electrically erasable programmable read-only memory (EEPROM), and/or one or more pulse width modulation (PWM) modules, one or more quadrature encoder inputs (QEI) analogs, one or more 12-bit analog-to-digital converters (ADCs) with 12 analog input channels, details of which are available for the product datasheet.

The system memory includes volatile memory and non-volatile memory. The basic input/output system (BIOS), containing the basic routines to transfer information between elements within the computer system, such as during start-up, is stored in non-volatile memory. For example, the non-volatile memory can include ROM, programmable ROM (PROM), electrically programmable ROM (EPROM), EEPROM, or flash memory. Volatile memory includes random-access memory (RAM), which acts as external cache memory. Moreover, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM).

The computer system 60 also includes removable/non-removable, volatile/non-volatile computer storage media, such as for example disk storage. The disk storage includes, but is not limited to, devices like a magnetic disk drive, floppy disk drive, tape drive, Jaz drive, Zip drive, LS-60 drive, flash memory card, or memory stick. In addition, the disk storage can include storage media separately or in combination with other storage media including, but not limited to, an optical disc drive such as a compact disc ROM device (CD-ROM), compact disc recordable drive (CD-R Drive), compact disc rewritable drive (CD-RW Drive), or a digital versatile disc ROM drive (DVD-ROM). To facilitate the connection of the disk storage devices to the system bus, a removable or non-removable interface may be employed.

In various aspects, the computer system 60 of FIG. 6, the imaging module 38 and/or visualization system 58, and/or the processor module 15 of FIGS. 4-6, may comprise an image processor, image-processing engine, graphics processing unit (GPU), media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

Figure 7:
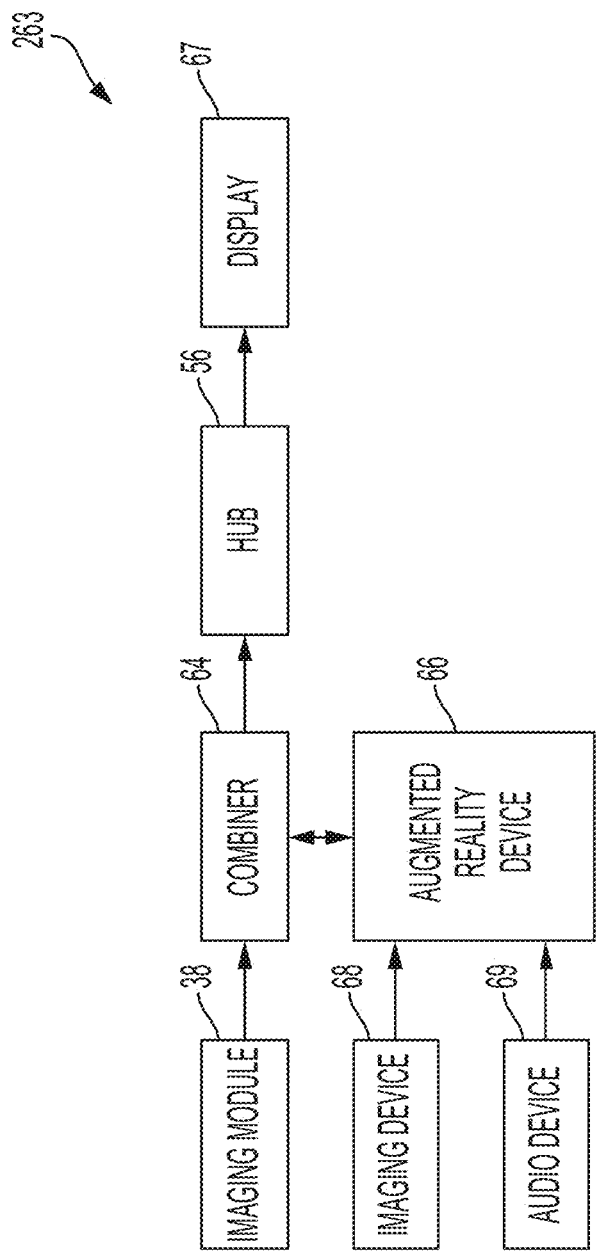
FIG. 7 illustrates an augmented reality (AR) system comprising an intermediate signal combiner positioned in the communication path between an imaging module and a surgical hub display, according to one aspect of this disclosure.

FIG. 7 illustrates an augmented reality system 263 comprising an intermediate signal combiner 64 positioned in the communication path between an imaging module 38 and a surgical hub display 67. The signal combiner 64 combines audio and/or image data received from an imaging module 38 and/or an AR device 66. The surgical hub 56 receives the combined data from the combiner 64 and overlays the data provided to the display 67, where the overlaid data is displayed. The imaging device 68 may be a digital video camera and the audio device 69 may be a microphone. The signal combiner 64 may comprise a wireless heads-up display adapter to couple to the AR device 66 placed into the communication path of the display 67 to a console allowing the surgical hub 56 to overlay data on the display 67.

Figure 8:
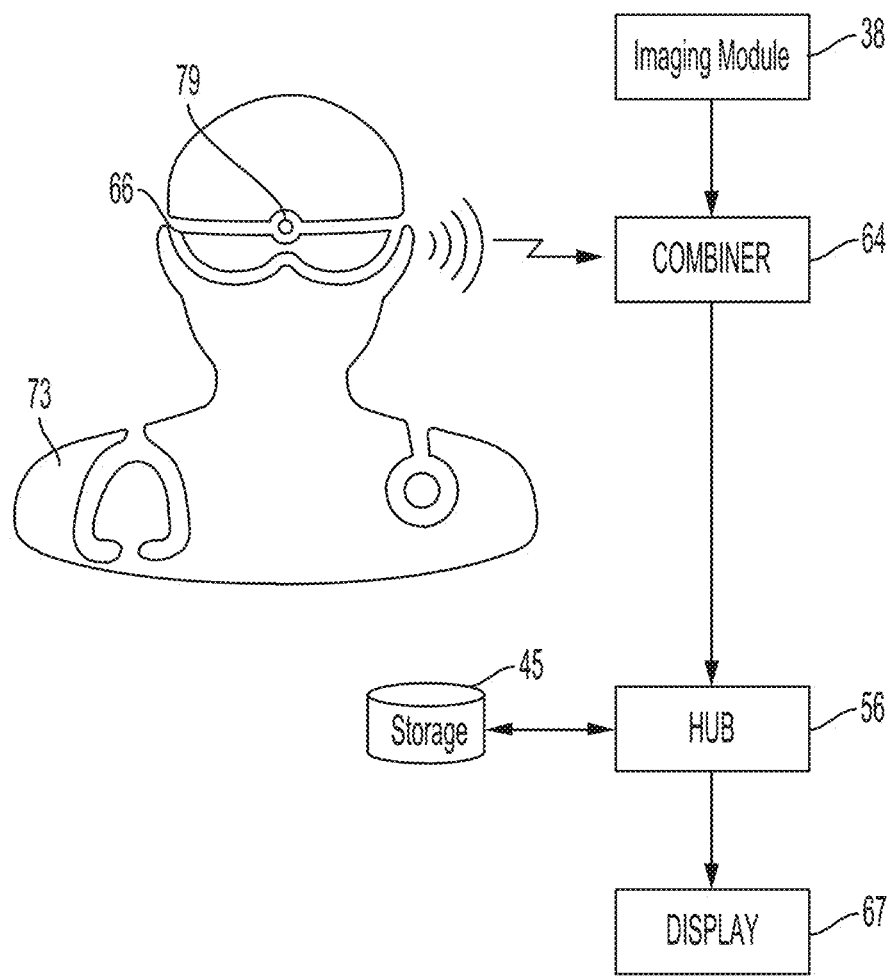
FIG. 8 illustrates an augmented reality (AR) system comprising an intermediate signal combiner positioned in the communication path between an imaging module and a surgical hub display, according to one aspect of this disclosure.

FIG. 8 illustrates an augmented reality (AR) system comprising an intermediate signal combiner positioned in the communication path between an imaging module and a surgical hub display. FIG. 8 illustrates an AR device 66 worn by a surgeon 73 to communicate data to the surgical hub 56. Peripheral information of the AR device 66 does not include active video. Rather, the peripheral information includes only device settings, or signals that do not have same demands of refresh rates. Interaction may augment the surgeon's 73 information based on linkage with preoperative computerized tomography (CT) or other data linked in the surgical hub 56. The AR device 66 can identify structure-ask whether instrument is touching a nerve, vessel, or adhesion, for example. The AR device 66 may include pre-operative scan data, an optical view, tissue interrogation properties acquired throughout procedure, and/or processing in the surgical hub 56 used to provide an answer. The surgeon 73 can dictate notes to the AR device 66 to be saved with patient data in the hub storage 45 for later use in report or in follow up.

The AR device 66 worn by the surgeon 73 links to the surgical hub 56 with audio and visual information to avoid the need for overlays, and allows customization of displayed information around periphery of view. The AR device 66 provides signals from devices (e.g., instruments), answers queries about device settings, or positional information linked with video to identify quadrant or position. The AR device 66 has audio control and audio feedback from the AR device 66. The AR device 66 is able to interact with other systems in the operating theater and have feedback and interaction available wherever the surgeon 73 is viewing. For example, the AR device 66 may receive voice or gesture initiated commands and queries from a surgeon, and the AR device 66 may provide feedback in the form of one or more modalities including audio, visual, or haptic touch.

Figure 9:
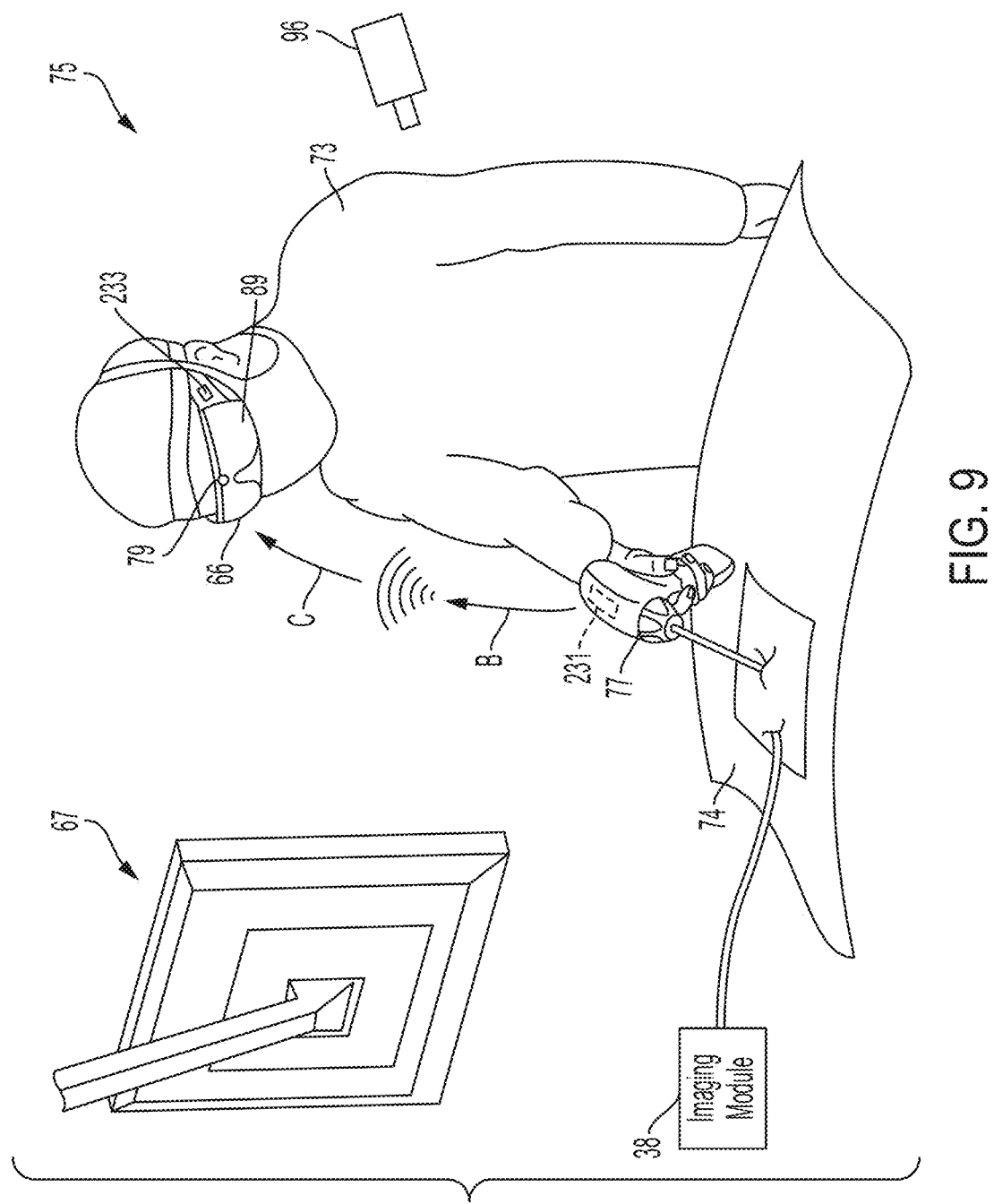
FIG. 9 illustrates an augmented reality (AR) device worn by a surgeon to communicate data to the surgical hub, according to one aspect of this disclosure.

FIG. 9 illustrates a surgeon 73 wearing an AR device 66, a patient 74, and may include a camera 96 in an operating room 75. The AR device 66 worn by the surgeon 73 may be used to present to the surgeon 73 a virtual object overlaid on a real time image of the surgical field through augmented reality display 89 or through the hub connected display 67. The real time image may include a portion of a surgical instrument 77. The virtual object may not be visible to others within the operating room 75 (e.g., surgical assistant or nurse), though they also may wear AR devices 66. Even if another person is viewing the operating room 75 with an AR device 66, the person may not be able to see the virtual object or may be able to see the virtual object in a shared augmented reality with the surgeon 73, or may be able to see a modified version of the virtual object (e.g., according to customizations unique to the surgeon 73) or may see different virtual objects.

A virtual object and/or data may be configured to appear on a portion of a surgical instrument 77 or in a surgical field of view captured by an imaging module 38, an imaging device 68 during minimally invasive surgical procedures, and/or the camera 96 during open surgical procedures. In the illustrated example, the imaging module 38 is a laparoscopic camera that provides a live feed of a surgical area during a minimally invasive surgical procedure. An AR system may present virtual objects that are fixed to a real object without regard to a perspective of a viewer or viewers of the AR system (e.g., the surgeon 73). For example, a virtual object may be visible to a viewer of the AR system inside the operating room 75 and not visible to a viewer of the AR system outside the operating room 75. The virtual object may be displayed to the viewer outside the operating room 75 when the viewer enters the operating room 75. The augmented image may be displayed on the surgical hub display 67 or the augmented reality display 89.

The AR device 66 may include one or more screens or lens, such as a single screen or two screens (e.g., one per eye of a user). The screens may allow light to pass through the screens such that aspects of the real environment are visible while displaying the virtual object. The virtual object may be made visible to the surgeon 73 by projecting light. A virtual object may appear to have a degree of transparency or may be opaque (i.e., blocking aspects of the real environment).

An AR system may be viewable to one or more viewers, and may include differences among views available for the one or more viewers while retaining some aspects as universal among the views. For example, a heads-up display may change between two views while virtual objects and/or data may be fixed to a real object or area in both views. Aspects such as a color of an object, lighting, or other changes may be made among the views without changing a fixed position of at least one virtual object.

A user may see a virtual object and/or data presented in an AR system as opaque or as including some level of transparency. In an example, the user may interact with the virtual object, such as by moving the virtual object from a first position to a second position. For example, the user may move an object with his or her hand. This may be done in the AR system virtually by determining that the hand has moved into a position coincident or adjacent to the object (e.g., using one or more cameras, which may be mounted on the AR device 66, such as AR device camera 79 or separate 96, and which may be static or may be controlled to move), and causing the object to move in response. Virtual aspects may include virtual representations of real world objects or may include visual effects, such as lighting effects, etc. The AR system may include rules to govern the behavior of virtual objects, such as subjecting a virtual object to gravity or friction, or may include other predefined rules that defy real world physical constraints (e.g., floating objects, perpetual motion, etc.). The AR device 66 may include a camera 79 on the AR device 66 (not to be confused with the camera 96, separate from the AR device 66). The AR device camera 79 or the camera 96 may include an infrared camera, an infrared filter, a visible light filter, a plurality of cameras, a depth camera, etc. The AR device 66 may project virtual items over a representation of a real environment, which may be viewed by a user.

The AR device 66 may be used in the operating room 75 during a surgical procedure, for example performed by the surgeon 73 on the patient 74. The AR device 66 may project or display virtual objects, such as a virtual object during the surgical procedure to augment the surgeon's vision. The surgeon 73 may view a virtual object using the AR device 66, a remote controller for the AR device 66, or may interact with a virtual object, for example, using a hand to "interact" with a virtual object or a gesture recognized by the camera 79 of the AR device 66. A virtual object may augment a surgical tool such as the surgical instrument 77. For example, the virtual object may appear (to the surgeon 73 viewing the virtual object through the AR device 66) to be coupled with or remain a fixed distance from the surgical instrument 77. In another example, the virtual object may be used to guide the surgical instrument 77, and may appear to be fixed to the patient 74. In certain examples, a virtual object may react to movements of other virtual or real-world objects in the surgical field. For example, the virtual object may be altered when a surgeon is manipulating a surgical instrument in proximity to the virtual object.

The augmented reality display system imaging device 38 capture a real image of a surgical area during a surgical procedure. An augmented reality display 89, 67 presents an overlay of an operational aspect of the surgical instrument 77 onto the real image of the surgical area. The surgical instrument 77 includes communications circuitry 231 to communicate operational aspects and functional data from the surgical instrument 77 to the AR device 66 via communication communications circuitry 233 on the AR device 66. Although the surgical instrument 77 and the AR device 66 are shown in RF wireless communication between circuits 231, 233 as indicated by arrows B, C, other communication techniques may employed (e.g., wired, ultrasonic, infrared, etc.). The overlay is related to the operational aspect of the surgical instrument 77 being actively visualized. The overlay combines aspects of tissue interaction in the surgical area with functional data from the surgical instrument 77. A processor portion of the AR device 66 is configured to receive the operational aspects and functional data from the surgical instrument 77, determine the overlay related to the operation of the surgical instrument 77, and combine the aspect of the tissue in the surgical area with the functional data from the surgical instrument 77. The augmented images indicate alerts relative to device performance considerations, alerts of incompatible usage, alerts on incomplete capture. Incompatible usage includes tissue out range conditions and tissue incorrectly balanced within the jaws of the end effector. Additional augmented images provide an indication of collateral events including indication of tissue tension and indication of foreign object detection. Other augmented images indicate device status overlays and instrument indication.

FIG. 10 illustrates a system 83 for augmenting images of a surgical field with information using an AR display 89, in accordance with at least one aspect of this disclosure. The system 83 may be used to perform the techniques described hereinbelow, for example, by using the processor 85. The system 83 includes one aspect of an AR device 66 that may be in communication with a database 93. The AR device 66 includes a processor 85, memory 87, an AR display 89, and a camera 79. The AR device 66 may include a sensor 90, a speaker 91, and/or a haptic controller 92. The database 93 may include image storage 94 or preoperative plan storage 95.

The processor 85 of the AR device 66 includes an augmented reality modeler 86. The augmented reality modeler 86 may be used by the processor 85 to create the augmented reality environment. For example, the augmented reality modeler 86 may receive images of the instrument in a surgical field, such as from the camera 79 or sensor 90, and create the augmented reality environment to fit within a display image of the surgical field of view. In another example, physical objects and/or date may be overlaid on the surgical field of view and/or the surgical instruments images and the augmented reality modeler 86 may use physical objects and data to present the augmented reality display of virtual object s and/or data in the augmented reality environment. For example, the augmented reality modeler 86 may use or detect an instrument at a surgical site of the patient and present a virtual object and/or data on the surgical instrument and/or an image of the surgical site in the surgical field of view captured by the camera 79. The AR display 89 may display the AR environment overlaid on a real environment. The display 89 may show a virtual object and/or data, using the AR device 66, such as in a fixed position in the AR environment.

The AR device 66 may include a sensor 90, such as an infrared sensor. The camera 79 or the sensor 90 may be used to detect movement, such as a gesture by a surgeon or other user, that may be interpreted by the processor 85 as attempted or intended interaction by the user with the virtual target. The processor 85 may identify an object in a real environment, such as through processing information received using the camera 79. In other aspects, the sensor 90 may be a tactile, audible, chemical, or thermal sensor to generate corresponding signals that may combined with various data feeds to create the augmented environment. The sensor 90 may include binaural audio sensors (spatial sound), inertial measurement (accelerometer, gyroscope, magnetometer) sensors, environmental sensors, depth camera sensors, hand and eye tracking sensors, and voice command recognition functions.

The AR display 89, for example during a surgical procedure, may present, such as within a surgical field while permitting the surgical field to be viewed through the AR display 89, a virtual feature corresponding to a physical feature hidden by an anatomical aspect of a patient. The virtual feature may have a virtual position or orientation corresponding to a first physical position or orientation of the physical feature. In an example, the virtual position or orientation of the virtual feature may include an offset from the first physical position or orientation of the physical feature. The offset may include a predetermined distance from the augmented reality display, a relative distance from the augmented reality display to the anatomical aspect, or the like.

In one example, the AR device 66 may be an individual AR device. In one aspect, the AR device 66 may be a Hololens 2 AR device manufactured by Microsoft of Redmond, Wash. This AR device 66 includes a visor with lenses and binaural audio features (spatial sound), inertial measurement (accelerometer, gyroscope, magnetometer), environmental sensors, depth camera, and video camera, hand and eye tracking, and voice command recognition functions. It provides an improved field of view with high resolution by using mirrors to direct waveguides in front of wearer's eyes. Images can be enlarged by changing angles of mirrors. It also provides eye tracking to recognize users and adjust lens widths for specific users.

In another example, the AR device 66 may be a Snapchat Spectacles 3 AR device. This AR device provides the ability to capture paired images and recreate 3D depth mapping, add in virtual effects, and replay 3D videos. The AR device includes two HD cameras to capture 3D photos and videos at 60 fps—while four built-in microphones record immersive, high-fidelity audio. Images from both cameras combine to build out a geometric map of the real world around the user to provide a new sense of depth perception. Photos and videos may be wirelessly synchronized to external display devices.

In yet another example, the AR device 66 may be a Glass 2 AR device by Google. This AR device provides inertial measurement (accelerometer, gyroscope, magnetometer) information overlaid on lens (out of view) to supplement information.

In another example, the AR device 66 may be an Echo Frames AR device by Amazon. This AR device does not have cameras/displays. A microphone and speaker are linked to Alexa. This AR device provides less functionality than a heads-up display.

In yet another example, the AR device 66 may be a Focals AR device by North (Google). This AR device provides notification pusher/smartwatch analog; inertial measurement, screen overlay of information (weather, calendar, messages), voice control (Alexa) integration. This AR device provides basic heads-up display functionality.

In another example, the AR device 66 may be an Nreal AR device. This AR device includes spatial sound, two environmental cameras, a photo camera, IMU (accelerometer, gyroscope), ambient light sensor, proximity sensor functionality. A nebula projects application information on lenses.

In various other examples, the AR device 66 may be any one of the following commercially available AR devices: Magic Leap 1, Epson Moverio, Vuzix Blade AR, ZenFone AR, Microsoft AR glasses prototype, EyeTap to create collinear light to that of the environment directly into the retina. A beam splitter makes the same light seen by the eye available to the computer to process and overlay information, for example. AR visualization systems include HUD, contact lenses, glasses, virtual reality (VR) headsets, virtual retinal display, on in operating room displays, and/or smart contact lenses (bionic lenses).

Multi-user interfaces for the AR device 66 include virtual retinal displays such as raster displays drawn directly on retinas instead of on a screen in front of the eye, smart televisions, smart phones, and/or spatial displays such as Sony spatial display systems.

Other AR technology may include, for example, AR capture devices and software applications, AR creation devices and software applications, and AR cloud devices and software applications. AR capture devices and software applications include, for example, Apple Polycam app, Ubiquity 6 (Mirrorworld using Display.land app)-users can scan and get 3d image of real world (to create 3D model). AR creation devices and software applications include, for example, Adobe Aero, Vuforia, ARToolKit, Google ARCore, Apple ARKit, MAXST, Aurasma, Zappar, Blippar. AR cloud devices and software applications include, for example, Facebook, Google (world geometry, objection recognition, predictive data), Amazon AR Cloud (commerce), Microsoft Azure, Samsung Project Whare, Niantic, Magic Leap.

Situational awareness is the ability of some aspects of a surgical system to determine or infer information related to a surgical procedure from data received from databases and/or instruments. The information can include the type of procedure being undertaken, the type of tissue being operated on, or the body cavity that is the subject of the procedure. With the contextual information related to the surgical procedure, the surgical system can, for example, improve the manner in which it controls the modular devices (e.g., a robotic arm and/or robotic surgical tool) that are connected to it and provide contextualized information or suggestions to the surgeon during the course of the surgical procedure.

Figure 11:
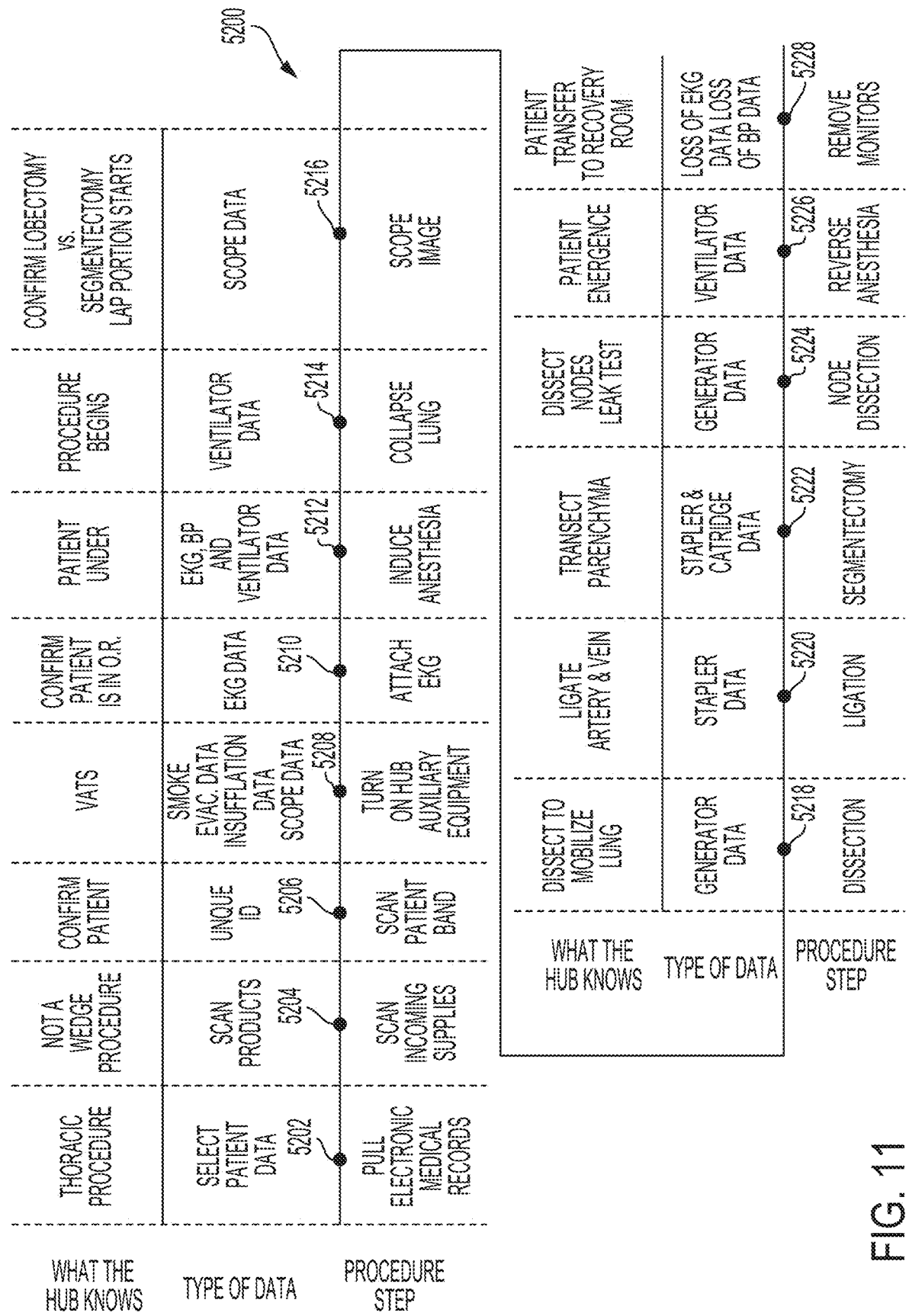
FIG. 11 illustrates a timeline of a situational awareness surgical procedure, according to one aspect of this disclosure.

FIG. 11 illustrates a timeline of a situational awareness surgical procedure. FIG. 11 illustrates a timeline 5200 of an illustrative surgical procedure and the contextual information that a surgical hub 5104 can derive from the data received from the data sources 5126 at each step in the surgical procedure. The timeline 5200 depicts the typical steps that would be taken by the nurses, surgeons, and other medical personnel during the course of a lung segmentectomy procedure, beginning with setting up the operating theater and ending with transferring the patient to a postoperative recovery room. The situationally aware surgical hub 5104 receives data from the data sources 5126 throughout the course of the surgical procedure, including data generated each time medical personnel utilize a modular device 5102 that is paired with the surgical hub 5104. The surgical hub 5104 can receive this data from the paired modular devices 5102 and other data sources 5126 and continually derive inferences (i.e., contextual information) about the ongoing procedure as new data is received, such as which step of the procedure is being performed at any given time. The situational awareness system of the surgical hub 5104 is able to, for example, record data pertaining to the procedure for generating reports, verify the steps being taken by the medical personnel, provide data or prompts (e.g., via a display screen) that may be pertinent for the particular procedural step, adjust modular devices 5102 based on the context (e.g., activate monitors, adjust the FOV of the medical imaging device, or change the energy level of an ultrasonic surgical instrument or RF electrosurgical instrument), and take any other such action described above.

First 5202, the hospital staff members retrieve the patient's EMR from the hospital's EMR database. Based on select patient data in the EMR, the surgical hub 5104 determines that the procedure to be performed is a thoracic procedure.

Second 5204, the staff members scan the incoming medical supplies for the procedure. The surgical hub 5104 cross-references the scanned supplies with a list of supplies that are utilized in various types of procedures and confirms that the mix of supplies corresponds to a thoracic procedure. Further, the surgical hub 5104 is also able to determine that the procedure is not a wedge procedure (because the incoming supplies either lack certain supplies that are necessary for a thoracic wedge procedure or do not otherwise correspond to a thoracic wedge procedure).

Third 5206, the medical personnel scan the patient band via a scanner 5128 that is communicably connected to the surgical hub 5104. The surgical hub 5104 can then confirm the patient's identity based on the scanned data.

Fourth 5208, the medical staff turns on the auxiliary equipment. The auxiliary equipment being utilized can vary according to the type of surgical procedure and the techniques to be used by the surgeon, but in this illustrative case they include a smoke evacuator, insufflator, and medical imaging device. When activated, the auxiliary equipment that are modular devices 5102 can automatically pair with the surgical hub 5104 that is located within a particular vicinity of the modular devices 5102 as part of their initialization process. The surgical hub 5104 can then derive contextual information about the surgical procedure by detecting the types of modular devices 5102 that pair with it during this pre-operative or initialization phase. In this particular example, the surgical hub 5104 determines that the surgical procedure is a VATS procedure based on this particular combination of paired modular devices 5102. Based on the combination of the data from the patient's EMR, the list of medical supplies to be used in the procedure, and the type of modular devices 5102 that connect to the hub, the surgical hub 5104 can generally infer the specific procedure that the surgical team will be performing. Once the surgical hub 5104 knows what specific procedure is being performed, the surgical hub 5104 can then retrieve the steps of that procedure from a memory or from the cloud and then cross-reference the data it subsequently receives from the connected data sources 5126 (e.g., modular devices 5102 and patient monitoring devices 5124) to infer what step of the surgical procedure the surgical team is performing.

Fifth 5210, the staff members attach the EKG electrodes and other patient monitoring devices 5124 to the patient. The EKG electrodes and other patient monitoring devices 5124 are able to pair with the surgical hub 5104. As the surgical hub 5104 begins receiving data from the patient monitoring devices 5124, the surgical hub 5104 thus confirms that the patient is in the operating theater.

Sixth 5212, the medical personnel induce anesthesia in the patient. The surgical hub 5104 can infer that the patient is under anesthesia based on data from the modular devices 5102 and/or patient monitoring devices 5124, including EKG data, blood pressure data, ventilator data, or combinations. Upon completion of the sixth step 5212, the pre-operative portion of the lung segmentectomy procedure is completed and the operative portion begins. Seventh 5214, the patient's lung that is being operated on is collapsed (while ventilation is switched to the contralateral lung). The surgical hub 5104 can infer from the ventilator data that the patient's lung has been collapsed. The surgical hub 5104 can infer that the operative portion of the procedure has commenced as it can compare the detection of the patient's lung collapsing to the expected steps of the procedure (which can be accessed or retrieved previously) and thereby determine that collapsing the lung is the first operative step in this particular procedure.

Eighth 5216, the medical imaging device 5108 (e.g., a scope) is inserted and video from the medical imaging device is initiated. The surgical hub 5104 receives the medical imaging device data (i.e., still image data or live streamed video in real time) through its connection to the medical imaging device. Upon receipt of the medical imaging device data, the surgical hub 5104 can determine that the laparoscopic portion of the surgical procedure has commenced. Further, the surgical hub 5104 can determine that the particular procedure being performed is a segmentectomy, as opposed to a lobectomy (note that a wedge procedure has already been discounted by the surgical hub 5104 based on data received at the second step 5204 of the procedure). The data from the medical imaging device 124 (FIG. 2) can be utilized to determine contextual information regarding the type of procedure being performed in a number of different ways, including by determining the angle at which the medical imaging device is oriented with respect to the visualization of the patient's anatomy, monitoring the number or medical imaging devices being utilized (i.e., that are activated and paired with the surgical hub 5104), and monitoring the types of visualization devices utilized.

For example, one technique for performing a VATS lobectomy places the camera in the lower anterior corner of the patient's chest cavity above the diaphragm, whereas one technique for performing a VATS segmentectomy places the camera in an anterior intercostal position relative to the segmental fissure. Using pattern recognition or machine learning techniques, for example, the situational awareness system can be trained to recognize the positioning of the medical imaging device according to the visualization of the patient's anatomy. As another example, one technique for performing a VATS lobectomy utilizes a single medical imaging device, whereas another technique for performing a VATS segmentectomy utilizes multiple cameras. As yet another example, one technique for performing a VATS segmentectomy utilizes an infrared light source (which can be communicably coupled to the surgical hub as part of the visualization system) to visualize the segmental fissure, which is not utilized in a VATS lobectomy. By tracking any or all of this data from the medical imaging device 5108, the surgical hub 5104 can thereby determine the specific type of surgical procedure being performed and/or the technique being used for a particular type of surgical procedure.

Ninth 5218, the surgical team begins the dissection step of the procedure. The surgical hub 5104 can infer that the surgeon is in the process of dissecting to mobilize the patient's lung because it receives data from the RF or ultrasonic generator indicating that an energy instrument is being fired. The surgical hub 5104 can cross-reference the received data with the retrieved steps of the surgical procedure to determine that an energy instrument being fired at this point in the process (i.e., after the completion of the previously discussed steps of the procedure) corresponds to the dissection step.

Tenth 5220, the surgical team proceeds to the ligation step of the procedure. The surgical hub 5104 can infer that the surgeon is ligating arteries and veins because it receives data from the surgical stapling and cutting instrument indicating that the instrument is being fired. Similarly to the prior step, the surgical hub 5104 can derive this inference by cross-referencing the receipt of data from the surgical stapling and cutting instrument with the retrieved steps in the process.

Eleventh 5222, the segmentectomy portion of the procedure is performed. The surgical hub 5104 infers that the surgeon is transecting the parenchyma based on data from the surgical instrument, including data from a staple cartridge. The cartridge data may correspond to size or type of staple being fired by the instrument. The cartridge data can indicate the type of tissue being stapled and/or transected for different types of staples utilized in different types of tissues. The type of staple being fired is utilized for parenchyma or other tissue types to allow the surgical hub 5104 to infer that the segmentectomy procedure is being performed.

Twelfth 5224, the node dissection step is then performed. The surgical hub 5104 can infer that the surgical team is dissecting the node and performing a leak test based on data received from the generator indicating that an RF or ultrasonic instrument is being fired. For this particular procedure, an RF or ultrasonic instrument being utilized after parenchyma was transected corresponds to the node dissection step, which allows the surgical hub 5104 to make this inference. It should be noted that surgeons regularly switch back and forth between surgical stapling/cutting instruments and surgical energy (i.e., RF or ultrasonic) instruments depending upon the particular step in the procedure because different instruments are better adapted for particular tasks. Therefore, the particular sequence in which the stapling/cutting instruments and surgical energy instruments are used can indicate what step of the procedure the surgeon is performing. Upon completion of the twelfth step 5224, the incisions and closed up and the post-operative portion of the procedure begins.

Thirteenth 5226, the patient's anesthesia is reversed. The surgical hub 5104 can infer that the patient is emerging from the anesthesia based on the ventilator data (i.e., the patient's breathing rate begins increasing), for example.

Lastly, fourteenth 5228, the medical personnel remove the various patient monitoring devices 5124 from the patient. The surgical hub 5104 can thus infer that the patient is being transferred to a recovery room when the hub loses EKG, BP, and other data from the patient monitoring devices 5124. The surgical hub 5104 can determine or infer when each step of a given surgical procedure is taking place according to data received from the various data sources 5126 that are communicably coupled to the surgical hub 5104.

In addition to utilizing the patient data from EMR database(s) to infer the type of surgical procedure that is to be performed, as illustrated in the first step 5202 of the timeline 5200 depicted in FIG. 11, the patient data can also be utilized by a situationally aware surgical hub 5104 to generate control adjustments for the paired modular devices 5102.

In view of the foregoing description of augmented reality (AR), mixed reality, and image overlay technology, the present disclosure may be configured to render and display augmented reality content on an AR headset, external display, or combination of one or more devices. Additionally, an external display may be configured to provide a split screen view that displays AR content and an unaugmented live feed of the surgical field.

The present disclosure describes a tracking system of operating room (OR) personnel and is configured to extrapolate the movement, position, orientation, and context of one or more of the active OR participants to determine the specific operation procedure in progress, the surgical instrument being used by the OR participant, and/or anticipated movement of the OR personnel. The system may further be configured to render a virtual element that includes an anticipated position of a surgical instrument, recommendations, guidance, warning, and surgical location information, as augmented reality (AR) content. The AR content is integrated in real-time with the live-feed of the surgical site, and aids the OR personnel in perioperative surgical procedures.

Figure 12:
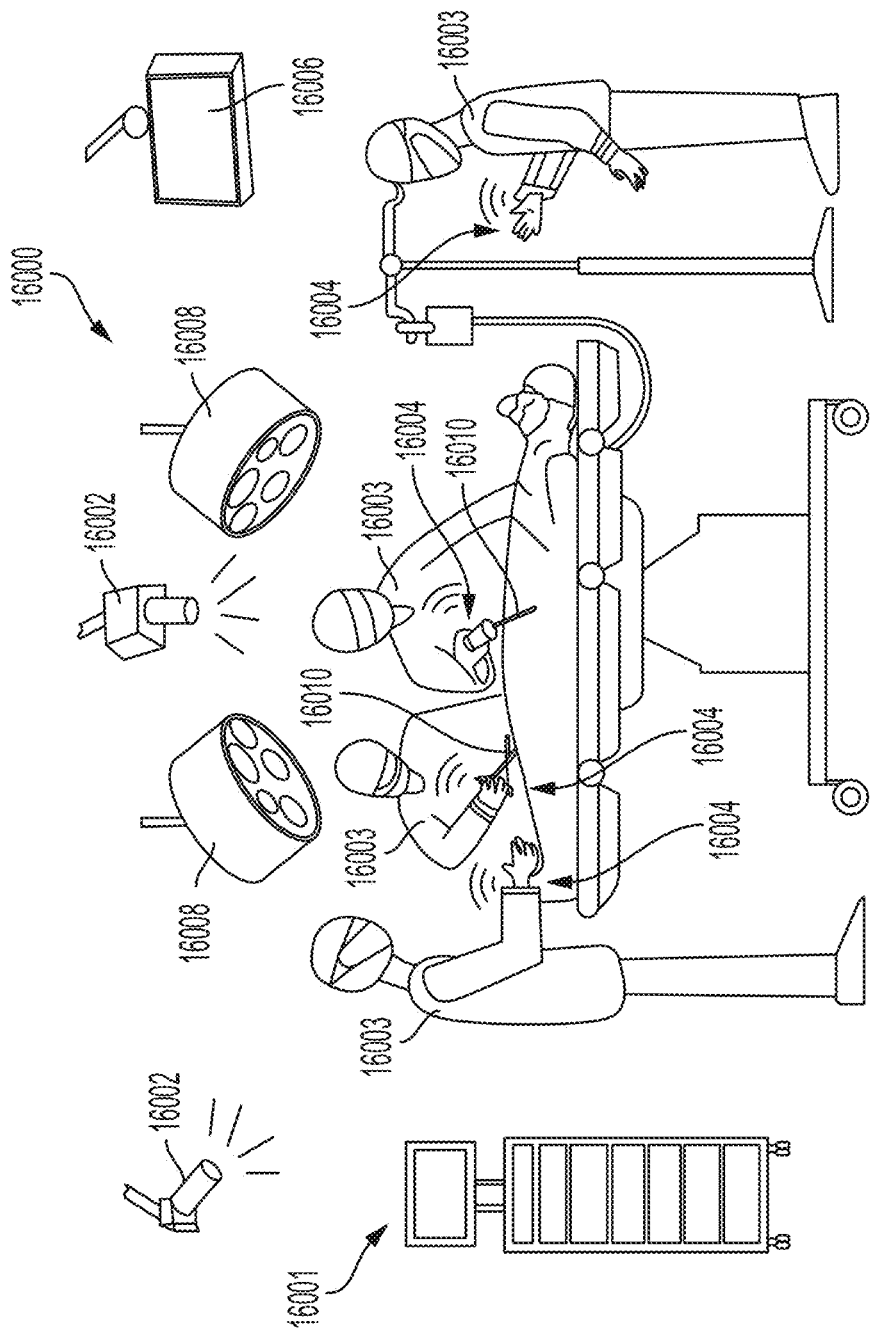
FIG. 12 is a diagram of an illustrative OR setup with a passive tracking camera system, according to one aspect of this disclosure.

FIG. 12 is a diagram of an illustrative OR 16000 setup with a passive tracking camera system, in accordance with at least one aspect of the present disclosure. In various implementations, a surgical hub 16001 can be communicably connected to one or more cameras 16002, surgical instruments 16010, displays 16006, overhead lights 16008, and other surgical devices within the OR 16000 via a communications protocol (e.g., Bluetooth), as described above. The cameras 16002 can be oriented in order to capture images and/or video of the surgical staff members 16003 and/or surgical instruments 16010 (or other surgical devices) within the OR 16000 during the course of a surgical procedure. The captured image(s) can include static images or moving images (i.e., video). The images of the surgical staff members 16003 and/or surgical instruments 16002 can be captured at a variety of angles and magnifications, utilize different filters, and so on. In one implementation, the cameras 16002 are arranged within the OR 16000 so that they can collectively visualize each surgical staff member 16003 performing the surgical procedure. Accordingly, the surgical hub 16001 can receive the captured image and/or video data from the cameras 16002 to visually analyze the surgical staff members 16003 and/or the surgical instruments 16010 during the surgical procedure. The image and/or video data can be processed utilizing a variety of machine vision, image processing, object recognition, and optical tracking techniques to track characteristics, properties, actions, and movements of the surgical staff members 16003 and/or the surgical instruments 16010.

Figure 13:
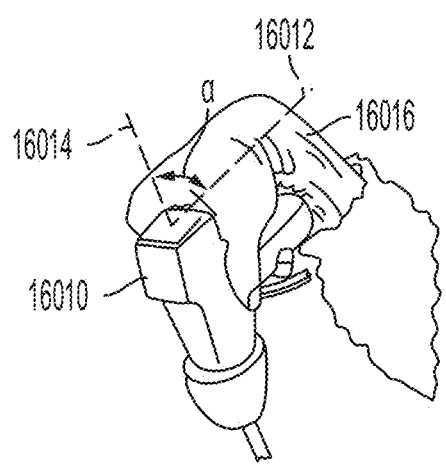
FIG. 13 shows a surgical hub configured to determine the position of a surgical instrument, based on the wrist angle of the surgical staff members, according to one aspect of this disclosure.

The surgical hub 16001 (FIG. 12) can be configured to determine the position of a surgical instrument 16010, as shown in FIG. 13, based on the wrist angle of the surgical staff members 16003. In this particular implementation, the angle of the individual's wrist 16016 is defined as the angle α between the longitudinal axis 16014 of the surgical instrument 16010 being held by the surgeon and the longitudinal axis 16012 (i.e., the proximal-to-distal axis) of the individual's hand. In other implementations, wrist angle can be defined as the angle between the individual's hand and forearm, for example. The surgical hub 16001 may use the wrist angle α, along with other hand movements 16004 of the surgical staff members 16003 to track the movements of the surgical staff members 16003.

Figure 14:
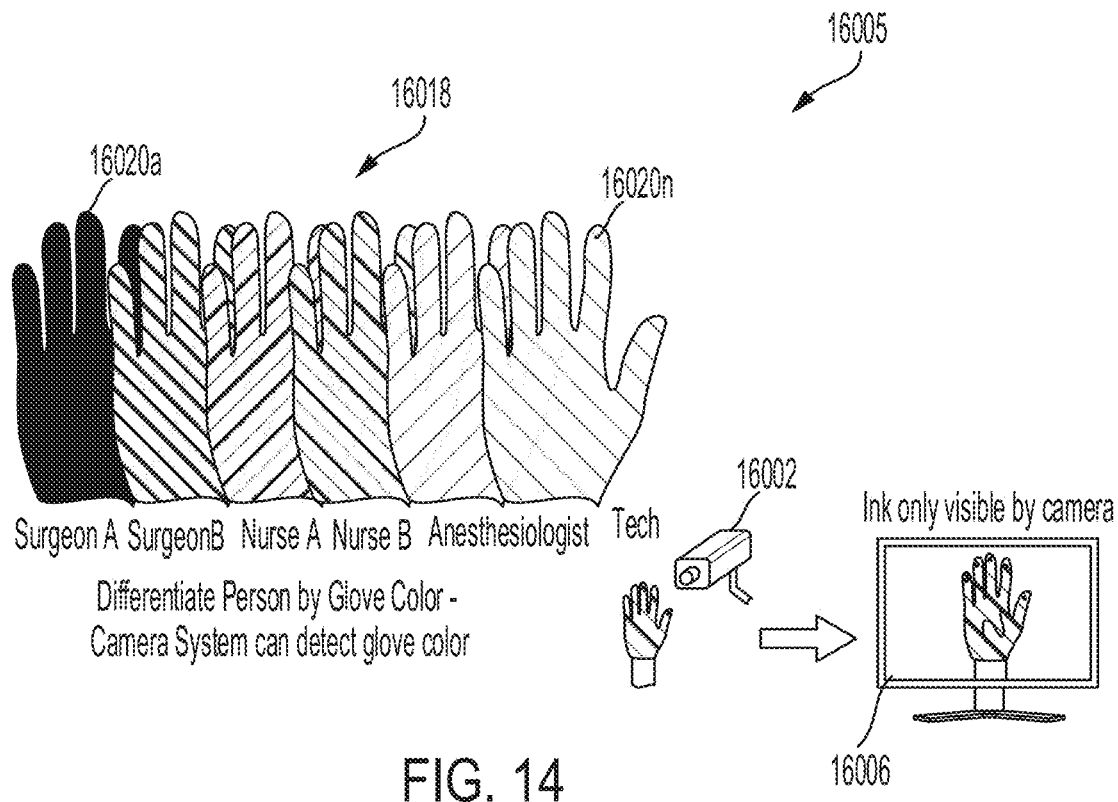
FIG. 14 shows a passive tracking system comprising one or more cameras configured to uniquely identify and differentiate surgical staff members, in an operating room, according to one aspect of this disclosure.

FIG. 14 shows a passive tracking system 16005 comprising one or more cameras 16002 configured to uniquely identify and differentiate surgical staff members in an operating room, such as Surgeon A, Surgeon B, Nurse A, Nurse B, Anesthesiologist, Technician, etc., The passive tracking system 16005 may use a number of different visual identifiers on a surgical glove 16018 to differentiate between the different surgical staff members including a pattern, color, ink, code (e.g., bar code or QR code), or combination of multiple identifiers. In one aspect, each surgical staff member in the operating room has a different color or pattern 16020a-16020n on their gloves 16018 that uniquely corresponds to the surgical staff member's identify. The color of the surgical glove 16018 is only detectable by the camera 16002 and is shown in color on the display 16006.

Figure 15:
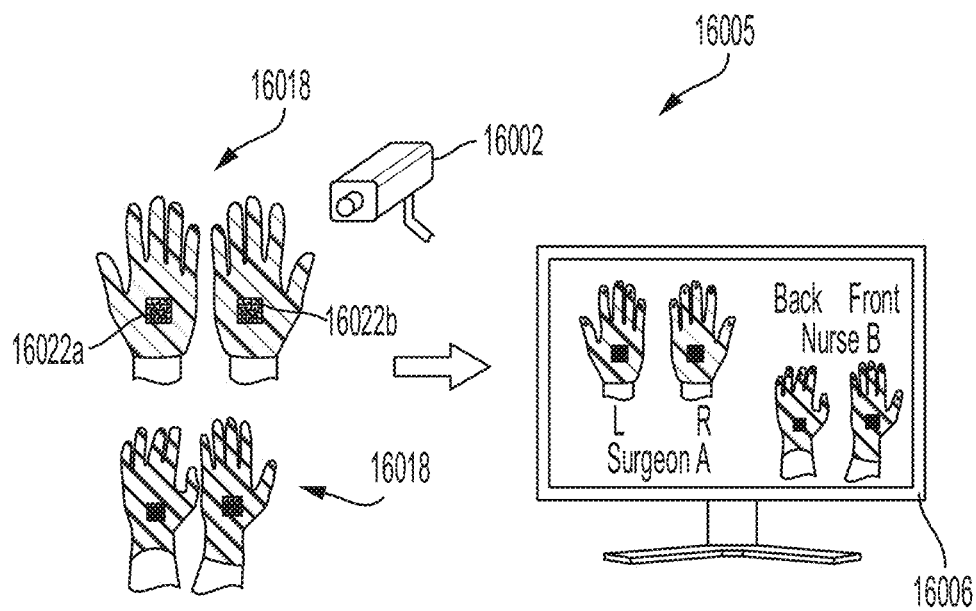
FIG. 15 shows an initialization sequence in a passive tracking system, according to one aspect of this disclosure.

FIG. 15 shows an initialization sequence in a passive tracking system 16005. In one aspect, the surgical staff member's glove may comprise an identifier or a code 16022a, 16022b. The code 16022a, 16022b may be scanned or identified by the camera 16002 and sent to a surgical hub 16001 (FIG. 12) to associate an identifying glove color or pattern 16020a-16020n (as shown in FIG. 14), staff member identify, and left and right hand. The surgical hub 16001 records the identifying information associated with the code 16022a, 16022b and may associate the information with a surgical procedure, operating room, patient, or other surgical analytics. Each surgical staff member may be required to initializes their gloves 16018 upon entering the operating room or prior to surgery. The gloves 16018 are shown and identified on the display 16006.

The identifying characteristics on the gloves 16018 may be printed directly onto the gloves 16018 providing a sterile surface that is visible or invisible in the visible light spectrum. In various aspects, the identifying pattern may be comprise an invisible ink, optical fiducial marker, photosensitive tag printed directly onto the gloves, or retroreflective material. In one aspect, certain colors, patterns, or codes may be found distracting so it maybe preferred that the identifying pattern is invisible in the visible light spectrum.

Figure 16:
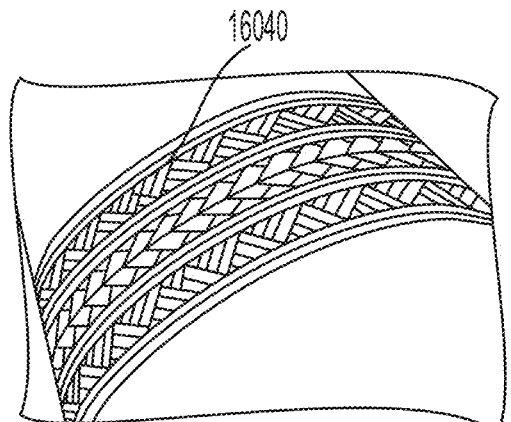
FIG. 16 shows a directional pattern than may be used to differentiate between a left and right appendage or aid the passive tracking cameras in detecting movement, according to one aspect of this disclosure.

FIG. 16 shows a directional pattern 16040 that may be used to differentiate between a left and right appendage or aid the passive tracking cameras 16002 in detecting movement. The different directional pattern 16040 may be associated with different staff members and may be printed on gloves, wristbands, and/or forearm bands to aid the passive tracking cameras 16002 in detecting movement.

Figure 17:
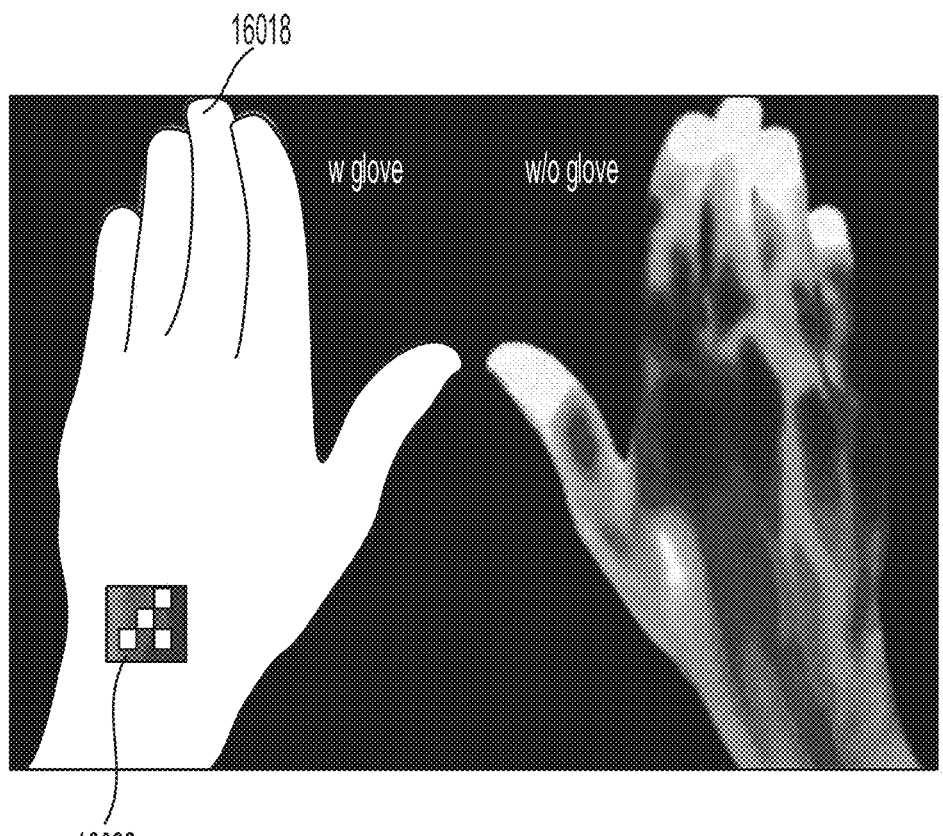
FIG. 17 shows an identifying code on the dorsal side of a surgical glove, detected by a thermal imaging or inferred (IR) camera, according to one aspect of this disclosure.

FIG. 17 shows an identifying code 16022 on the dorsal side of a surgical glove 16018, detected by a thermal imaging or infrared (IR) camera 16002. The code 16022 may be printed on the back of the surgical glove 16018 with a thermal conductive material that allows heat the transfer from the surgical staff member in a specific pattern. Additionally, the colors or patterns may be visible to the surgical staff members to ensure that they have a matching pair of gloves. In another aspect, each glove 16018 is unique and associated with the staff member by the initialization sequence. The initialization sequence does not require that gloves are kept in pairs and may be pulled form a box of disposable gloves like traditional latex gloves.

Figure 18:
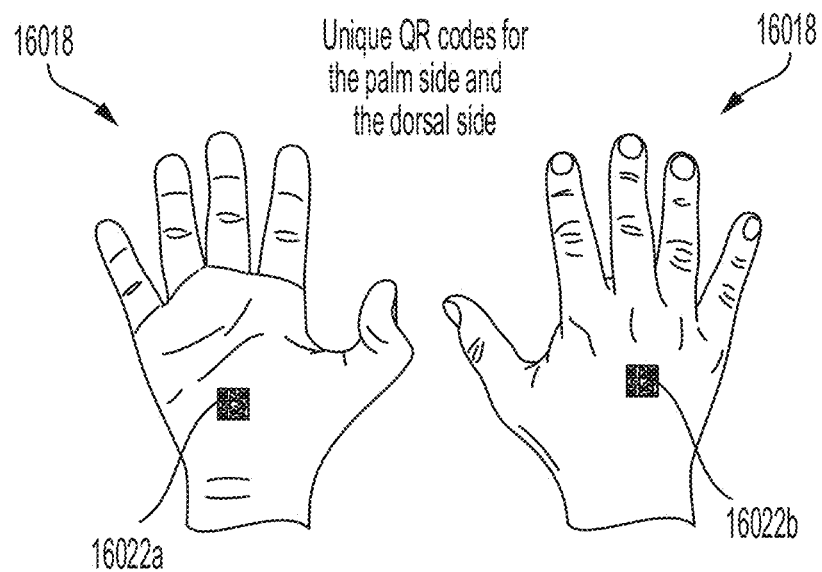
FIG. 18 shows an identifying code on both the dorsal side and palm side a surgical glove, according to one aspect of this disclosure.

In another aspect, FIG. 18 shows an identifying code 16022a, 16022b on both the dorsal side and palmar side a surgical glove 16018. By printing the identifying code on both sides of the glove 16018, the staff member can more quickly initialize their gloves 16018 in the initialization sequence increase the likelihood that one of the passive tracking cameras 16002 (FIGS. 14-15) is able to view the identifying code 16022a, 16022b.

Figure 19:
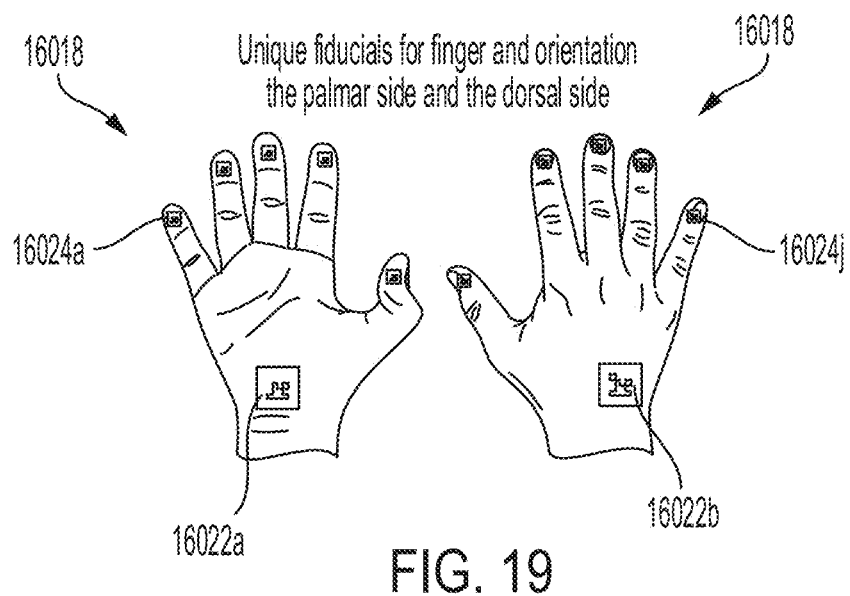
FIG. 19 shows identifying QR codes assigned to each finger of a surgical staff member, according to one aspect of this disclosure.

Some tracking analysis may require more granular identification of the hand movement including the precise movement by each finger of the staff member. In one example, the surgical hub 16001 (FIG. 12) may track the hand-off of a surgical instrument from a first surgeon to a second surgeon, based on the tracked finger movement of the surgical staff members. FIG. 19 shows identifying QR codes 16022a, 16022b assigned to each finger 16024a-j of a surgical staff member glove 16018.

Figure 20:
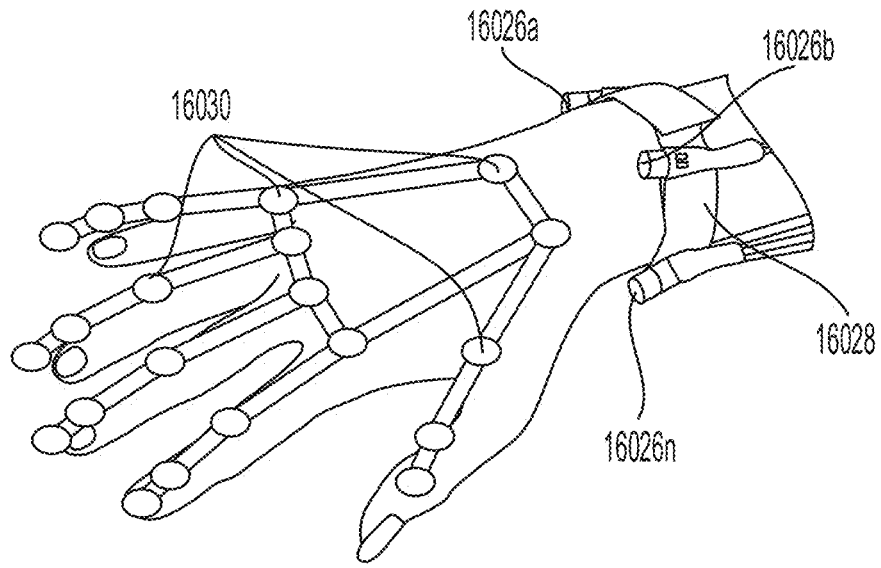
FIG. 20 shows a wrist-mounted camera configured to monitor and track the finger and wrist movement of a single staff member, according to one aspect of this disclosure.

During a surgical procedure, multiple surgical staff members may be clustered in close proximity to the surgical site and impede the view of one or more of the passive tracking cameras 16002 (FIGS. 14-15). In order to mitigate this issue, the surgical hub 16001 (FIG. 12) may use the one or more cameras 16002 in a network configuration to track an identifier throughout the operating room. FIG. 20 shows a wrist-mounted camera 16026a, 16026b, . . . 16016n configured to monitor and track the finger and wrist movement of a single staff member. The wrist-mounted camera 16026a-n is communicably coupled to the surgical hub through a wired or wireless communication medium and may transmit data continuously or in periodic data dumps. The wrist-mounted camera 16026a-n comprises a sterile adjustable strap 16028 that houses the plurality of cameras 16026a-n along the wrist of the surgical staff member. The wrist-mounted camera 16026a-n may map the hand and finger movement based on a plurality of nodes 16030 that correspond to the joints in the hand. The wrist-mounted camera 16026a-n may be used with traditional surgical gloves or may be used with IR printed grids to that aid the cameras 16002 in tracking the node 16030 movement. However, there may be times that even the wrist-mounted camera 16026a-n is unable to see or identify certain granular measurements. An identifier or node 16030 obscured or not visible to the camera 16002 because it is covered by biological material. In some situations, the passive cameras 16002 may still be able to view the identifiers when they are printed with IR visible ink.

However, the passive tracking cameras 16002 (FIGS. 14-15) alone may not have enough resolution to pick up on detailed and granular hand movements 16004 (FIG. 13) that are required to measure certain parameters, such as force or finger strain. Additionally, the cameras 16002 may be visual obstructed and inhibited from recognizing certain movement 16004 that is necessary to identify the surgical instrument 16010 (FIG. 12), the procedure, or other movement of interest. In the present disclosure, various active tracking systems are suitable to measure and detect different levels of precision and reliability that may not be perceptible to the passive tracking cameras. In one aspect, a gyroscope or accelerometer (FIGS. 21-22) may be positioned on the back of (dorsal side) a surgical staff members' glove that can detect hand angles as the hand pivots and rotates. The surgical glove may further comprise a strain gauge (FIGS. 21-22) on the fingers of the glove to track finger movement of the surgical staff member and supplement the passive tracking date. Active sensors such as gyroscopes and strain gauges provide additional data points and allow the surgical hub to manage multiple user interactions in the same surgical space with greater accuracy. Additionally, the data gathered by these active sensors can be used to better quantify surgical staff member's interaction with the surgical devices. The surgical hub 16001 (FIG. 12) may be configure to receive active signals, passive signals, or a combination of both active and passive signals.

In various aspect, active sensors may be used to provide additional resolution (orientation and finger positioning) to passive tracking systems when multiple users are operating different aspects of a single device. For example, during a complex endoscopic procedures, one surgeon will be managing scope stabilization and visualization while another surgeon operates the tool through the working channel. It is common for multiple sets of hands to be in contact with the handle of the scope, and the passive system may not be able associate the actions performed by a set of hands with the corresponding user. With the addition of active systems such as strain gauges in the fingers, or gyroscopes in the glove, the surgical hub could identify which surgeon's hand is feeding or holding the tool, and which is stabilizing the scope due to the different finger shapes as well as hand orientations are required to perform each tasks. Finger shape and hand orientation could be characterized in depth to improve accuracy of predicting which users are performing particular tasks or operating certain devices while there are multiple users or devices in the same visual space.

Figure 21:
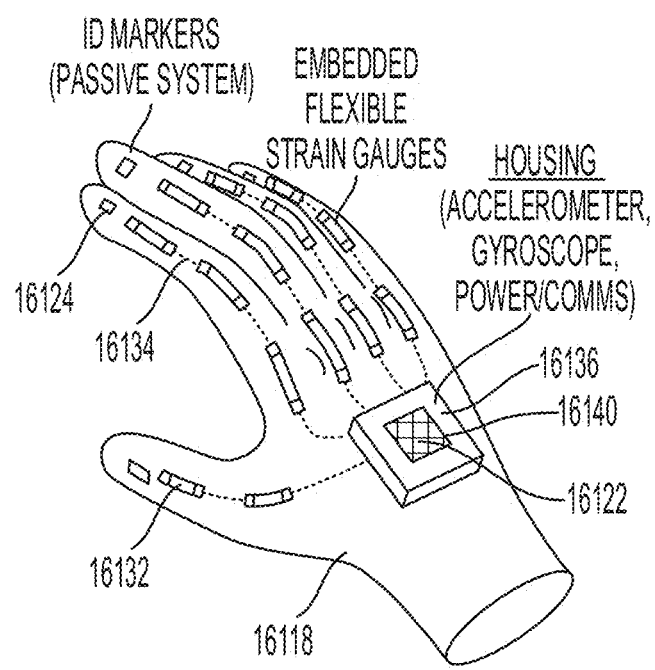
FIG. 21 shows an active surgical glove comprising fiducial markers on each of the fingers, a plurality of embedded strain gauges, and gyroscope coupled to a control circuit, according to one aspect of this disclosure.

FIG. 21 shows an active surgical glove 16118 comprising fiducial markers on each of the fingers 16124, a plurality of embedded strain gauge sensors 16132, and a gyroscope 16136 coupled to a control circuit 16140. The fiducial markers 16124 are used by passive tracking cameras track finger movement. The control circuit 16140 receives strain gauge measurements from each of the strain gauge sensors 16132, through a flexible wire 16134, as well as gyroscope data. The gyroscope may be embedded in a circuit or house coupled to the control circuit 16140. The control circuit 16140 may transfer active sensor data to the surgical hub 16001 (FIG. 12) through a wireless communication protocol or physically I/O communication port. The control circuit 16140 may be configured to transmit data in real-time via a wireless communication protocol, such as Bluetooth. In various aspects, the control circuit 16140 may dynamically adjust the transmission rate in order to manage power.

The control circuit 16140 may have an active identifier 16122, such as a QR code, RFID sensor, or other wireless communication, that allows the staff member to associate their identity with the active tracking data. Additionally, the surgical hub associates the fiducial markers 16124 with the user during the initialization sequence.

In various aspect, the surgical hub uses the passive tracking data to calibrate active sensors on gloves relative to surrounding environment, such that sensors in glove are aware of hand positions in space regardless of visual obstruction. For example, at the beginning of each surgery, a calibration sequence (FIGS. 14-15) can be performed to synchronize sensors in the gloves with the surrounding environment which includes other users in the room in addition to critical areas (patient bed, mayo stand, etc.). Each surgical staff member may scan a unique identifier (e.g., QR code, NFC, active RFID, passive RFID, etc.) in their gloves to uniquely correspond to the user and sensors in the system. During the calibration sequence, all users hold their hands into the field of view of the passive tracking system (e.g., cameras 16002 FIGS. 14-15) in various orientations, and unique identification markers on the gloves allow the vision system to identify the relative position of each user's glove. Throughout the procedure, as hands are blocked by devices, blood, or move in and out of the field of view, active sensors such as accelerometers and gyroscopes can be used to track hand positions and orientation of each users.

Figure 22:
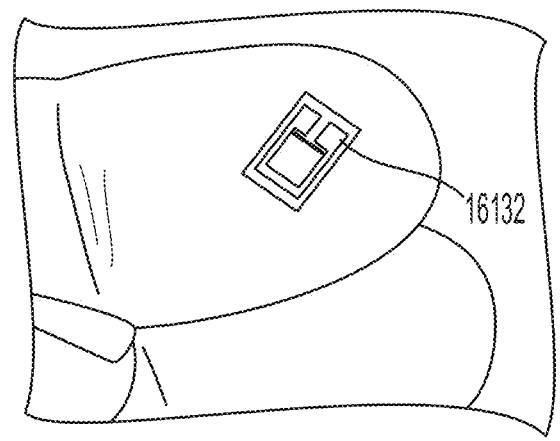
FIG. 22 show a single strain gauge sensor is relation to the tip of a finger, according to one aspect of this disclosure.

FIG. 22 show a single strain gauge sensor 16132 is relation to the tip of a finger. In various aspects, active sensor surgical glove comprises a least one strain gauge sensor 16132 per finger, and may include a strain gauge sensor 16132 at each joint in the hand. Due to the size of the strain gauge sensor 16132, they may be embedded into a flexible sterile material with little to no perceptible size by the surgeon. It will be appreciated that the surgical gloves do not impede the natural tactile feedback that is provided by traditional latex, nitrile, or other sterile materials used in surgical gloves.

Figure 23:
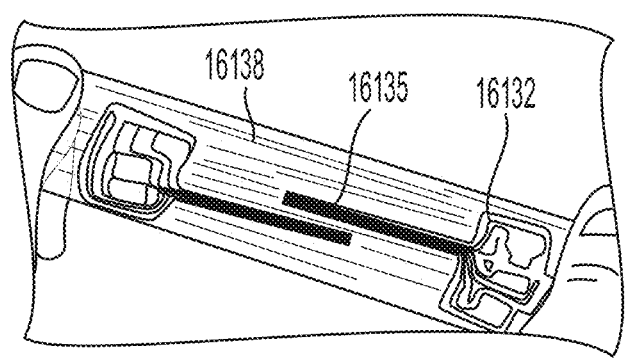
FIG. 23 shows a flexible circuit that is printed into a sterile material such as latex, nitrile, or other sterile materials used in surgical gloves, according to one aspect of this disclosure.
Figure 24:
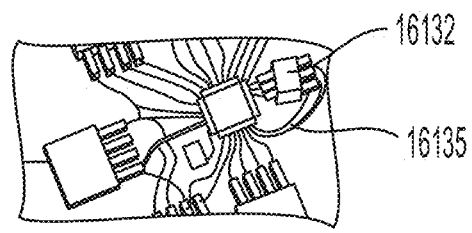
FIG. 24 shows a flexible circuits that may be used to connect the strain gauges to the control circuit, according to one aspect of this disclosure.

FIGS. 23 and 24 show flexible circuits 16135 that may be used to connect the strain gauge sensors 16132 to the control circuit. FIG. 23 shows a flexible circuit that is printed into a sterile flexible material 16138 such as latex, nitrile, or other sterile materials used in surgical gloves. After use, the gloves may be sterilizes for a predetermined number of use cycles or may be disposable. Reusable gloves may be sterilized using heat or antiseptic solutions such as alcohol as long as the sterilization process does not breakdown the material of the gloves or damage the printed active sensor circuits.

Figure 25:
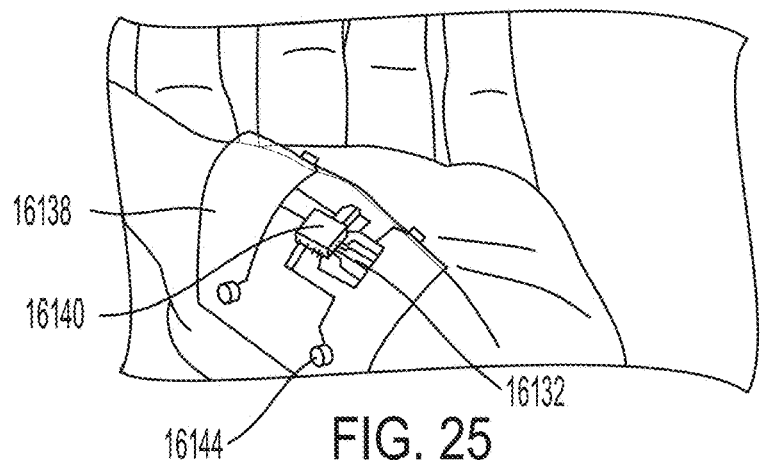
FIG. 25 shows active fiducial markers connected to a control circuit, printed directly on a sterile material, according to one aspect of this disclosure.

FIG. 25 shows active fiducial markers 16144 connected to a control circuit 16140, printed directly on a sterile flexible material 16138. This allows stain gauge sensors 16132 and fiducial markers to be strategically placed on the surgical glove in order to track and locate fingers and hand movement.

Figure 26:
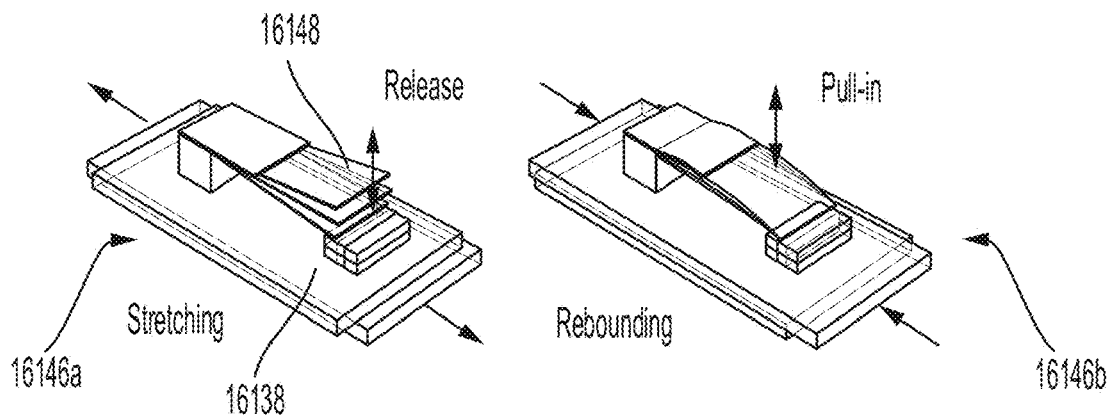
FIG. 26 shows a piezoelectric ceramics power cell that harvests energy from movement and can be used to power the control circuit, strain gauge, gyroscope, accelerometer, and/or active fiducial markers, according to one aspect of this disclosure.

FIG. 26 shows a piezoelectric ceramics power cell 16146 that harvests energy from movement and can be used to power the control circuit, strain gauge, gyroscope, accelerometer, and/or active fiducial markers. The active sensor gloves may comprise a plurality of piezoelectric ceramics power cells 16146 that convert low frequency movement (finger or wrist movement) into energy which is stored in a power source (e.g., battery or capacitor). A power cell 16146 comprises a flexible ceramic layer that captures the vibrations of movement as mechanical energy. The stretched power cell 16146*a* stretches when the sterile flexible material 16138 of the glove stretches, the flexible ceramic layer 16148 is released and vibrates with the motion of the hand. The stretched power cell 16146*a* is in the excitation state and returns to a static state un-stretched power cell 16146*b* when the sterile flexible material 16138 contracts. The change results in the vibration of the flexible ceramic layer 16148 and creates a small-amplitude voltage response that may be captured in an energy storage device.

Figure 27:
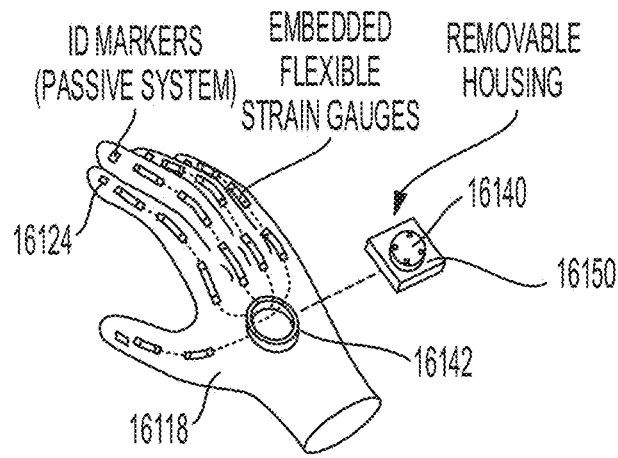
FIG. 27 shows an active sensor glove with a removable housing that comprises the control circuit housing and the gyroscope, according to one aspect of this disclosure.

FIG. 27 shows an active sensor glove 16118 with a removable housing 16150 that comprises the control circuit 16140 and the gyroscope 16136. The housing 16150 is a waterproof enclosure to protect electrical components such as the control circuit, gyroscope, accelerometer, and power source such as a rechargeable battery or super capacitor. The housing 16150 physically connects to the active sensor glove 16118 at a connection point 16142. The connection point 16142 allows power and data to pass between the housing and the active sensors on the glove 16118. After a surgical procedure, the removable housing is disconnected from the connection point 16142 so that the glove 16118 can be sterilized and the housing 16150 can be connected to an external power source to charge the internal power source.

Figure 28:
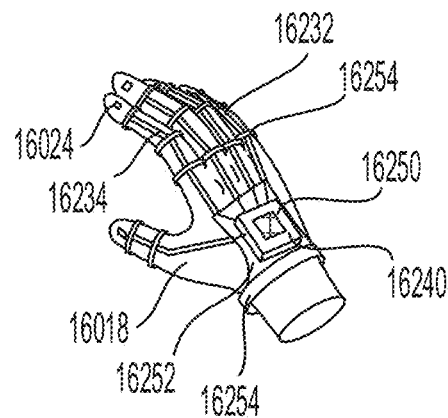
FIG. 28 shows a removable active sensor harness comprising a plurality of embedded strain gauge sensors communicably coupled to a control circuit with flexible wires, within a housing, according to one aspect of this disclosure.
Figure 29:
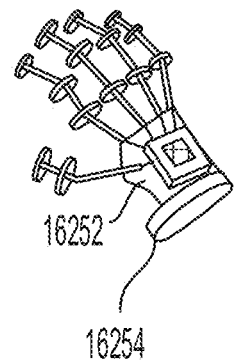
FIG. 29 shows an active sensor harness, removed from a hand, according to one aspect of this disclosure.

In another aspect, the active sensors are removable from a passive glove 16018 with fiducial sensors 16024. FIG. 28 shows a removable active sensor harness 16252 comprising a plurality of embedded strain gauge sensors 16232 communicably coupled to a control circuit 16240 with flexible wires 16234, within a housing 16250. FIG. 29 shows an active sensor harness 16252 removed from a hand. After a surgical procedure, the surgical staff member may remove the active sensor harness 16252 so that it can be sterilized for subsequent use and may discard their gloves 16018. As shown in FIGS. 28-29, the passive glove 16018 includes a removable finger/glove strap 16254.

Figure 30:
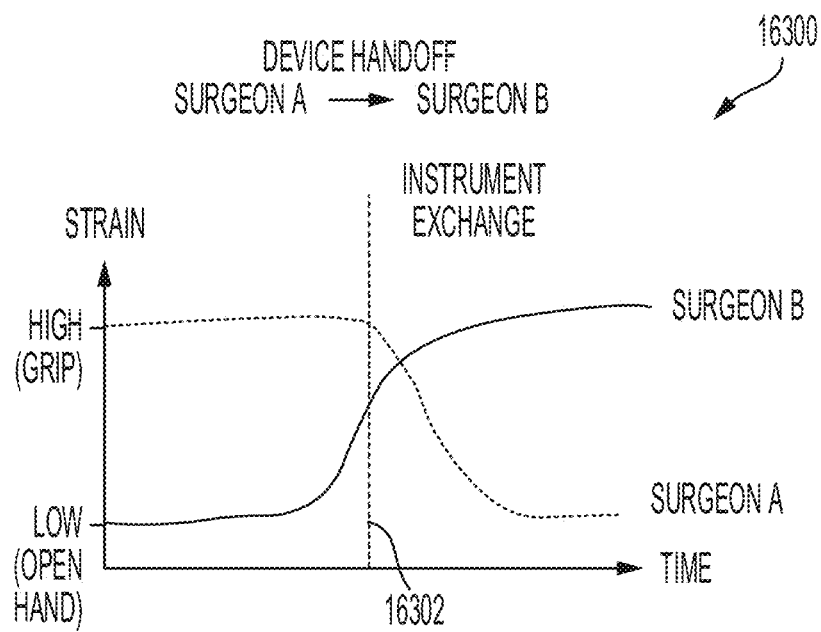
FIG. 30 shows a graphical representation of a surgical instrument hand-off between a first surgeon and a second surgeon, according to one aspect of this disclosure.

In various aspects, the strain gauge sensors 16132, 16232 provides additional data to track a surgical instrument hand-off between a first surgeon and a second surgeon. Tracking the hand-off helps a medical facility to monitor the device after the hand-off and ensure that the correct user is in control of the device. FIG. 30 shows a graphical representation of a surgical instrument hand-off 16300 between a first surgeon and a second surgeon. Surgeon A begins to hand-off the surgical instrument to Surgeon B, and Surgeon B reaches for and grabs the device at 16302. Both active and passive tracking systems determine that the surgical instrument passed from Surgeon A and Surgeon B.

In another example, Surgeon A begins to hand-off the surgical instrument to Surgeon B. However, Surgeon B started to grab the instrument but before making the hand-off, Surgeon A pulled the instrument away. Surgeon A regripped the instrument because they see some bleeding that needed to be cauterized. The passive tracking system had tracked Surgeon A's hand and the surgical instrument as it moved into proximity with Surgeon B to initiate the hand-off, and recognized that Surgeon B came into contact with the device, suggesting that the hand-off was complete. Using the passive tracking system alone may result in losing track of the instrument because Surgeon B never "initiated" the hand-off, yet the device is traveling back with the hands of surgeon A. The active tracking system can detect finger position as it relates to an opened or gripped hand, an additional level of confirmation can ensure that the device can only be assigned to a "gripping" user when outside of the transfer zone.

Active Tracking with EMG and MMG Signals

The present disclosure further describes active tracking of one or more surgical staff members by monitoring mechanomyogram (MMG) and/or electromyogram (EMG) signals, produced by muscles and tendons in the staff member's hands, wrists, and forearms. EMG sensors measure electrical current generated by a muscle during a contraction in response to neuromuscular activity. MMG sensors measure the change in mechanical energy observed on the surface of a muscle. MMG sensors may be used alternatively or additionally with EMG sensors. MMG signals may have a higher signal-to-noise ratio than the EMG signals, and may allow for more granular muscle activity measurements. The EMG and MMG sensors may be placed on the hands, wrists, and forearms to measure muscle movement, in place of, or in conjunction with the passive tracking system. The surgical hub can further synchronize the passive data and active data.

Figure 31:
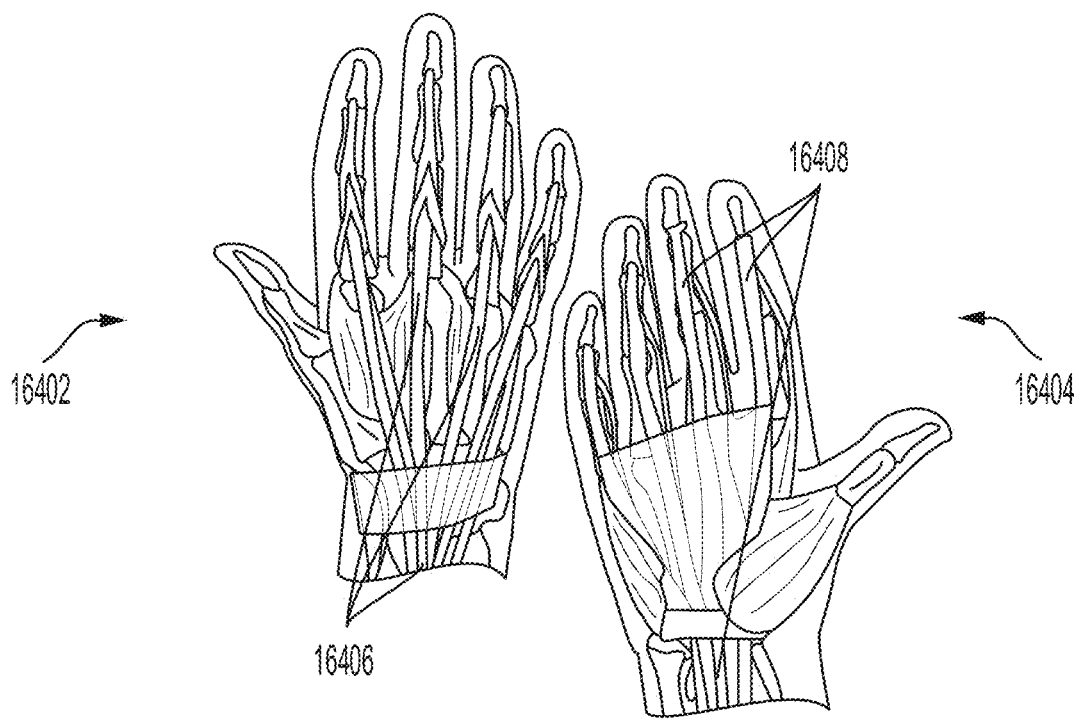
FIG. 31 shows a musculoskeletal view of human hands, according to one aspect of this disclosure.

FIG. 31 shows a musculoskeletal view of human hands. The back or dorsal-side 16402 of the hand shows the extensor tendons 16406 and the front or palmar-side 16404 of the hand shows the flexor tendons 16408. The extensor 16406 and flexor tendons 16408 are complementary tendons that control the movement and force of each finger in the hands. Each finger is actuated by an individual extensor 16406 and flexor 16408 tendon that runs from the respective finger to through the wrist and to muscles in the forearm. The brain sends neuro signals to the muscles in the forearms to produce movement in the hands.

Figure 32:
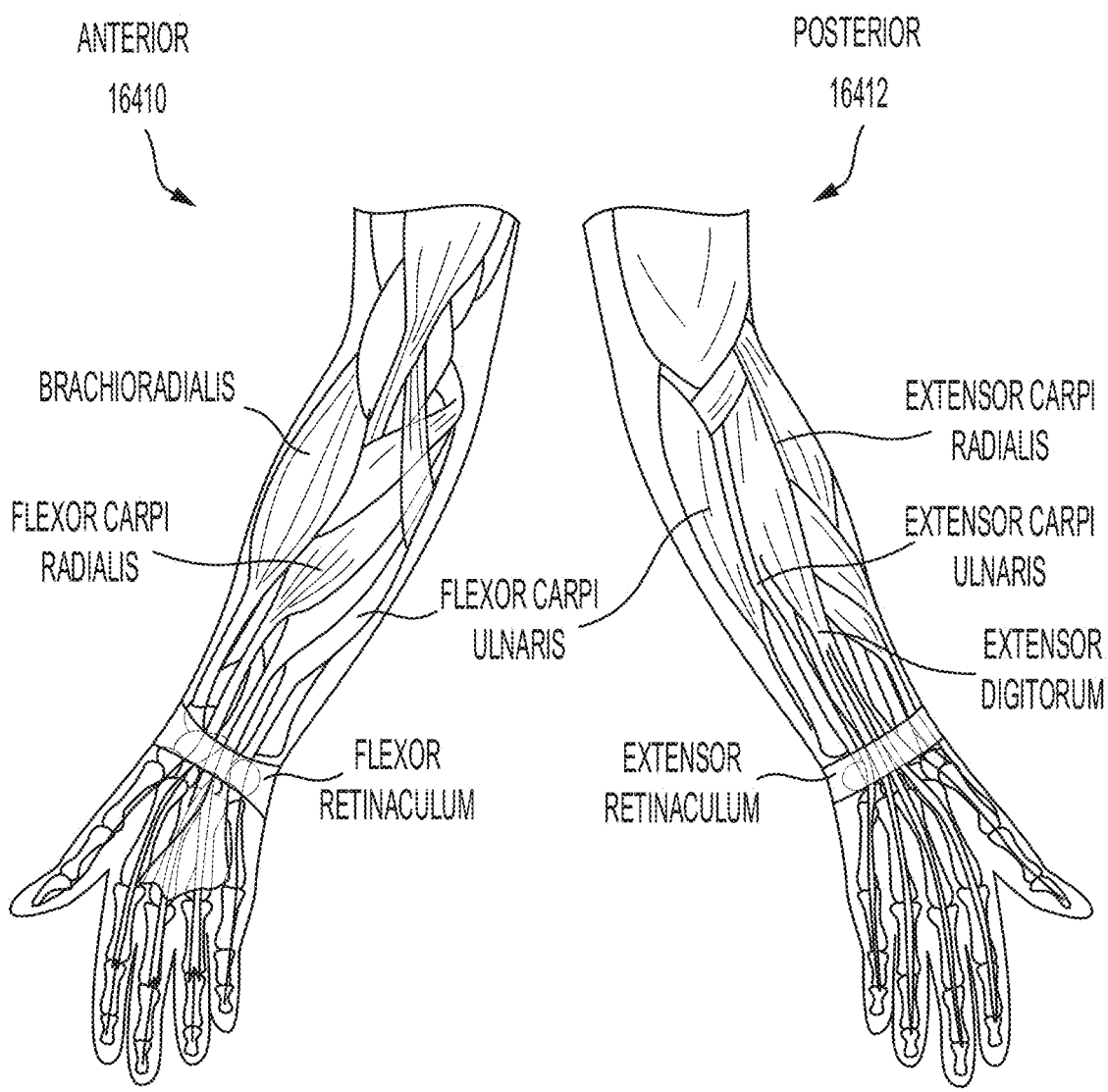
FIG. 32 shows the anterior and posterior side of a right arm, according to one aspect of this disclosure.

FIG. 32 shows the anterior 16410 and posterior 16412 side of a right arm. The brain sends electrical signals to the muscles in the forearms to control respective finger movement and force in each hand. Thus, the specific finger movement and force can be determined my measuring signals produced by the extensor and flexor tendons.

Figure 33:
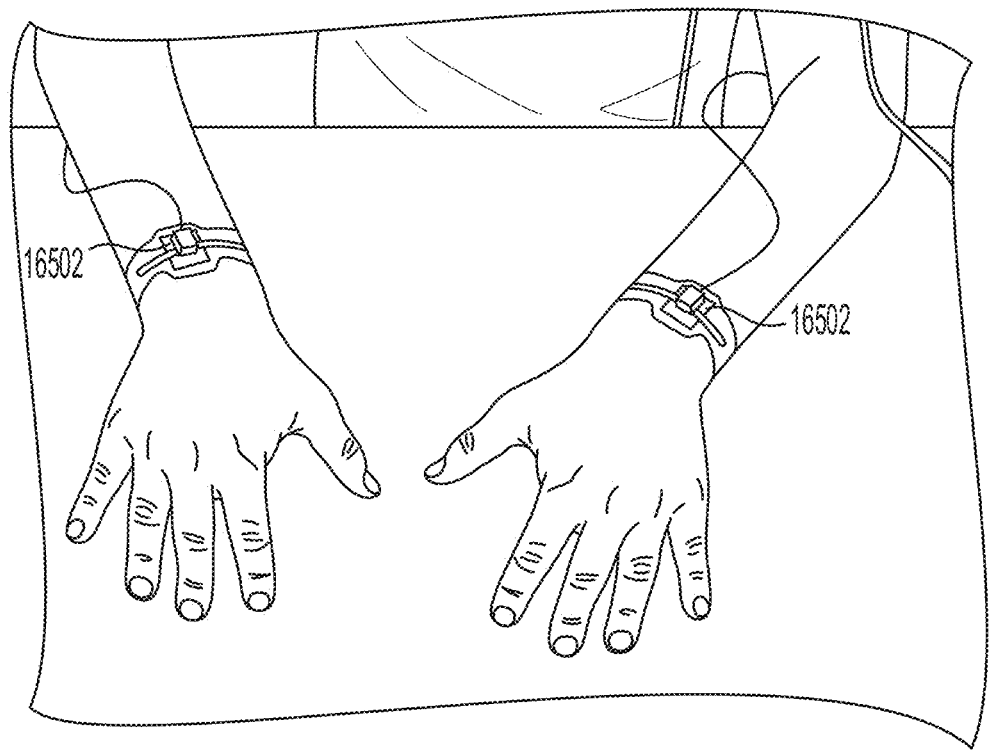
FIG. 33 shows a pair of wrist-mounted sensors communicably coupled to a surgical hub, according to one aspect of this disclosure.

FIG. 33 shows a pair of wrist-mounted sensors 16502 communicably coupled to a surgical hub 16001 (FIG. 12). The sensors 16502 are configured to monitor EMG and/or MMG signals generated by extensor and flexor tendons as they pass through the flexor retinaculum and extensor retinaculum.

Figure 34:
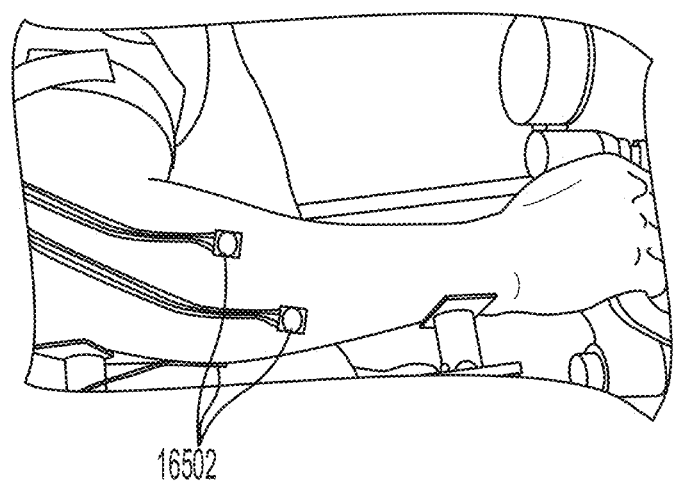
FIG. 34 shows a plurality of MMG sensors mounted directly to the muscles in the forearms, according to one aspect of this disclosure.

In another aspect, the active sensors may be mounted directly to the controlling muscles in the forearms. FIG. 34 shows a plurality of MMG sensors 16502 mounted directly to the muscles in the forearms. The sensors are placed according to the corresponding flexor and extensor tendon in the finger.

Figure 35:
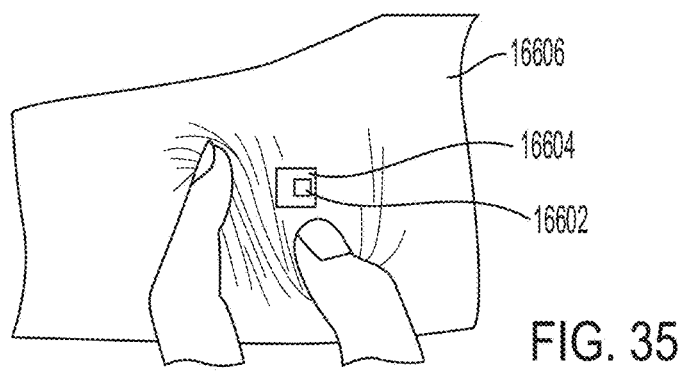
FIG. 35 shows a flexible wireless sensor coupled to a flexible adhesive medium that adheres directly to the skin, according to one aspect of this disclosure.

In another aspect, the active sensor may be a wireless sensor 16602 that adheres directly to the skin. FIG. 35 shows a flexible wireless sensor 16602 coupled to a flexible adhesive medium 16604 that adheres directly to the skin 16606. The wireless sensor 16602 may be placed over muscles to measure EMG or MMG signals or may be used by the passive tracking system to monitor specific movements of the staff member. The wireless sensor 16602 may communicably couple to the surgical hub, to wirelessly transmit active tracking data. A plurality of wireless sensors 16602 may come on an adhesive sheet, where all of the sensors are registered to the identity of a specific staff member.

Figure 36:
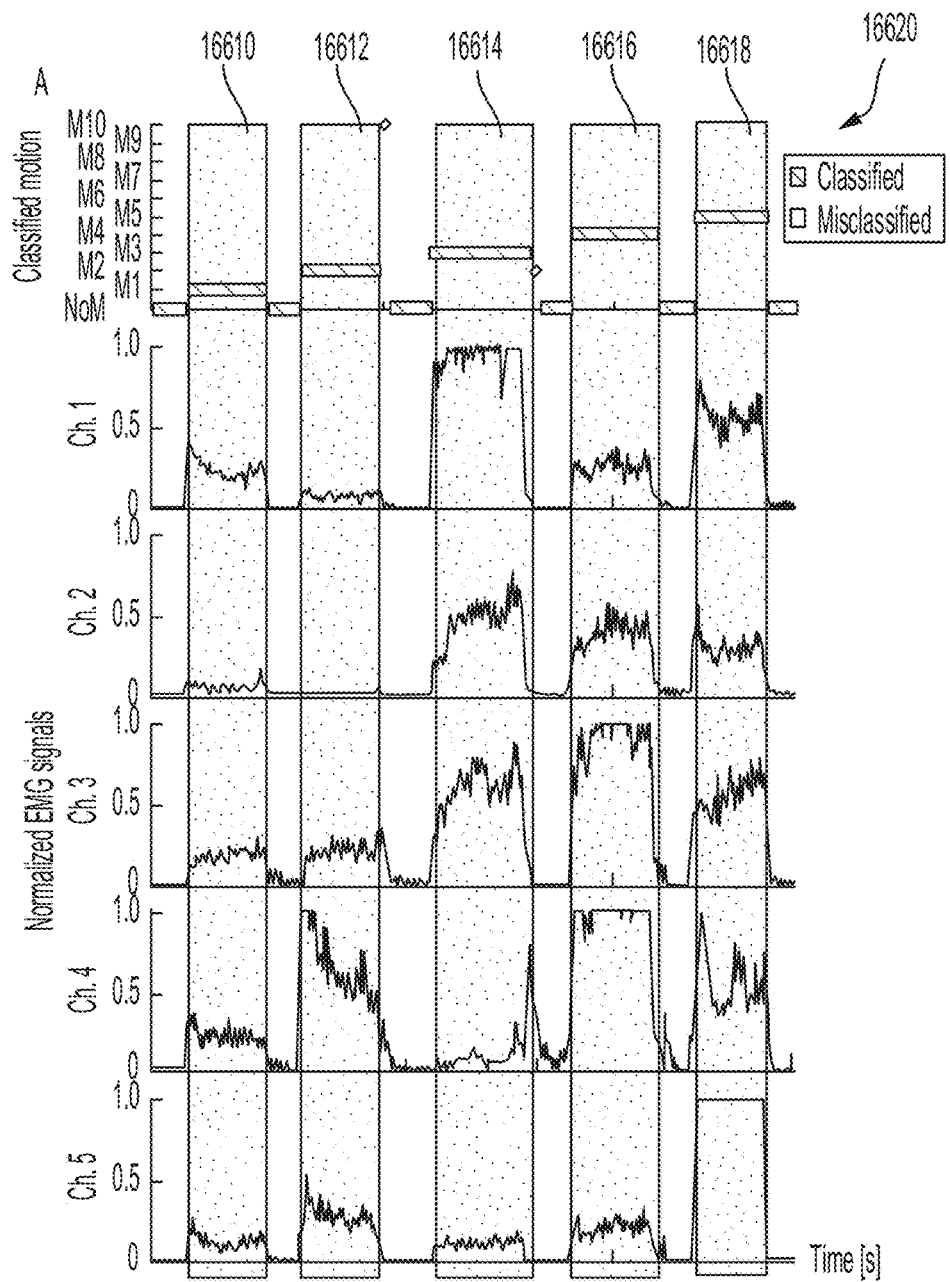
FIG. 36 shows a graphical plot of five EMG channels corresponding the movement of four fingers and a thumb in a hand, according to one aspect of this disclosure.

FIG. 36 shows a graphical plot 16620 of five EMG channels corresponding the movement of four fingers and a thumb in a hand. The surgical hub receives the EMG signals and may plot the results so that the motion can be analyzed. Each channel is corresponds to one sensor and one finger, but may pick up movement from other fingers. The surgical hub plots the data to isolate and classify the movement and magnitude to a specific finger 16610-16618. The surgical hub may indicate periods when there is motion and no motion.

Figure 37:
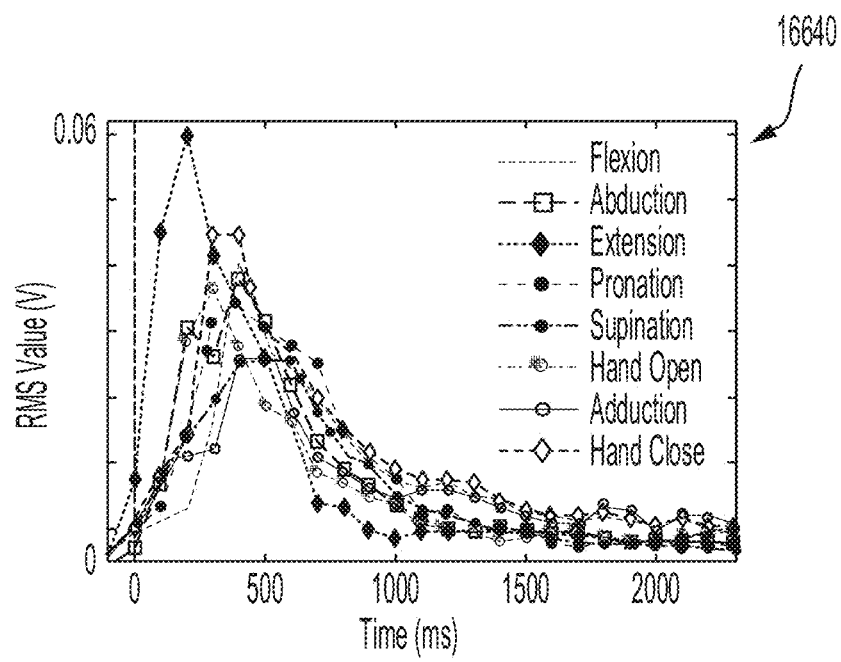
FIG. 37 shows a graphical plot of MMG signals corresponding to the movement and position of a hand, according to one aspect of this disclosure.

FIG. 37 shows a graphical plot 16640 of MMG signals corresponding to the movement and position of a hand. It is important to accurately place the MMG sensor because the MMG signal resolution is dependent on the proximity to the muscle. The graphical plot 16640 comprises 8 channels that correspond to different muscles to actuate coordinated movement.

Figure 38:
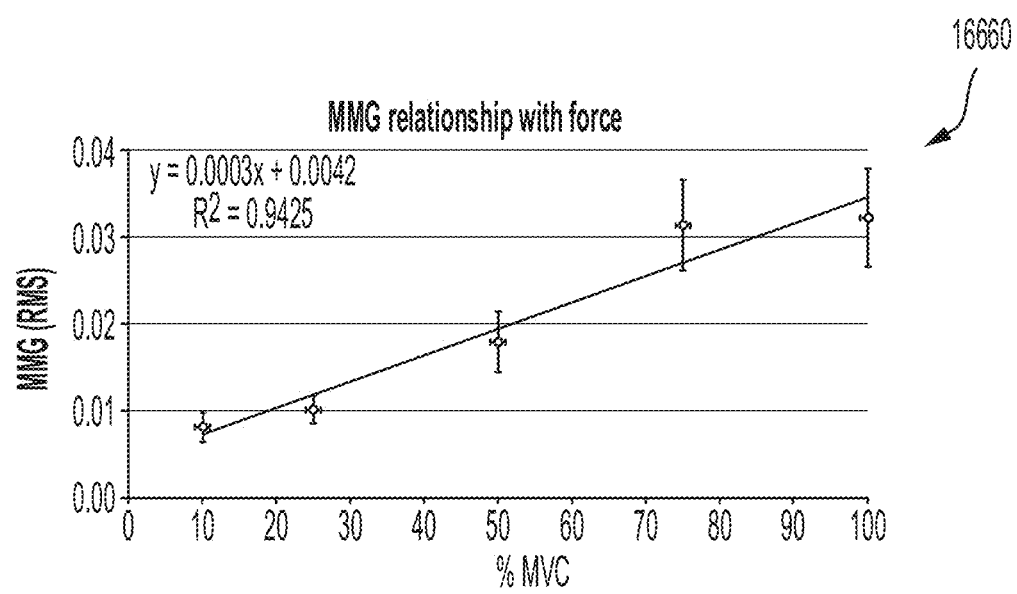
FIG. 38 shows a model that correlates amplitude values for the maximal muscle contraction, measured in Vrms, and the percentage of maximal voluntary contraction (% MCV), according to one aspect of this disclosure.

FIG. 38 shows a model 16660 that correlates amplitude values for the maximal muscle contraction, measured in Vrms, and the percentage of maximal voluntary contraction (% MCV). In one aspect, a linear regression model may be used to correlate the MMG signals to force applied by a specific finger or combination of fingers.

Figure 39:
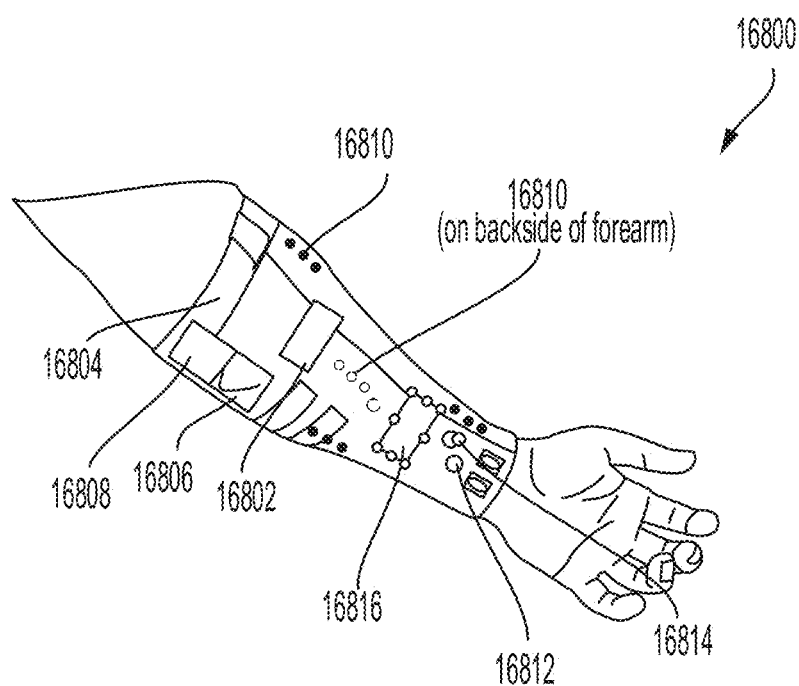
FIG. 39 shows an active sensor sleeve comprising a plurality of active sensors that measure MMG and/or EMG signals, according to one aspect of this disclosure.

FIG. 39 shows an active sensor sleeve 16800 comprising a plurality of active sensors 16802 that measure MMG and/or EMG signals. The sensor sleeve 16800 comprises an elastic form-fitting material 16804 that is configured to snuggly fit around the forearms of a surgical staff member. The active sensors 16802 correspond to different muscle movements in the forearm and indicate the overall movement, motion, and force of fingers and the hand. The sensors may be connected with an elastically deformable conduit wires that expand and contrast with the material 16804 of the sleeve. The sensor sleeve 16800 may be configured in different size range to fit different forearm sizes and ensure proper sensor positioning. The sleeve comprises a control circuit 16808 and power source 16806. The control circuit may be configured to store active data during the surgical procedure and transmit the data to a surgical hub at the end or transmit data in real-time to the surgical hub. The sleeve further comprises a plurality of active beacons 16810 that indicate the real-time position and the surgical staff member. Additionally sensors may include thermocouples 16812, pressure transducers 16814, and impedance electrodes 16816.

Figure 40:
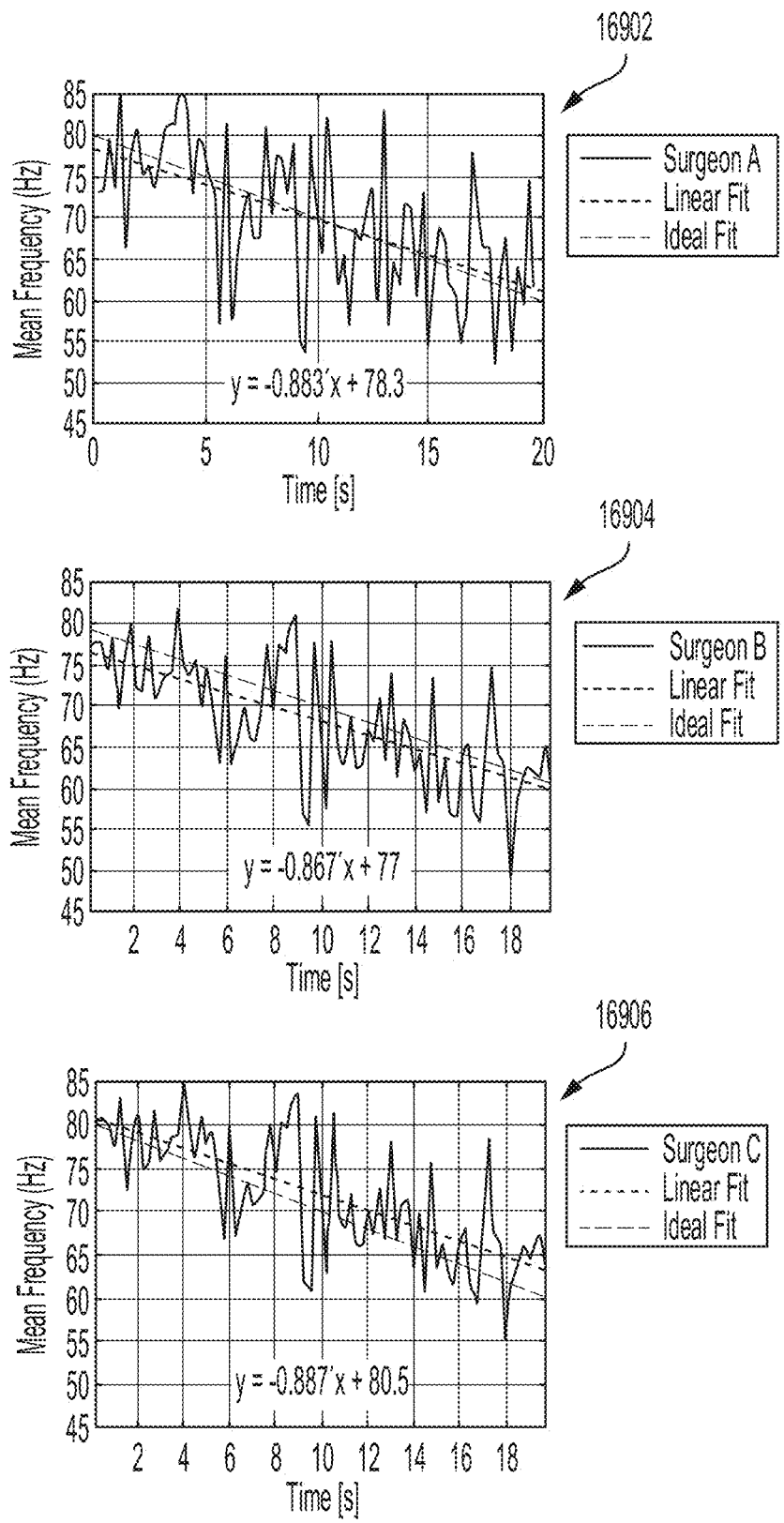
FIG. 40 shows three linear regression models that analyze EMG signals that evaluate muscle fatigue over time, according to one aspect of this disclosure.

FIG. 40 shows three linear regression models that analyze EMG signals that evaluate muscle fatigue over time. Plot 16902, 16904, 16906 corresponds to a different surgeon. The linear fit slope correlates to the rate of muscle fatigue over time. The active signals may be used to evaluate and individual surgeon's technique or a surgical procedure. In this example, plot 16904 shows a smaller slope for Surgeon B, indicating that Surgeon B experienced less muscle fatigue in the contemporaneous interval as Surgeon A and Surgeon C. Additionally, the EMG signals may be used to similarly plot muscle stress over the duration of a surgical procedure.

Figure 41:
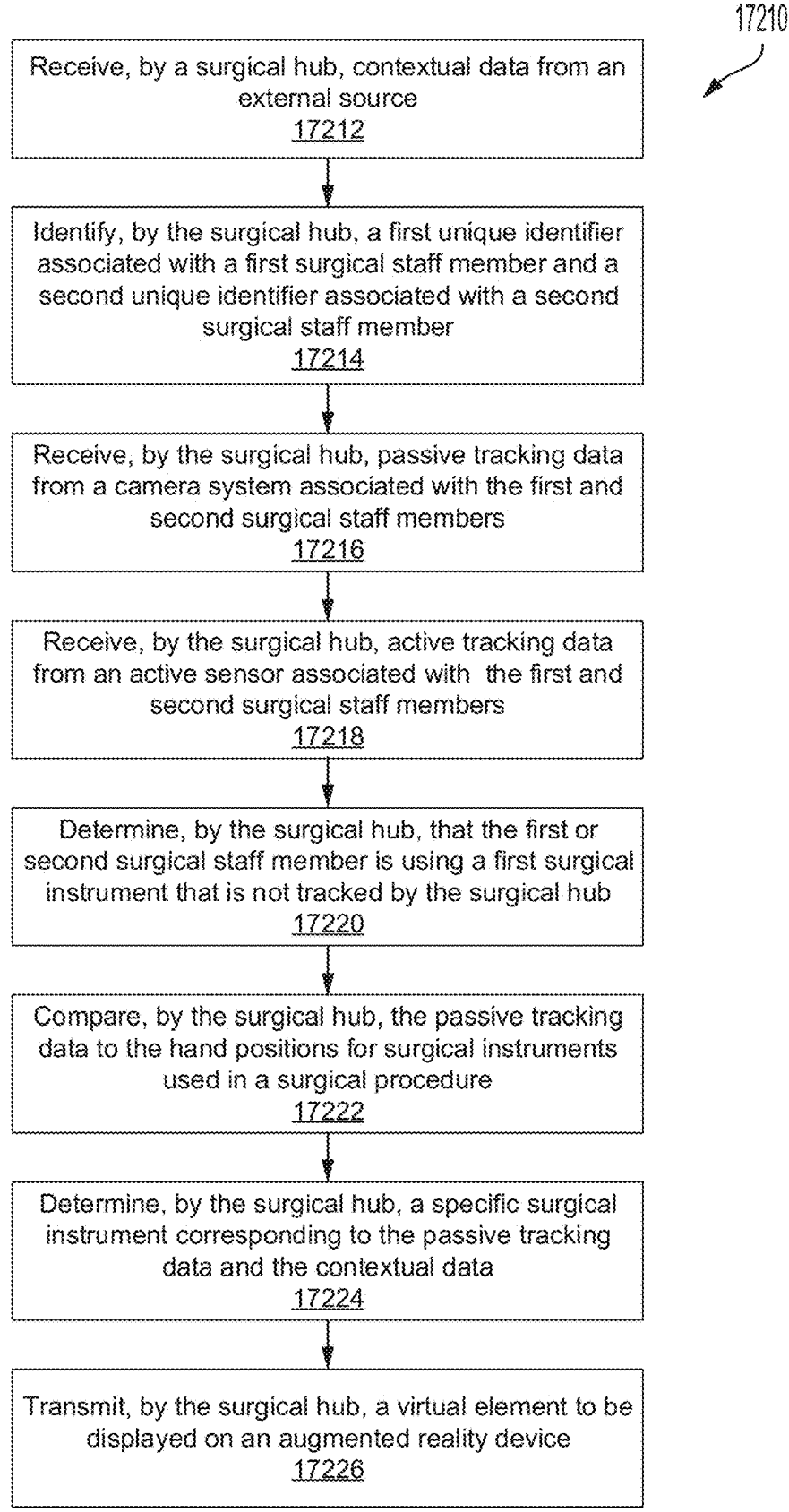
FIG. 41 is a logic diagram of a method for tracking movement of operating room staff members, according to one aspect of this disclosure.

FIG. 41 is a logic diagram of a method 17210 for tracking movement of operating room staff members, according to one aspect of this disclosure. With reference now also to FIGS. 12, 14, and 15, according to the method 17210 surgical hub 16001 receives 17212 contextual data from an external source. The contextual data comprises hand positions for surgical instruments used in a surgical procedure. The surgical hub 16001 identifies 17214 a first unique identifier associated with a first surgical staff member 16003 and a second unique identifier associated with a second surgical staff member 16003. The surgical hub 16001 receives 17216 passive tracking data from a camera system 16002 associated with the first surgical staff member 16003 and the second surgical staff member 16003. The passive tracking data is determined by fiducial markers. The surgical hub 16001 receives 17218 active tracking data from an active sensor associated with the first surgical staff member 16003 and the second surgical staff member 16003. The surgical hub 16001 determines 17220 that the first surgical staff member 16003 or the second surgical staff member 16003 is using a first surgical instrument 16010 that is not tracked by the surgical hub 16001. The surgical hub 16001 compares 17222 the passive tracking data and active tracking data to the hand positions for surgical instruments 16010 used in a surgical procedure. The surgical hub 16001 determines 17224 a specific surgical instrument 16010 corresponding to the passive tracking data and the contextual data. The surgical hub 16001 transmits 17226a virtual element to be displayed on an augmented reality device 66 (FIGS. 1-10).

Accordingly, the present disclosure provides methods, systems, and devices that differentiate between a plurality of surgical staff members, in close proximity, working on the same tools, overlapping in the same spatial area, and/or obstructed from a direct line of sight of passive tracking cameras.

Various additional aspects of the subject matter described herein are set out in the following numbered examples:

Example 1: A surgical system comprising: a camera system; a unique identifier corresponding to a first surgical staff member, wherein the unique identifier comprises visual indicators located on an exterior surface of an article worn by an operating room participant, wherein the unique identifier is visible to the camera system; an active sensor corresponding to a first surgical staff member, wherein the active sensor captures active tracking data; a surgical hub communicatively coupled to the camera system and the active sensor, wherein the surgical hub comprises a memory and a control circuit, and wherein the control circuit is configured to: receive contextual data from an external source, wherein the contextual data comprises hand positions for surgical instruments used in a surgical procedure; receive passive tracking data from the camera system associated with the first surgical staff member; receive active tracking data from the active sensor associated with the first surgical staff member; determine that the surgical staff member is using a first surgical instrument that is not tracked by the surgical hub; compare the passive tracking data and active tracking data to the hand positions for surgical instruments used in a surgical procedure; determine a specific surgical instrument corresponding to the passive tracking data and the contextual data; and display a virtual element on an augmented reality device, wherein the virtual element comprises a virtual representation of the specific surgical instrument.

Example 2: The surgical system of Example 1, wherein the article comprises a surgical glove.

Example 3: The surgical system of Example 2, wherein the active sensor is embedded in the surgical glove, and wherein the active sensor is configured to measure a location, force, or proximity, or combinations thereof, to structural elements of each finger of the first surgical staff member located in the surgical glove.

Example 4: The surgical system of Example 3, wherein the active sensor is communicatively coupled to the control circuit with elastically deformable electrical conductors.

Example 5: The surgical system of Example 4, wherein the elastically deformable electrical conductors are printed on the surgical glove.

Example 6: The surgical system of any one of Examples 1-5, wherein a first article comprises a tracking sleeve worn on a forearm of the first surgical staff member, wherein the active sensor is embedded in the tracking sleeve, and wherein the active sensor is configured to measure active movement signals corresponding to movement of a first person.

Example 7: The surgical system of Example 6, wherein the active movement signals comprises mechanomyogram (MMG) signals and electromyogram (EMG) signals.

Example 8: The surgical system of Example 6, wherein a second article comprises a passive tracking surgical glove, and wherein passive tracking data is captured based on the movement of the passive tracking glove and associated based on the active tracking data captured from the tracking sleeves.

Example 9: The surgical system of any one of Examples 1-8, wherein the unique identifier comprises a unique identifier for each finger of the first surgical staff member.

Example 10: The surgical system of any one of Examples 1-9, wherein the unique identifier comprises a first unique identifier for a left hand and a second unique identifier for a right hand of the first surgical staff member.

Example 11: The surgical system of any one of Examples 1-10, wherein the control circuit is further configured to: determine a user input initiated by the first surgical staff member corresponding to an initiation sequence that registers the unique identifier with the identity of the first surgical staff member.

Example 12: A method for tracking movement of operating room staff members, the method comprising: receiving, by a surgical hub, contextual data from an external source, wherein the contextual data comprises hand positions for surgical instruments used in a surgical procedure; identifying, by the surgical hub, a first unique identifier associated with a first surgical staff member, and a second unique identifier associated with a second surgical staff member; receiving, by the surgical hub, passive tracking data from a camera system associated with the first surgical staff member and the second surgical staff member, wherein the passive tracking data is determined by fiducial markers; receiving, by the surgical hub, active tracking data from an active sensor associated with the first surgical staff member and the second surgical staff member; determining, by the surgical hub, that the first surgical staff member or the second surgical staff member is using a first surgical instrument that is not tracked by the surgical hub; comparing, by the surgical hub, the passive tracking data and active tracking data to the hand positions for surgical instruments used in a surgical procedure; determining, by the surgical hub, a specific surgical instrument corresponding to the passive tracking data and the contextual data; and transmitting, by the surgical hub, virtual element to be displayed on an augmented reality device.

Example 13: The method of Example 12, wherein the active sensor comprises at least one strain gauge that corresponds to each finger of the first surgical staff member and a second surgical staff member.

Example 14: The method of Example 13, further comprising: determining, by the surgical hub, that the first surgical staff member is holding the first surgical instrument; determining, by the surgical hub, that a hand-off of the first surgical instrument was initiated based on a change in grip position of the first surgical staff member and second surgical staff member; determining, by the surgical hub, that the second surgical staff member is beginning to grip the first surgical instrument; determining, by the surgical hub, that the surgical instrument has completed the hand-off from the first surgical staff member to the second surgical staff member.

Example 15: The method of any one of Examples 12-14, wherein more unique identifier comprises at least a unique color, pattern, texture, or quick response (QR) code, or combinations thereof, and wherein the unique identifier is scanned as part of an initiation sequence that registers the unique identifier with the identity of the first surgical staff member.

Example 16: The method of any one of Examples 12-15, wherein the fiducial marker is tracked with a light source that is outside of the visible spectrum.

Example 17: The method of Example 16, wherein the fiducial marker is embedded in a surgical glove.

Example 18: The method of Example 16, wherein the light source is part of a wrist-mounted camera.

Example 19: The method of any one of Examples 12-18, wherein the active sensor is embedded in a surgical glove, and wherein the active sensor is communicatively coupled to a control circuit on the surgical glove.

Example 20:20. The method of Example 19, wherein the control circuit is enclosed in a removable housing.

Example 21: The method of Example 19, wherein the active sensor and the control circuit receive power from a piezoelectric ceramic power cell.

While several forms have been illustrated and described, it is not the intention of Applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a control circuit, computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

The terms "proximal" and "distal" are used herein with reference to a clinician manipulating the handle portion of the surgical instrument. The term "proximal" refers to the portion closest to the clinician and the term "distal" refers to the portion located away from the clinician. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A surgical system comprising:
   a camera system;
   an active sensor corresponding to a surgical staff member, wherein the active sensor captures active tracking data; and
   a surgical hub communicatively coupled to the camera system and the active sensor, wherein the surgical hub comprises a memory and a control circuit, and wherein the control circuit is configured to:
      identify a unique identifier corresponding to the surgical staff member, wherein the unique identifier comprises visual indicators located on an exterior surface of an article worn by an operating room participant, and wherein the unique identifier is visible to the camera system;
      receive contextual data from an external source, wherein the contextual data comprises hand positions for surgical instruments used in a surgical procedure, wherein the hand positions comprise finger shapes and hand orientations, and wherein the contextual data comprises situational awareness information for the surgical procedure;
      receive passive tracking data from the camera system associated with the surgical staff member;
      receive the active tracking data from the active sensor associated with the surgical staff member;
      determine that the surgical staff member is using a first surgical instrument that is not tracked by the surgical hub;
      compare the passive tracking data and the active tracking data to the hand positions for the surgical instruments used in the surgical procedure, wherein the finger shapes and the hand orientations are used to identify a user using the surgical instrument for the surgical procedure;
      determine a specific surgical instrument corresponding to the passive tracking data and the contextual data;
      generate a virtual element signal, wherein the virtual element signal is associated with a virtual representation of the specific surgical instrument; and
      display the virtual element signal on an augmented reality device, wherein the augmented reality device is configured to overlay the virtual element signal that is associated with the virtual representation of the specific surgical instrument on a real surgical environment, and wherein the real surgical environment is associated with a surgical field.

2. The surgical system of claim 1, wherein the article comprises a surgical glove.

3. The surgical system of claim 2, wherein the active sensor is embedded in the surgical glove, and wherein the active sensor is configured to measure a location, force, or proximity, or combinations thereof, to structural elements of each finger of the surgical staff member located in the surgical glove.

4. The surgical system of claim 3, wherein the active sensor is communicatively coupled to the control circuit with elastically deformable electrical conductors.

5. The surgical system of claim 4, wherein the elastically deformable electrical conductors are printed on the surgical glove.

6. The surgical system of claim 1, wherein a first article comprises a tracking sleeve worn on a forearm of the surgical staff member, wherein the active sensor is embedded in the tracking sleeve, and wherein the active sensor is configured to measure active movement signals corresponding to a movement of a first person.

7. The surgical system of claim 6, wherein the active movement signals comprise mechanomyogram (MMG) signals and electromyogram (EMG) signals.

8. The surgical system of claim 6, wherein a second article comprises a passive tracking surgical glove, and wherein the passive tracking data is captured based on the movement of a passive tracking glove and associated based on the active tracking data captured from tracking sleeves.

9. The surgical system of claim 1, wherein the unique identifier comprises a unique identifier for each finger of the surgical staff member.

10. The surgical system of claim 1, wherein the unique identifier comprises a first unique identifier for a left hand and a second unique identifier for a right hand of the surgical staff member.

11. The surgical system of claim 1, wherein the control circuit is further configured to:
determine a user input initiated by the surgical staff member corresponding to an initiation sequence that registers the unique identifier with an identity of the surgical staff member.

12. A method for tracking movement of operating room staff members, the method comprising:
receiving, by a surgical hub, contextual data from an external source, wherein the contextual data comprises hand positions for surgical instruments used in a surgical procedure, wherein the hand positions comprise finger shapes and hand orientations, and wherein the contextual data comprises situational awareness information for the surgical procedure;
identifying, by the surgical hub, a first unique identifier associated with a first surgical staff member and a second unique identifier associated with a second surgical staff member;
receiving, by the surgical hub, passive tracking data from a camera system associated with the first surgical staff member and the second surgical staff member, wherein the passive tracking data is determined by fiducial markers;
receiving, by the surgical hub, active tracking data from an active sensor associated with the first surgical staff member and the second surgical staff member;
determining, by the surgical hub, that the first surgical staff member or the second surgical staff member is using a surgical instrument that is not tracked by the surgical hub;
comparing, by the surgical hub, the passive tracking data and the active tracking data to the hand positions for the surgical instruments used in the surgical procedure, wherein the finger shapes and the hand orientations are used to identify a user using the surgical instrument for the surgical procedure;
determining, by the surgical hub, a specific surgical instrument corresponding to the passive tracking data and the contextual data;
generating, by the surgical hub, a virtual element signal, wherein the virtual element signal is associated with a virtual representation of the specific surgical instrument;
transmitting, by the surgical hub, the virtual element signal to be displayed on an augmented reality device; and
displaying, by the surgical hub, the virtual element signal on the augmented reality device, wherein the augmented reality device is configured to overlay the virtual element signal that is associated with the virtual representation of the specific surgical instrument on a real surgical environment, and wherein the real surgical environment is associated with a surgical field.

13. The method of claim 12, wherein the active sensor comprises at least one strain gauge that corresponds to each finger of the first surgical staff member and the second surgical staff member.

14. The method of claim 13, further comprising:
determining, by the surgical hub, that the first surgical staff member is holding the surgical instrument;
determining, by the surgical hub, that a hand-off of the surgical instrument was initiated based on a change in grip position of the first surgical staff member and the second surgical staff member;
determining, by the surgical hub, that the second surgical staff member is beginning to grip the surgical instrument; and
determining, by the surgical hub, that the surgical instrument has completed the hand-off from the first surgical staff member to the second surgical staff member.

15. The method of claim 12, wherein at least one of the first unique identifier or the second unique identifier comprise at least a unique color, pattern, texture, or quick response (QR) code, or combinations thereof, and wherein the first unique identifier is scanned as part of an initiation sequence that registers the first unique identifier with an identity of the first surgical staff member.

16. The method of claim 12, wherein a fiducial marker is tracked with a light source that is outside of a visible spectrum, wherein the fiducial marker is embedded in a surgical glove, and wherein the light source is part of a wrist-mounted camera.

17. The method of claim 12, wherein the active sensor is embedded in a surgical glove, and wherein the active sensor is communicatively coupled to a control circuit on the surgical glove.

18. The method of claim 17, wherein the control circuit is enclosed in a removable housing.

19. The method of claim 17, wherein the active sensor and the control circuit receive power from a piezoelectric ceramic power cell.

20. The surgical system of claim 1, wherein the augmented reality device is worn by a surgeon performing the surgical procedure in the surgical field.

21. The method of claim 12, wherein the augmented reality device is worn by a surgeon performing the surgical procedure in the surgical field.

* * * * *